(12) United States Patent  (10) Patent No.: US 7,724,494 B2
Shimanouchi et al.  (45) Date of Patent: May 25, 2010

(54) VARIABLE CAPACITOR AND METHOD OF MAKING THE SAME

(75) Inventors: Takeaki Shimanouchi, Kawasaki (JP); Masahiko Imai, Kawasaki (JP); Satoshi Ueda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/712,897

(22) Filed: Mar. 2, 2007

(65) Prior Publication Data

US 2007/0206340 A1  Sep. 6, 2007

(30) Foreign Application Priority Data

Mar. 6, 2006 (JP) .............................. 2006-060076
May 31, 2006 (JP) .............................. 2006-151059

(51) Int. Cl.
*H01G 7/00* (2006.01)
*H01G 7/06* (2006.01)
*H01G 5/01* (2006.01)
*H01G 5/16* (2006.01)

(52) U.S. Cl. ........................ 361/281; 361/278; 361/290

(58) Field of Classification Search ................ 361/272, 361/277, 278, 281, 290, 291
See application file for complete search history.

(56) References Cited

U.S. PATENT DOCUMENTS

| | | | | |
|---|---|---|---|---|
| 2,179,068 A | * | 11/1939 | Sprague ........................ | 361/291 |
| 3,993,939 A | * | 11/1976 | Slavin et al. ............. | 361/283.4 |
| 6,040,611 A | * | 3/2000 | De Los Santos et al. .... | 257/415 |
| 6,373,682 B1 | * | 4/2002 | Goodwin-Johansson .... | 361/278 |
| 6,625,004 B1 | * | 9/2003 | Musolf et al. ................ | 361/278 |
| 6,844,960 B2 | * | 1/2005 | Kowarz ....................... | 359/298 |
| 6,914,785 B1 | * | 7/2005 | Slocum et al. .............. | 361/762 |
| 6,992,878 B2 | | 1/2006 | Shimanouchi et al. | |
| 7,082,024 B2 | * | 7/2006 | Casset et al. ................ | 361/277 |

FOREIGN PATENT DOCUMENTS

| | | |
|---|---|---|
| EP | 1 347 478 A2 | 9/2003 |
| JP | 2004-6588 | 1/2004 |
| JP | 2004-127973 | 4/2004 |
| JP | 2004-536455 | 12/2004 |
| WO | WO 03/009319 | 1/2003 |

OTHER PUBLICATIONS

Korean Office Action dated Jul. 25, 2008.

* cited by examiner

*Primary Examiner*—Eric Thomas
*Assistant Examiner*—David M Sinclair
(74) *Attorney, Agent, or Firm*—Kratz, Quintos & Hanson, LLP

(57) ABSTRACT

A capacitor manufacturing method provides variable capacitors whose capacitances remain stable under the influence of temperature change. Such a variable capacitor includes a fixed electrode, a movable electrode film facing the fixed electrode, and an anchor portion that provides partial connection between the fixed electrode and the movable electrode film. For making this variable capacitor, a first electrode is formed to serve as the fixed electrode. Then, an anchor portion is formed on the fixed electrode, and a sacrifice film is formed to cover the fixed electrode but partially expose the anchor portion. A second electrode is formed on the sacrifice film to serve as the movable electrode film, bonded to the anchor portion. Finally, the sacrifice film is removed.

10 Claims, 57 Drawing Sheets

FIG. 50
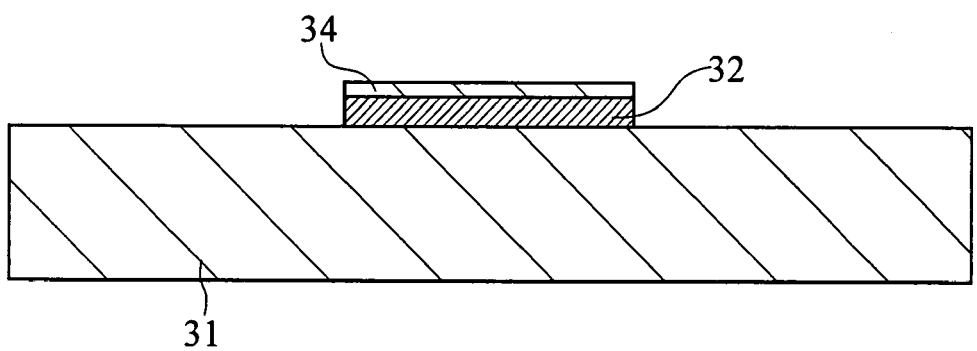
(a)
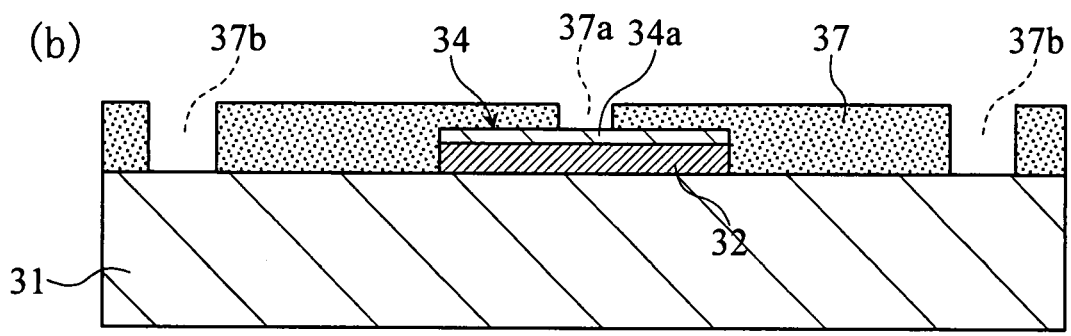
(b)
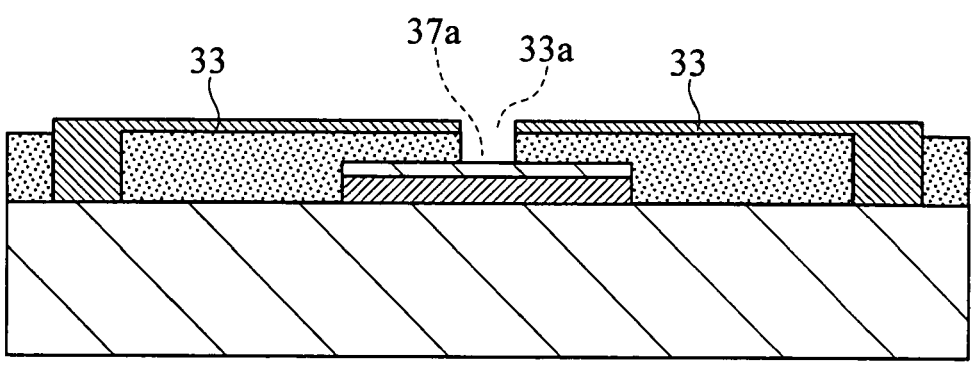
(c)
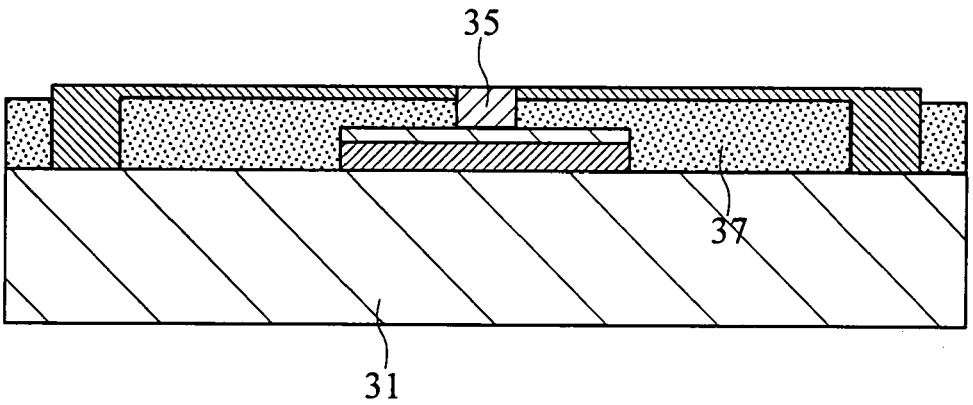
(d)

FIG. 77
(a)
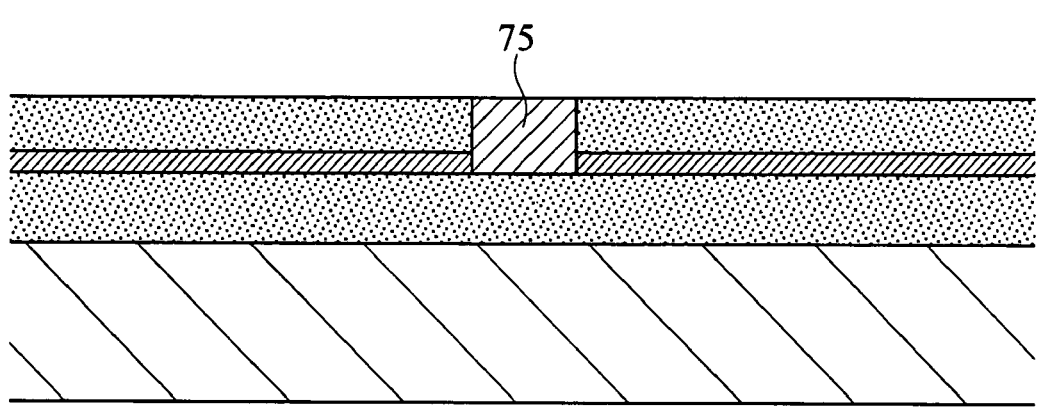
(b)
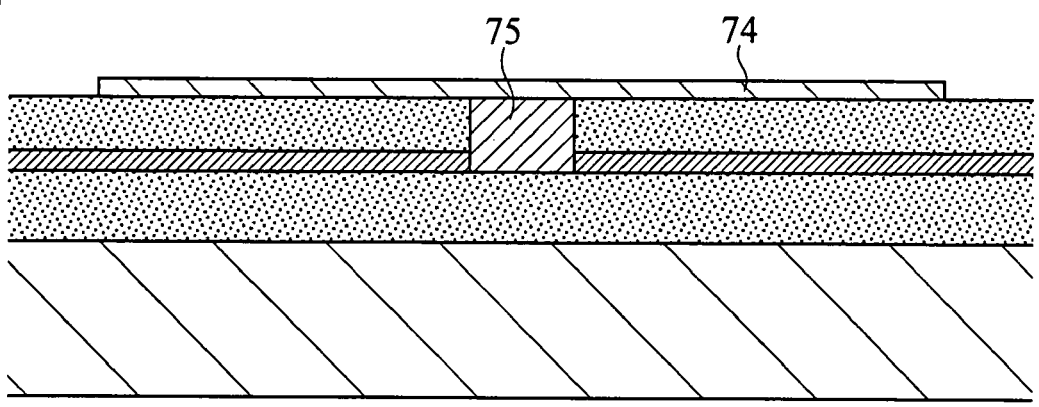
(c)
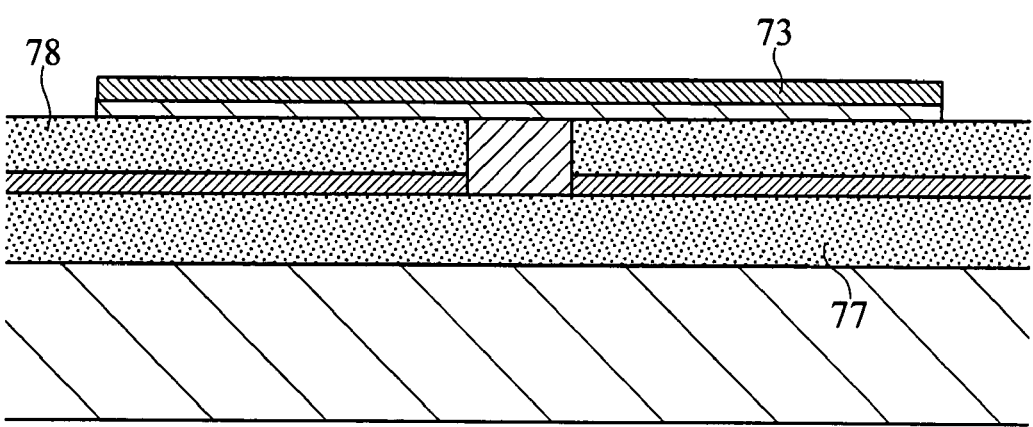

FIG. 82
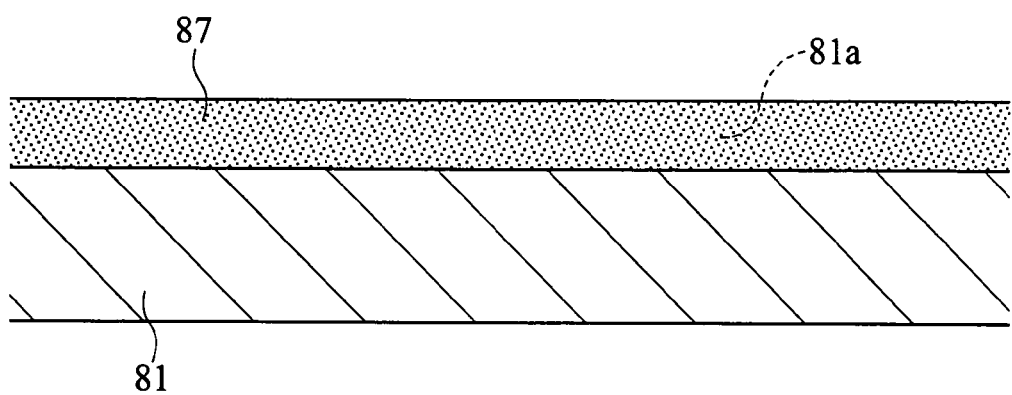
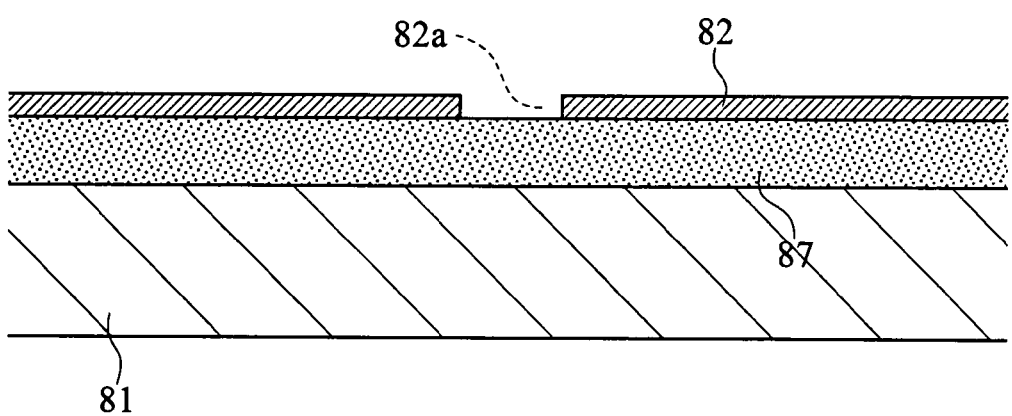
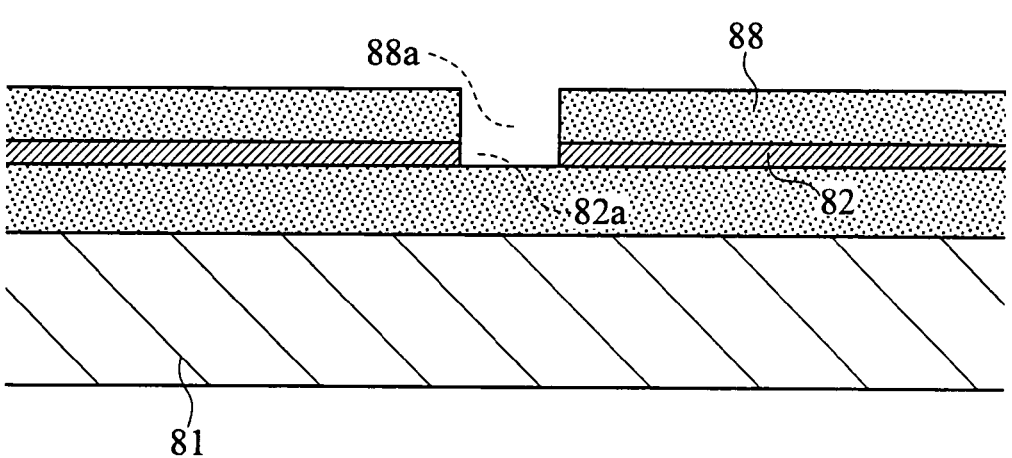

FIG. 83
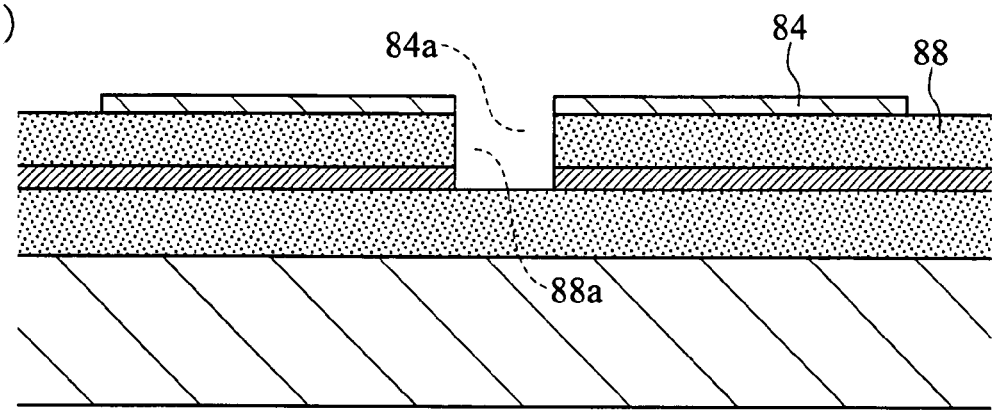
(a)
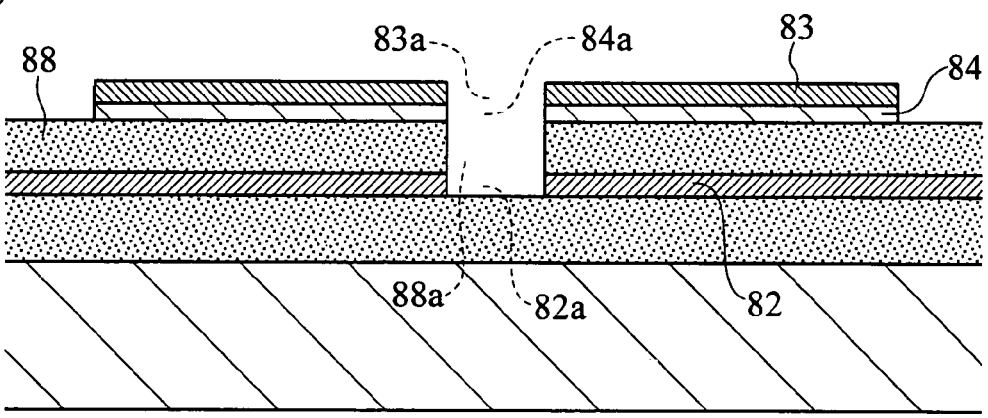
(b)
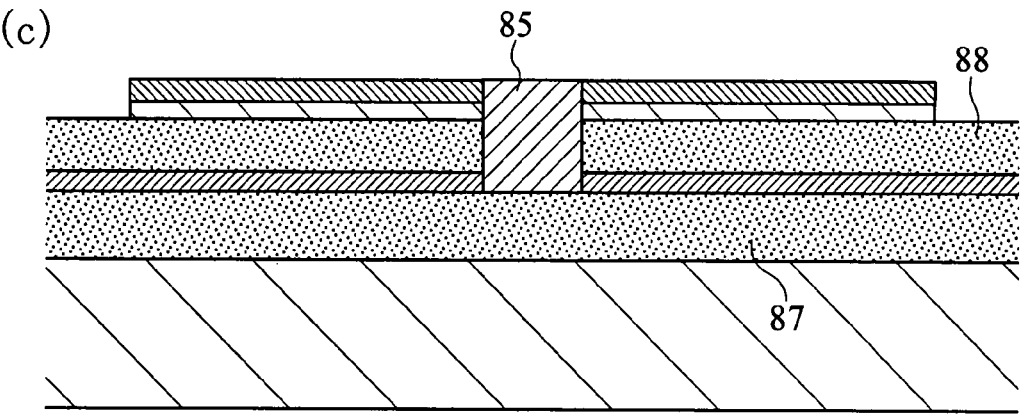
(c)

VARIABLE CAPACITOR AND METHOD OF MAKING THE SAME

BACKGROUND OF THE INVENTION

1. Field of the Invention

The present invention relates to variable capacitors, and to a method of making them.

2. Description of the Related Art

There is an increasing requirement in the field of radio communications apparatuses such as mobile telephones, for smaller high-frequency circuits or RF circuits in order to cope with increase in the number of parts necessary to be mounted for advanced functions. In response to the requirement, numerous efforts have been made for miniaturization of parts or devices which constitute the circuits, using MEMS (microelectromechanical systems) technologies. Variable capacitors are one of such parts. Variable capacitors are essential in variable frequency transmitters, tuning amplifiers, impedance matcher circuits and so on. Variable capacitors manufactured by using the MEMS technology are disclosed in the following Patent Documents 1 and 2 for example.

Patent Document 1: JP-A-2004-6588
Patent Document 2: JP-A-2004-127973

FIG. 86 is a partial sectional view of a conventional variable capacitor Y. The variable capacitor Y includes a substrate 91, a fixed electrode 92, a movable electrode 93 and a pair of supporting portions 94. The movable electrode 93 is formed to bridge the supporting portions 94, and has a portion which faces the fixed electrode 92. The substrate 91 is made of a silicon material, while the fixed electrode 92 and the movable electrode 93 are made of a metal material.

In the variable capacitor Y, an electrostatic attraction is generated when a voltage is applied between the fixed electrode 92 and the movable electrode 93. By using the electrostatic attraction, it is possible to draw the movable electrode 93 toward the fixed electrode 92 thereby varying the distance between the fixed electrode 92 and the movable electrode 93. The electrostatic capacitance of the variable capacitor Y, i.e. the electrostatic capacitance between the fixed electrode 92 and the movable electrode 93, changes in accordance with the distance. Therefore, according to the variable capacitor Y, it is possible to vary the electrostatic capacitance by varying the voltage which is applied between the fixed electrode 92 and the movable electrode 93. With such a structure, the variable capacitor Y is driven so that a predetermined voltage is applied between the fixed electrode 92 and the movable electrode 93 for obtaining a predetermined electrostatic capacitance.

In the conventional variable capacitor Y, temperature changes (e.g. a temperature increase) can easily cause the movable electrode 93 to curve as shown in FIG. 87 and FIG. 88 for example, even when the device is not being driven (when no voltage is applied between the fixed electrode 92 and the movable electrode 93). Such a curving of the movable electrode 93 is caused by a greater thermal expansion rate of the movable electrode 93 than that of the substrate 91.

The distance between the movable electrode 93 and the fixed electrode 92 when the movable electrode 93 is already curved in the initial state (the state when the device is not driven) as shown in FIG. 87 and FIG. 88 is different from the distance between the movable electrode 93 and the fixed electrode 92 when the movable electrode 93 is not curved in the initial state as shown in FIG. 86. Presence or absence and the extent of the curvature of the movable electrode 93 in the non-operating state change the initial electrostatic capacitance of the variable capacitor Y in the non-operating state. Further, the presence or absence and the extent of the curvature of the movable electrode 93 in the non-operating state also change the relationship between the electrostatic capacitance and the driving voltage (the voltage to be applied in order to obtain a predetermined electrostatic capacitance) in the operation of the variable capacitor Y. The degree of change in these factors is relatively large in the conventional variable capacitor Y.

SUMMARY OF THE INVENTION

The present invention has been proposed under the above-described circumstances. It is therefore an object of the present invention to provide a variable capacitor suitable for reducing electrostatic capacitance inconsistency caused by temperature changes. Another object of the present invention is to provide a method of making such a variable capacitor.

According to a first aspect of the present invention, there is provided a variable capacitor. The variable capacitor includes a fixed electrode, a movable electrode film facing the fixed electrode, and an anchor portion (made of a dielectric material) which provides a partial connection between the fixed electrode and the movable electrode film.

According to the present variable capacitor, it is possible to generate an electrostatic attraction between the fixed electrode and the movable electrode film by applying a voltage between the fixed electrode and the movable electrode film, and by using the electrostatic attraction, it is possible to draw part of the movable electrode film toward the fixed electrode, excluding a region (junction) of the movable electrode film which is bonded to the anchor portion, and thereby varying the volume of a gap between the fixed electrode and the movable electrode film. (The amount or the distance of the drawing movement of the movable electrode film toward the fixed electrode is not uniform over the entire movable electrode film. The junction in the movable electrode film is not moved at all, and regions of the movable electrode film closer to the junction tend to be drawn by a smaller amount). The electrostatic capacitance of the variable capacitor, i.e. the electrostatic capacitance between the fixed electrode and the movable electrode film, varies in accordance with the gap volume. Therefore, according to the present variable capacitor, it is possible to control the electrostatic capacitance by controlling the drive voltage which is applied between the fixed electrode and the movable electrode film.

Further, according to the present variable capacitor, the movable electrode film is partially connected with or joined on the fixed electrode by the anchor portion. This reduces shape deformation or curving of the movable electrode film caused by temperature changes both in operation and in non-operation. For example, in a case where the fixed electrode is provided on a predetermined substrate, shape deformation or curving of the movable electrode film caused by temperature changes becomes less even if the thermal expansion rate of the movable electrode film differs from the thermal expansion rate of the substrate, and even if the difference is relatively large. Since curving of the movable electrode film is reduced in its initial shape (the shape in non-operation), inconsistency in initial electrostatic capacitance during non-operation is reduced in the present variable capacitor. Further, because of the reduced shape deformation of the movable electrode film caused by temperature changes both during operation and during non-operation, inconsistency in operational relationship between electrostatic capacitance and drive voltage is reduced also. As described, the present variable capacitor is well suited to reduce electrostatic capacitance inconsistency caused by temperature changes. The variable capacitor as described above is able to operate highly accurately.

Preferably, the anchor portion penetrates the fixed electrode and/or the movable electrode film. According to such an arrangement, at least one of the fixed electrode and the movable electrode film has a through hole or an opening to be fitted by the anchor portion. The fixed electrode does not have any portion which faces the movable electrode film via the anchor portion, nor does the movable electrode film have any portion which faces the fixed electrode via the anchor portion. In other words, there is no partial capacitor structure which has an invariable electrode-to-electrode distance via the anchor portion (and therefore has a fixed electrostatic capacitance). If a variable capacitor includes a partial capacitor structure which has a fixed electrostatic capacitance, a minimum electrostatic capacitance for the entire variable capacitor cannot be smaller than the fixed electrostatic capacitance. On the contrary, a variable capacitor which does not include any partial capacitor structure that has a fixed electrostatic capacitance does not have such a limitation to the minimum electrostatic capacitance for the entire variable capacitor. A variable capacitor which does not include any partial capacitor structure that has a fixed electrostatic capacitance is preferable when the device has to provide a small minimum electrostatic capacitance, and therefore preferable in achieving a large rate or amount of variation. As described, the arrangement where the anchor portion penetrates the fixed electrode and/or the movable electrode film is suitable for achieving a large rate or amount of variation.

Preferably, in the present variable capacitor, the fixed electrode is provided with a dielectric film on a side facing the movable electrode film and/or the movable electrode film is provided with a dielectric film on a side facing the fixed electrode. Such an arrangement as the above appropriately prevents direct contact between the fixed electrode and the movable electrode film. If a dielectric film is provided, then part of the dielectric film may constitute at least part of the anchor portion.

Preferably, the movable electrode film has a portion contactable with the fixed electrode via the dielectric film. Alternatively to or in addition to such an arrangement as the above, the movable electrode film may have a portion contacting with the fixed electrode via the dielectric film. These arrangements are suitable in achieving a large rate or amount of variation in the electrostatic capacitance. When embodying these arrangements, it is preferable that the movable electrode film has a portion curved toward the fixed electrode, or a portion curved away from the fixed electrode.

A second aspect of the present invention provides a variable capacitor. The variable capacitor includes: a first movable electrode film and a second movable electrode film facing each other; and an anchor portion (made of a dielectric material) which provides a partial connection between the mutually opposed first movable electrode film and second movable electrode film.

According to the present variable capacitor, it is possible to generate an electrostatic attraction between the first movable electrode film and the second movable electrode film by applying a voltage between the first movable electrode films and the second movable electrode film, and by using the electrostatic attraction, it is possible to draw the movable electrode films closely to each other, excluding the regions (junctions) of these movable electrode films which are bonded to the anchor portion, and thereby varying the volume of a gap between the movable electrode films. The electrostatic capacitance of the present variable capacitor, i.e. the electrostatic capacitance between the movable electrode films, varies in accordance with the gap volume. Therefore, according to the present variable capacitor, it is possible to control the electrostatic capacitance by controlling the drive voltage which is applied between the first and the second movable electrode films.

Further, according to the present variable capacitor, the first and the second movable electrode films are partially connected with or joined on each other by the anchor portion. This reduces shape deformation or curving of the first and the second movable electrode films caused by temperature changes both in operation and in non-operation. Since curving of both movable electrode films is reduced in their initial shapes (the shapes in non-operation), inconsistency in initial electrostatic capacitance during non-operation is reduced in the present variable capacitor. Further, because of the reduced shape deformation of both movable electrode films caused by temperature changes during operation and during non-operation, inconsistency in operational relationship between electrostatic capacitance and drive voltage is reduced also. As described, the present variable capacitor is well suited to reduce electrostatic capacitance inconsistency caused by temperature changes. Such a variable capacitor as the above is well suited to operate highly accurately.

Preferably, the anchor portion penetrates the first movable electrode film and/or the second movable electrode film. According to such an arrangement, at least one of the first movable electrode film and the second movable electrode film has a through hole or an opening to be fitted by the anchor portion. The first movable electrode film does not have any portion which faces the second movable electrode film via the anchor portion, nor does the second movable electrode film have any portion which faces the first movable electrode film via the anchor portion. In other words, there is no partial capacitor structure which has an invariable electrode-to-electrode distance via the anchor portion (and therefore has a fixed electrostatic capacitance). As described earlier, a variable capacitor which does not include any partial capacitor structure that has a fixed electrostatic capacitance is preferable when the device has to provide a small minimum electrostatic capacitance, and therefore preferable in achieving a large rate or amount of variation. As described, the arrangement where the anchor portion penetrates the first movable electrode film and/or the second movable electrode film is suitable for achieving a large rate or amount of variation.

Preferably, according to the present variable capacitor, the first electrode film is provided with a dielectric film on a side facing the second movable electrode film and/or the second movable electrode film is provided with a dielectric film on a side facing the first electrode film. Such an arrangement appropriately prevents the first and the second movable electrode films from directly contacting with each other. If a dielectric film is provided, the dielectric film may have a portion which constitutes at least part of the anchor portion.

Preferably, the first and the second movable electrode films are contactable with each other via the dielectric film. Alternatively to or in addition to such an arrangement, the first and the second movable electrode films may contact partially with each other via the dielectric film. These arrangements are suitable in achieving a large rate or amount of variation in the electrostatic capacitance. When embodying these arrangements, it is preferable that the first movable electrode film has a portion curved toward the second movable electrode film, or a portion curved away from the second movable electrode film. Also, it is preferable that the second movable electrode film has a portion curved toward the first movable electrode film, or a portion curved away from the first movable electrode film.

A third aspect of the present invention provides a method of making a variable capacitor. The method includes: a step of forming a first electrode on a substrate; a step of forming an anchor portion on the first electrode; a step of forming a sacrifice film which covers the first electrode while partially exposing the anchor portion; a step of forming a second electrode bonded to the anchor portion, on the sacrifice film; and a step of removing the sacrifice film.

A fourth aspect of the present invention provides a method of making a variable capacitor. The method includes: a step of forming a first electrode which has an opening, on a substrate; a step of forming an anchor portion which has a part fitting into the opening and a part projecting on the first electrode; a step of forming a sacrifice film which covers the first electrode while partially exposing the anchor portion; a step of forming a second electrode bonded to the anchor portion, on the sacrifice film; and a step of removing the sacrifice film.

A fifth aspect of the present invention provides a method of making a variable capacitor. The method includes: a step of forming a first electrode on a substrate; a step of forming a sacrifice film which covers the first electrode but has a first opening for partial exposure of the first electrode; a step of forming a second electrode which has a second opening communicating with the first opening, on the sacrifice film; a step of forming an anchor portion which penetrates the sacrifice film and the second electrode on the first electrode, by filling at least the first opening and the second opening with a material; and a step of removing the sacrifice film.

A sixth aspect of the present invention provides a method of making a variable capacitor. The method includes: a step of forming a first electrode which has a first opening, on a substrate; a step of forming a sacrifice film which has a second opening communicating with the first opening and covers the first electrode; a step of forming a second electrode which has a third opening communicating with the second opening, on the sacrifice film; a step of forming an anchor portion which penetrates the first electrode, the sacrifice film and the second electrode, by filling at least the first opening, the second opening and the third opening with a material; and a step of removing the sacrifice film.

The methods of making a variable capacitor provided by the third through the sixth aspects of the present invention enable one to manufacture the variable capacitors according to the first and the second aspects.

Other features and advantages of the present invention will become apparent from the detailed description given below with reference to the accompanying drawings.

BRIEF DESCRIPTION OF THE DRAWINGS

FIG. 50 shows part of a method of making the variable capacitor in FIG. 45.

FIG. 77 shows steps continued from FIG. 76.

FIG. 82 shows part of a method of making the variable capacitor in FIG. 80.

FIG. 83 shows steps continued from FIG. 82.

DETAILED DESCRIPTION OF THE PREFERRED EMBODIMENTS

Figure 1:
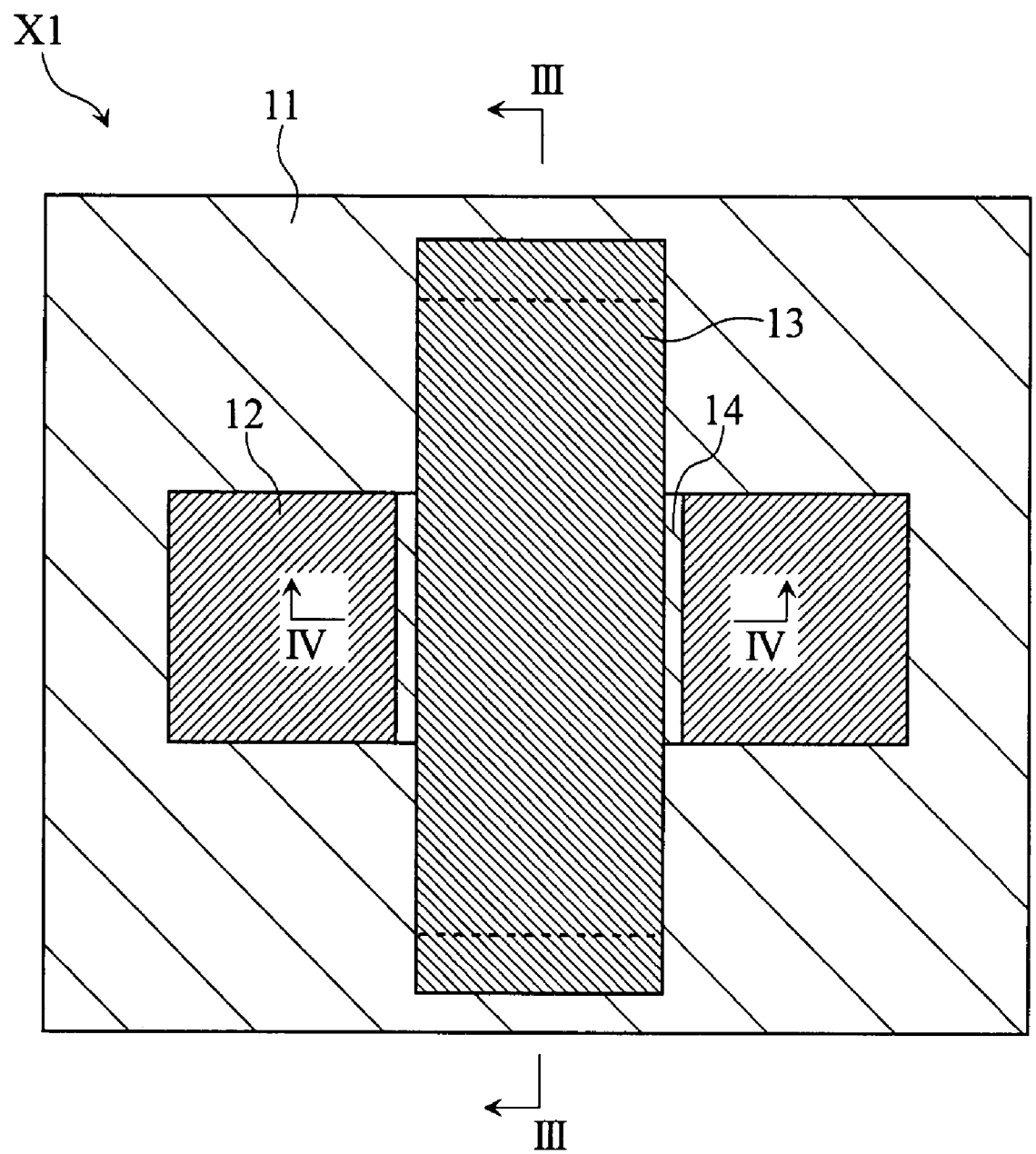
FIG. 1 is a plan view of a variable capacitor according to a first embodiment of the present invention.
Figure 2:
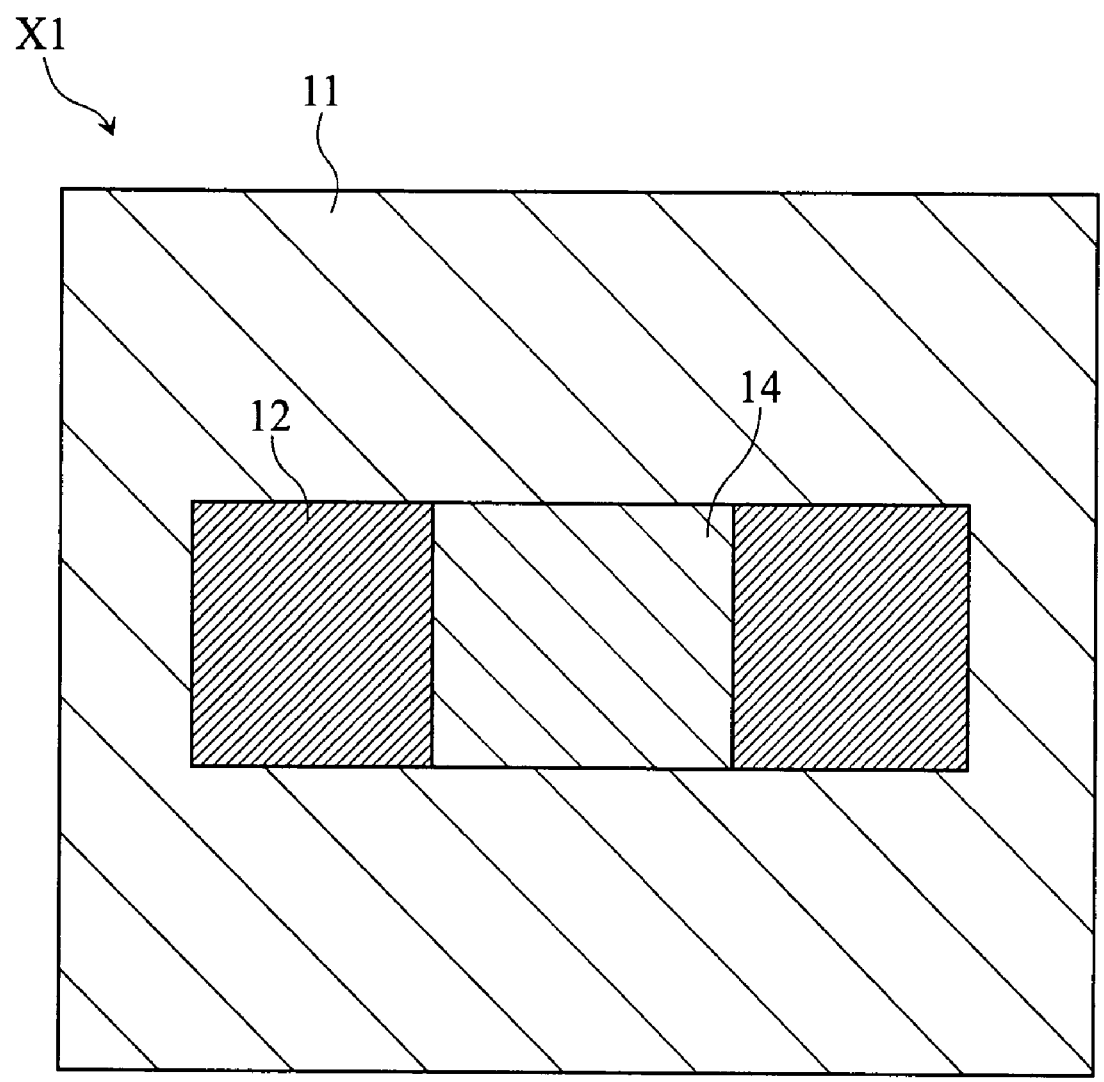
FIG. 2 is a partially unillustrated plan view of the variable capacitor according to the first embodiment of the present invention.
Figure 3:
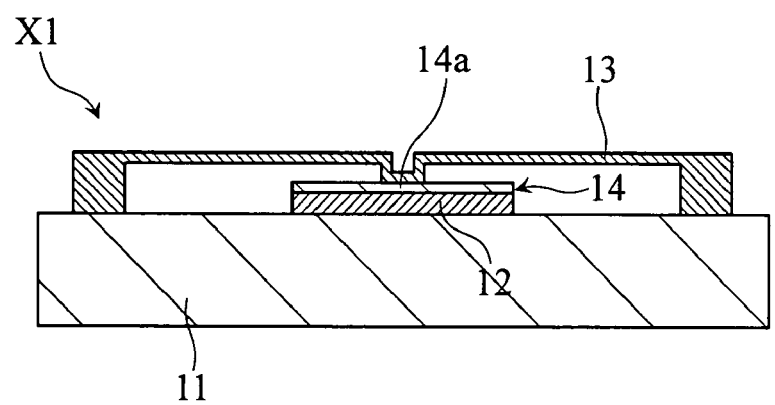
FIG. 3 is a sectional view taken in lines III-III in FIG. 1.
Figure 4:
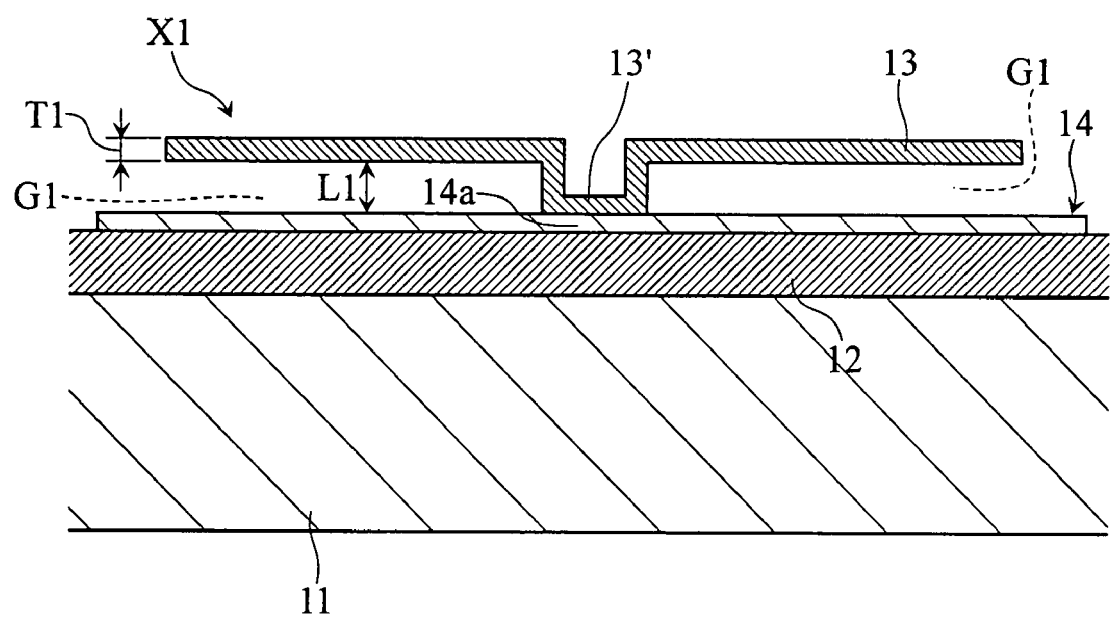
FIG. 4 is an enlarged partial sectional view taken in lines IV-IV in FIG. 1.

FIG. 1 through FIG. 4 show a variable capacitor X1 according to a first embodiment of the present invention. FIG. 1 is a plan view of the variable capacitor X1. FIG. 2 is a partially unillustrated plan view of the variable capacitor X1. FIG. 3 is a sectional view taken in lines III-III in FIG. 1. FIG. 4 is an enlarged partial sectional view taken in lines IV-IV in FIG. 1.

The variable capacitor X1 includes a substrate 11, a fixed electrode 12, a movable electrode 13 (not illustrated in FIG. 2), and a dielectric film 14. The substrate 11 is made of a silicon material for example. The fixed electrode 12 is formed on the substrate 11. The movable electrode 13 is built on the substrate 11. The movable electrode 13 has a thickness T1 as shown in FIG. 4, of 1 through 2 µm for example. As shown clearly in FIG. 1, the fixed electrode 12 and the movable electrode 13 cross each other, opposing partially to each other. The opposed region has an area of 10000 through 40000 µm² for example. A distance L1 in FIG. 4 between the fixed electrode 12 and the movable electrode 13 is 0.5 through 2 µm for example. Preferably, one of the fixed electrode 12 and the movable electrode 13 is grounded. The fixed electrode 12 and the movable electrode 13 as described are formed of electrically conductive materials such as aluminum (Al) and copper (Cu). The dielectric film 14 is formed on the fixed electrode 12, on a side facing the movable electrode 13, and includes an anchor portion 14a as shown in FIG. 3 and FIG. 4. The dielectric film 14 appropriately prevents the fixed electrode 12 and the movable electrode 13 from contacting directly with each other. The anchor portion 14a is sandwiched between the fixed electrode 12 and the movable electrode 13, providing partial connection between the fixed electrode 12 and the movable electrode 13. The dielectric film 14 has a thickness of 0.1 through 0.5 µm for example. The dielectric film 14 is formed of a dielectric material such as alumina ($Al_2O_3$), silicon oxide ($SiO_2$) and silicon nitride (SiN$_x$). A predetermined wiring pattern (not illustrated) electrically connected with the fixed electrode 12 or the movable electrode 13 is formed on the substrate 11.

Figure 5:
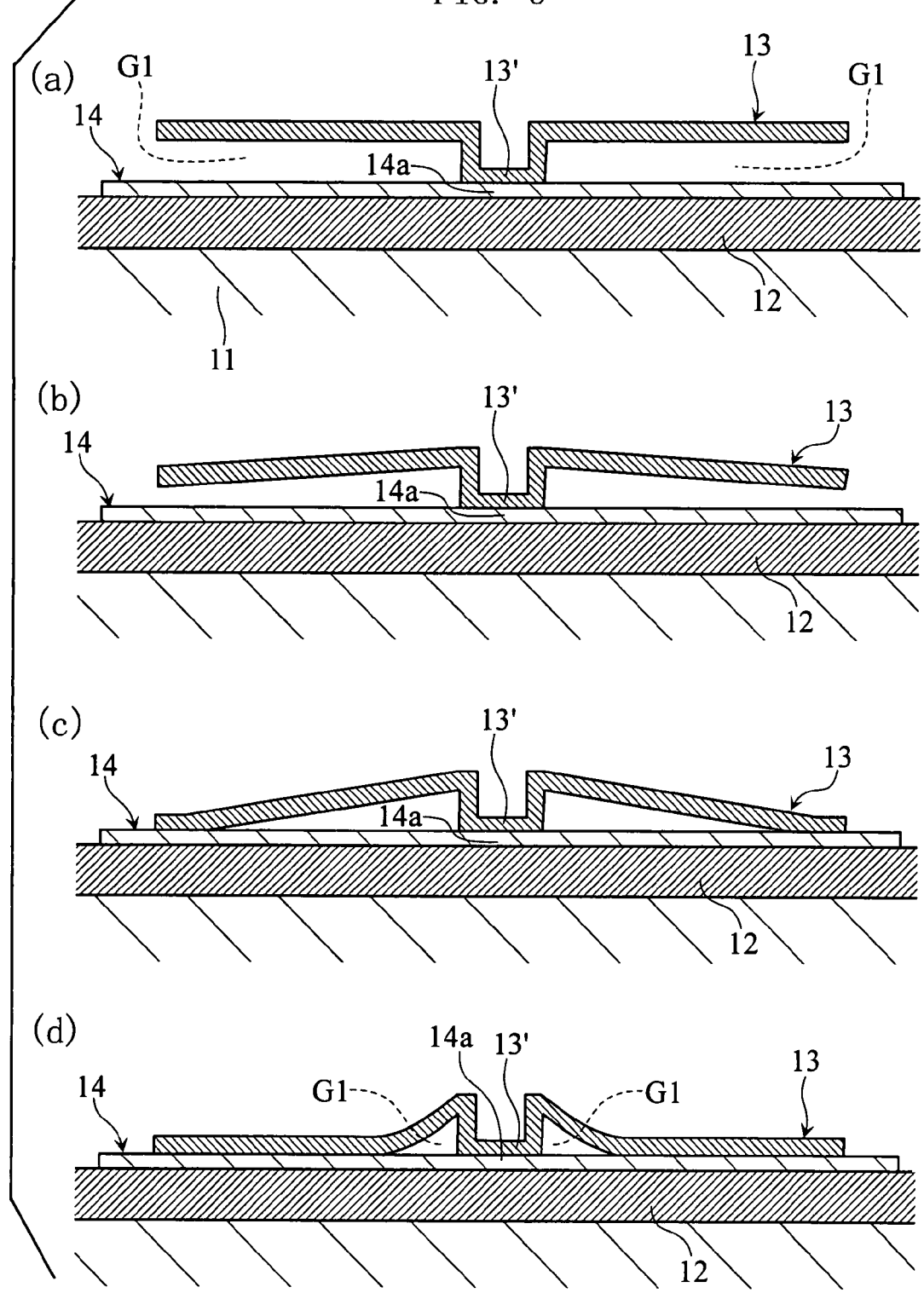
FIG. 5 shows different states of operation of the variable capacitor in FIG. 1.

According to the variable capacitor X1 which has the constitution as described above, it is possible to generate an electrostatic attraction between the fixed electrode 12 and the movable electrode 13 by applying a voltage between the fixed electrode 12 and the movable electrode 13, and by using the electrostatic attraction, it is possible to draw part of the movable electrode 13 faced by the fixed electrode 12 toward the fixed electrode 12, excluding the region bonded to the anchor portion 14a (junction 13'), and thereby varying the volume of a gap G1 between the fixed electrode 12 and the movable electrode 13 as shown in FIG. 5. (The amount or the distance of the drawing movement toward the fixed electrode 12 is not uniform over the entire region of the movable electrode 13 which faces the fixed electrode 12. The junction 13' is not moved at all, and regions of the movable electrode 13 closer to the junction 13' tend to be drawn by a smaller amount). The electrostatic capacitance of the variable capacitor X1 varies in accordance with the gap volume. Therefore, according to the variable capacitor X1, it is possible to control the electrostatic capacitance by controlling the drive voltage (0 through 20 V for example) which is applied between the fixed electrode 12 and the movable electrode 13.

Further, according to the variable capacitor X1, the movable electrode 13 is partially connected with or joined on the fixed electrode 12 at the anchor portion 14a; this reduces shape deformation or curving of the movable electrode 13 caused by temperature changes both in operation and in non-operation. Specifically, shape deformation or curving of the movable electrode 13 caused by temperature changes becomes less even if the thermal expansion rate of the movable electrode 93 differs from the thermal expansion rate of the substrate 91, and even if the difference is relatively large. Since curving of the movable electrode 13 is reduced in its initial shape (the shape in non-operation), inconsistency in initial electrostatic capacitance (0.5 through 1 pF for example) during non-operation is reduced in the variable capacitor X1. Further, because of the reduced shape deformation of the movable electrode 13 caused by temperature changes both during operation and during non-operation, inconsistency in the relationship between electrostatic capacitance and drive voltage is reduced also. As described, the variable capacitor X1 is well suited to reduce electrostatic capacitance inconsistency caused by temperature changes. The variable capacitor X1 as described above is able to operate highly accurately.

In addition, according to the variable capacitor X1, it becomes possible to vary the electrostatic capacitance widely. In the conventional variable capacitor Y, the movable electrode 93 must be moved within a limited range in order to avoid so called pull-in phenomenon. The pull-in phenomenon is a phenomenon that when the variable capacitor Y for example is driven, the entire region of the movable electrode 93 facing the fixed electrode 92 is drawn swiftly onto the fixed electrode 92. A reason for this to happen is that when the device is driven, the movable electrode 93 is drawn toward the fixed electrode 92 substantially evenly or by substantially the same amount, over the entire opposed region. The pull-in phenomenon is likely to occur when the distance between the paired capacitor electrodes (the fixed electrode 92 and the movable electrode 93) in the variable capacitor (variable capacitor Y) becomes smaller than two-thirds of the original distance which is the distance when the capacitor electrodes are at their initial positions. Once a pull-in phenomenon occurs, the variable capacitor becomes virtually incontrollable. In order to avoid the pull-in phenomenon such as the above, the movement range for the movable electrode 93 is limited in the conventional variable capacitor Y, so it is not possible to vary the electrostatic capacitance over a wide range. On the contrary, according to the variable capacitor X1 provided by the present invention, the amount of movement caused by the pull toward the fixed electrode 12 when the device is driven is not even over the entire opposed region of the movable electrode 13 or the region facing the fixed electrode 12, and as shown in FIG. 5(c) and FIG. 5(d), it is possible to make the movable electrode 13 partially contact with, or pressed against, the fixed electrode 12 via the dielectric film 14, and further to control the area of partial contact. Hence, according to the variable capacitor X1, it is possible to vary the gap volume between the fixed electrode 12 and the movable electrode 13 widely from the initial state shown in FIG. 5(a) to the state where the area of contact between the fixed electrode 12 and the movable electrode 13 via the dielectric film 14 reaches a maximum value (e.g. the state as shown in FIG. 5(d)). Therefore, the variable capacitor X1 is capable of offering a large amount or rate, of electrostatic capacitance variation.

Figure 6:
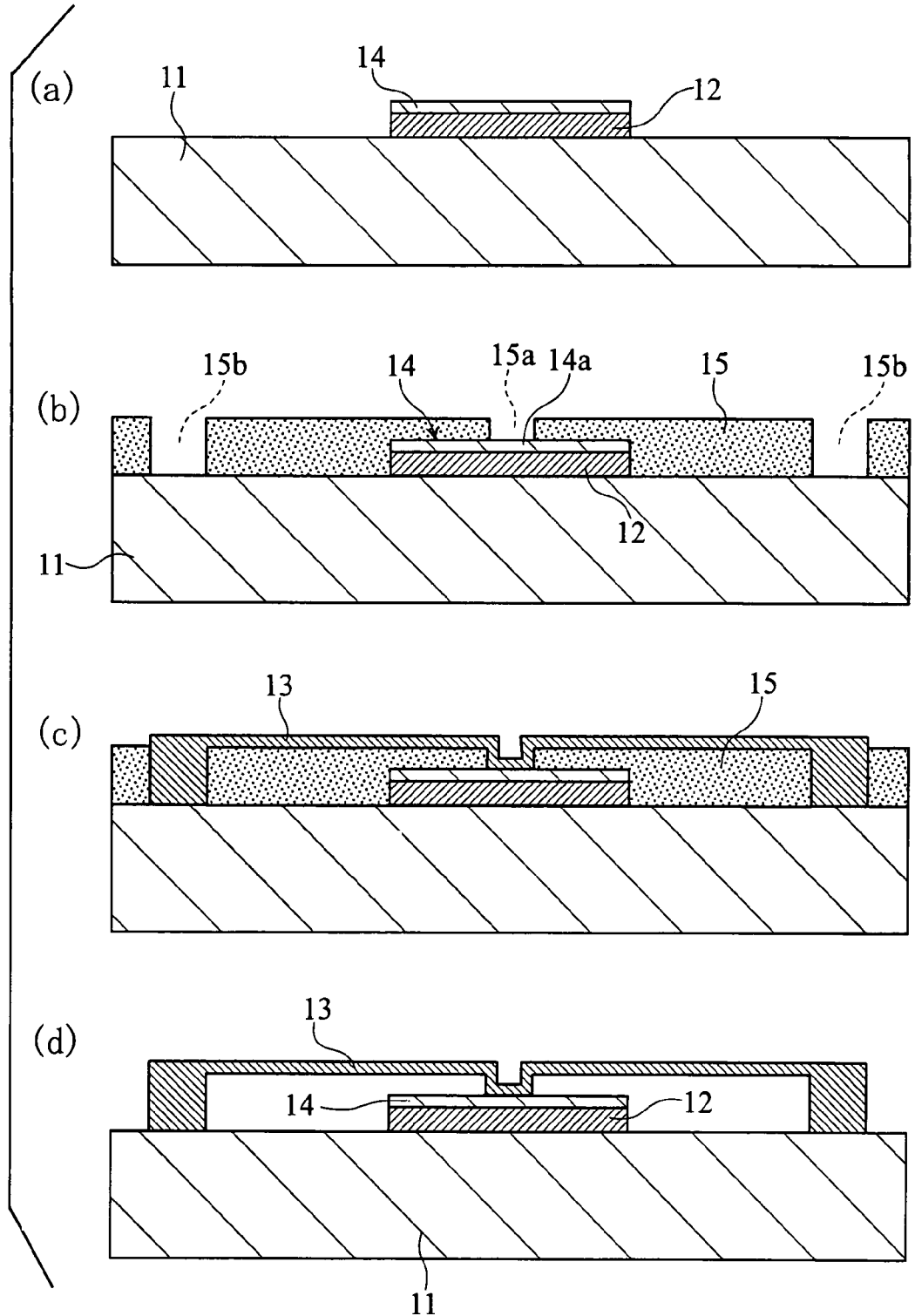
FIG. 6 shows a method of making the variable capacitor in FIG. 1.

FIG. 6 shows a method of making the variable capacitor X1, in a series of sectional views each corresponding to the section shown in FIG. 3. The present method uses so called MEMS technology for the manufacture of the variable capacitor X1.

In the manufacture of the variable capacitor X1, first as shown in FIG. 6(a), a fixed electrode 12 and a dielectric film 14 are formed in lamination on a substrate 11. The dielectric film 14 can be formed by patterning on a film of aluminum for example; by first forming a film of aluminum on the substrate 11 by sputtering, then forming a film of Al$_2$O$_3$ on the Al film by sputtering, and finally etching the Al$_2$O$_3$ film via a mask of a predetermined resist pattern. The fixed electrode 12 can also be patterned on the substrate 11 by etching the film of aluminum via a mask of another predetermined resist pattern.

Next, as shown in FIG. 6(b), a sacrifice film 15 is formed. The sacrifice film 15 has an opening 15a for partially exposing the dielectric film 14, and openings 15b for partially exposing the substrate 11. The region of the dielectric film 14 exposed by the opening 15a will become the anchor portion 14a described earlier. The sacrifice film 15 is provided by a photoresist for example. The sacrifice film 15 can be formed by e.g. first forming a film of sacrifice material by sputtering on the substrate to cover the fixed electrode 12 and the dielectric film 14, and then etching the film via a mask of a predetermined resist pattern. By controlling the thickness of the sacrifice film 15 formed in this step, it is possible to control the initial-state distance L1 between the fixed electrode 12 and the movable electrode 13 in the variable capacitor X1 obtained.

Next, as shown in FIG. 6(c), a movable electrode 13 is formed. The movable electrode 13 is formed by e.g. first forming a film of aluminum on the sacrifice film 15 and in the openings 15a, 15b by sputtering, and then etching the Al film via a mask of a predetermined resist pattern. The movable electrode 13 thus formed is bonded to the dielectric film 14 in the opening 15a of the sacrifice film 15, and to the substrate 11 in the openings 15b. Note that for the sake of simplicity in the drawing, the two ends of movable electrode 13 are shown as formed by filling the openings 15b of the sacrifice film 15 with an electrically conductive material.

Next, as shown in FIG. 6(d), the sacrifice film 15 is removed. Specifically, the sacrifice film 15 is removed by wet etching method using a predetermined resist remover. By following the above-described steps, the variable capacitor X1 can be manufactured successfully.

Figure 7:
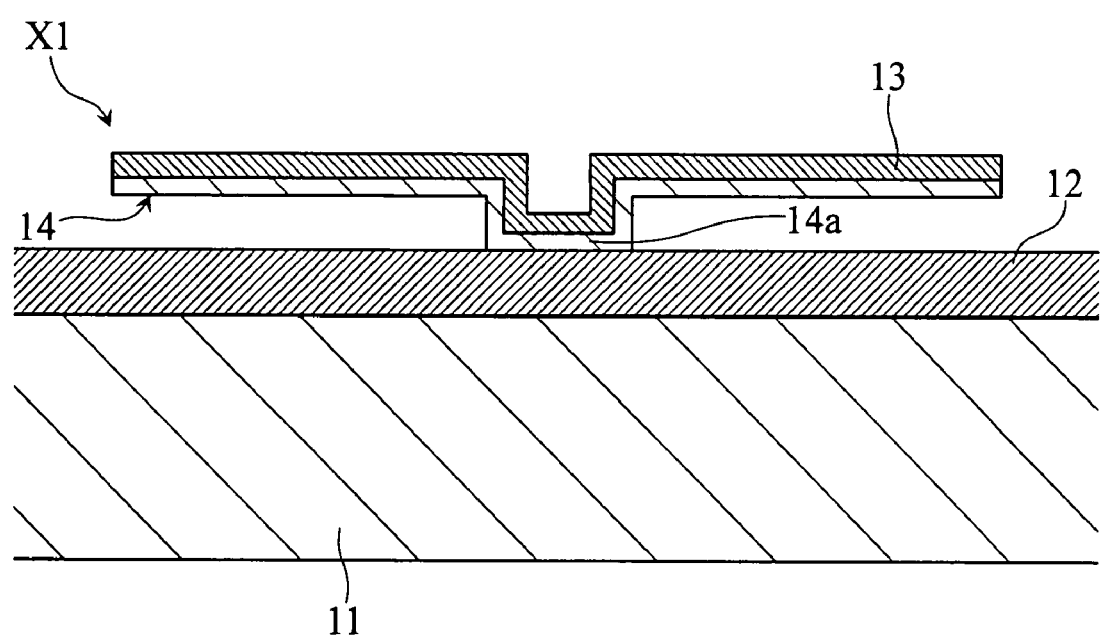
FIG. 7 is a sectional view of a first variation of the variable capacitor in FIG. 1.

FIG. 7 is a sectional view of a first variation of the variable capacitor X1. The view corresponds to FIG. 4 which shows a section of the variable capacitor X1 in FIG. 1. In the variable capacitor X1, a dielectric film 14 is formed on the fixed electrode 12, on the side facing the movable electrode 13; instead of this arrangement, a dielectric film 14 may be formed on the movable electrode 13, on the side facing the fixed electrode 12 as shown in FIG. 7.

Figure 8:
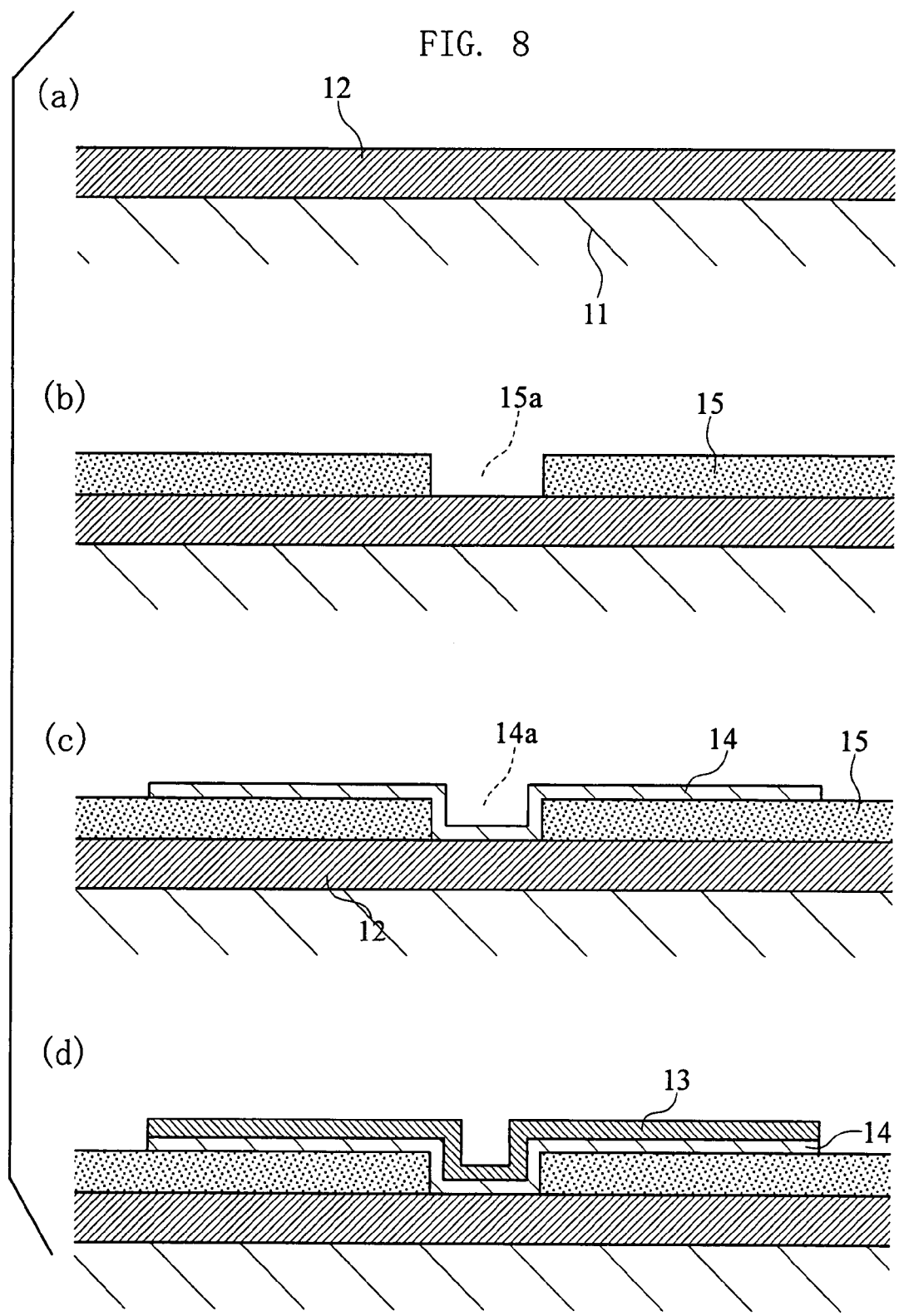
FIG. 8 shows a method of making the variable capacitor in FIG. 7.

FIG. 8 shows a method of making the first variation, in a series of sectional views each corresponding to the section shown in FIG. 7. In the present method, first, a fixed electrode 12 is formed on a substrate 11 as shown in FIG. 8(a). Next, as shown in FIG. 8(b), a sacrifice film 15 is formed. The sacrifice film 15 has an opening 15a for partially exposing the fixed electrode 12, and another opening for partially exposing the substrate 11 as described with reference to FIG. 6(b). Next, as shown in FIG. 8(c), a dielectric film 14 is formed on the sacrifice film 15 and in the opening 15a. Thus, a part of the dielectric film 14 formed in the opening 15a will be an anchor portion 14a which connects the fixed electrode 12 with the movable electrode 13. Next, as shown in FIG. 8(d), the movable electrode 13 is formed, and thereafter, the sacrifice film 15 is removed by wet etching. By following the above-described steps, the first variation in FIG. 7 of the variable capacitor X1 can be manufactured successfully.

Figure 9:
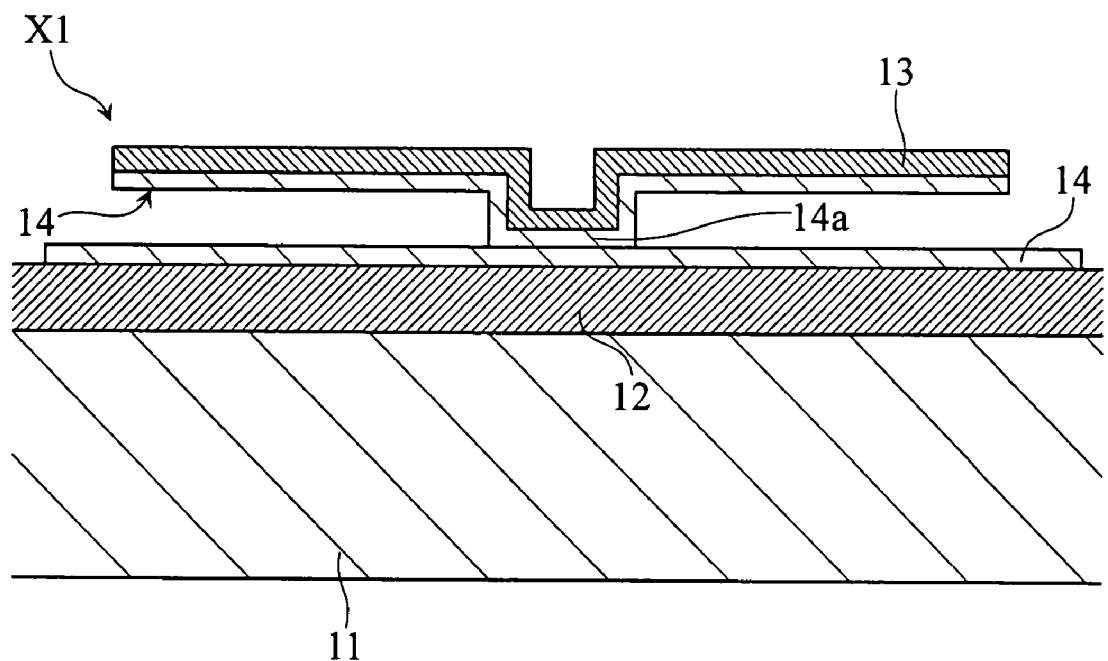
FIG. 9 is a sectional view of a second variation of the variable capacitor in FIG. 1.

FIG. 9 is a sectional view of a second variation of the variable capacitor X1. The view corresponds to FIG. 4 which shows a section of the variable capacitor X1 in FIG. 1. In the variable capacitor X1, a dielectric film 14 is formed on the fixed electrode 12, on the side facing the movable electrode 13; In addition to this, a dielectric film 14 may also be formed on the movable electrode 13, on the side facing the fixed electrode 12 as shown in FIG. 9.

Figure 10:
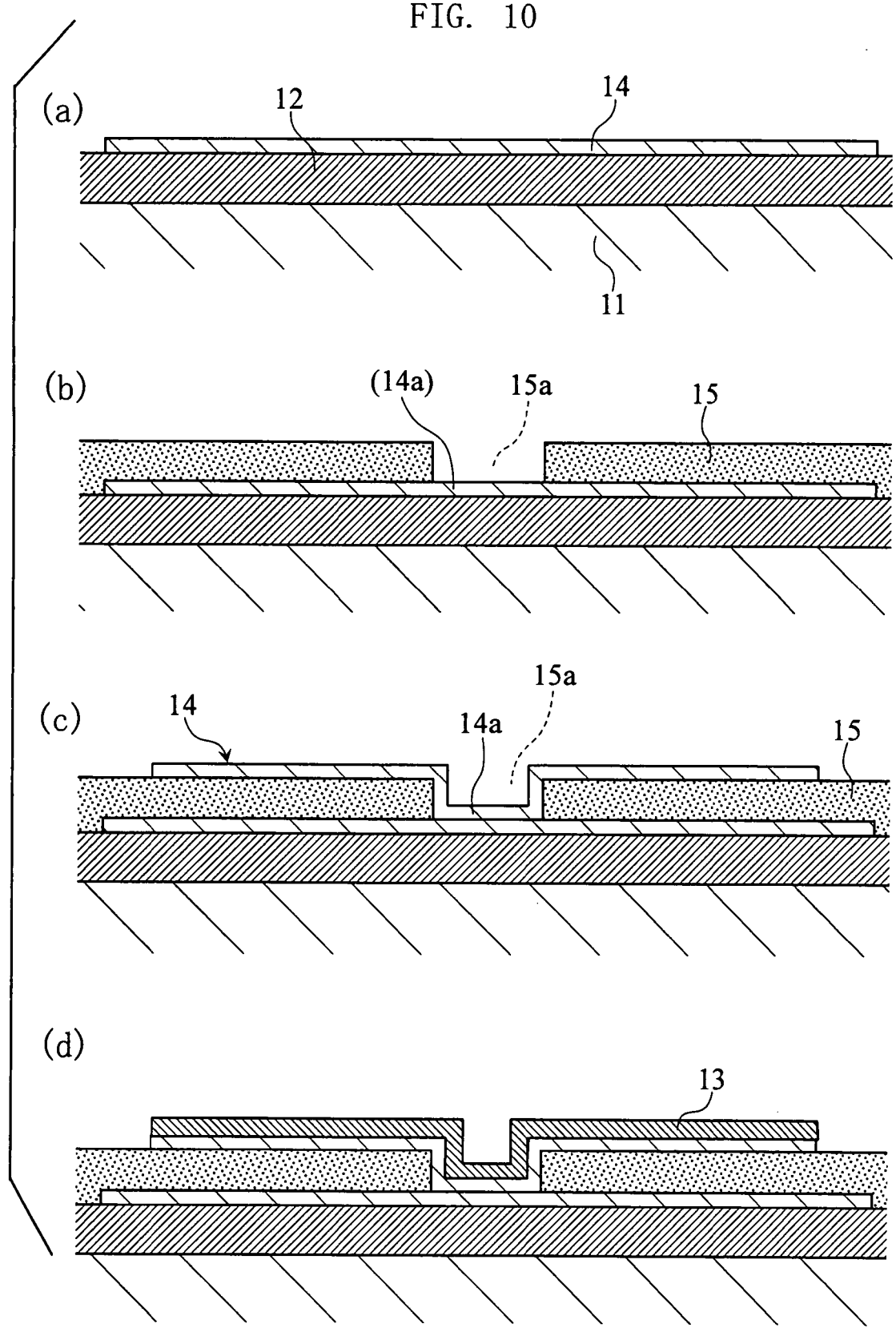
FIG. 10 shows a method of making the variable capacitor in FIG. 9.

FIG. 10 shows a method of making the second variation, in a series of sectional views each corresponding to the section shown in FIG. 9. In the present method, first, a fixed electrode 12 and a dielectric film 14 are formed in lamination on a substrate 11 as shown in FIG. 10(a). Next, as shown in FIG. 10(b), a sacrifice film 15 is formed. The sacrifice film 15 has an opening 15a for partially exposing the dielectric film 14, and another opening for partially exposing the substrate 11 as described with reference to FIG. 6(b). A part of the dielectric film 14 exposed by the opening 15a will be part of an anchor portion 14a which connects the fixed electrode 12 with the movable electrode 13. Next, as shown in FIG. 10(c), another dielectric film 14 is formed on the sacrifice film 15 and in the opening 15a. A part of this dielectric film 14 formed in the opening 15a will be part of the anchor portion 14a which connects the fixed electrode 12 with the movable electrode 13. Next, as shown in FIG. 10(d), the movable electrode 13 is formed, and thereafter, the sacrifice film 15 is removed by wet etching. By following the above-described steps, the second variation in FIG. 9 of the variable capacitor X1 can be manufactured successfully.

Figure 11:
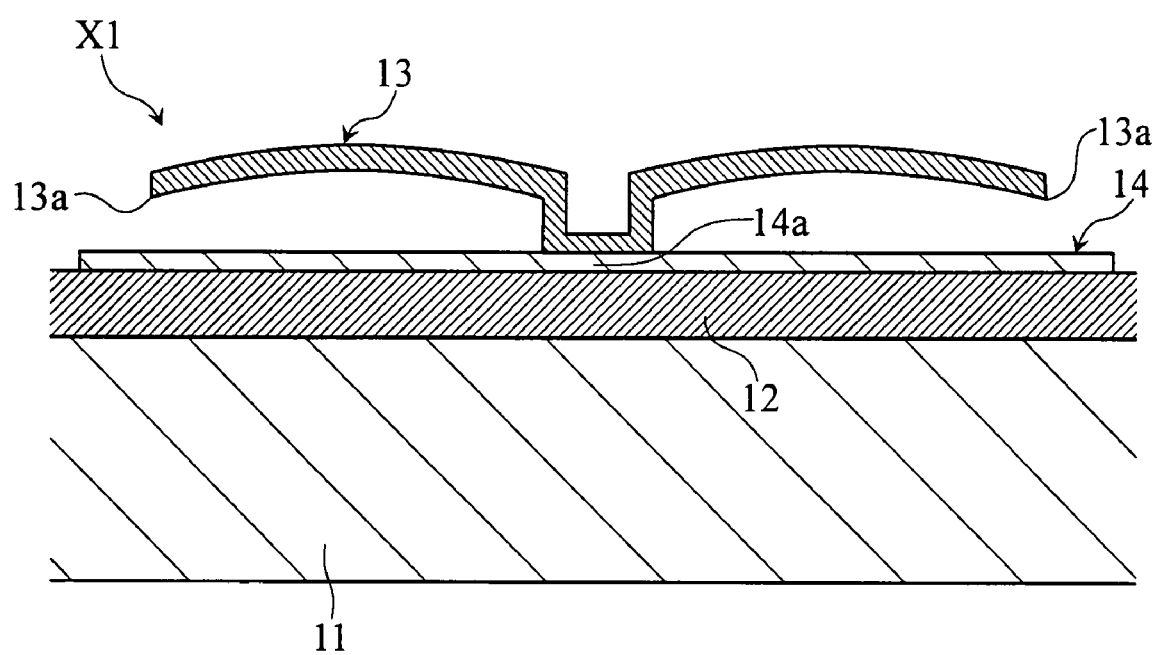
FIG. 11 is a sectional view of a third variation of the variable capacitor in FIG. 1.

FIG. 11 is a sectional view of a third variation of the variable capacitor X1. The view corresponds to FIG. 4 which shows a section of the variable capacitor X1 in FIG. 1. In the variable capacitor X1, the movable electrode 13 may have a shape as shown in FIG. 11. The movable electrode 13 according to the present variation has an initial shape which includes portions curved away from the fixed electrode 12. When the movable electrode 13 having such a shape is driven, the fixed electrode 12 is first contacted, via the dielectric film 14, by ends 13a indicated in FIG. 11 within a region of the movable electrode 13 which faces the fixed electrode 12. The ends 13a also are the last to leave the dielectric film 14 i.e. the fixed electrode 12. The shape of the movable electrode 13 as indicated in FIG. 11 is preferable in that the shape ensures potential partial contact of the movable electrode 13 with the fixed electrode 12 via the dielectric film 14 during operation. In addition, a smaller distance between the capacitor electrodes enables the capacitor electrodes to be driven with a lower voltage. For this reason, such an arrangement as exemplified by the present variation where the distance between the electrodes is short at some portions is preferable in view of low voltage operation.

Figure 12:
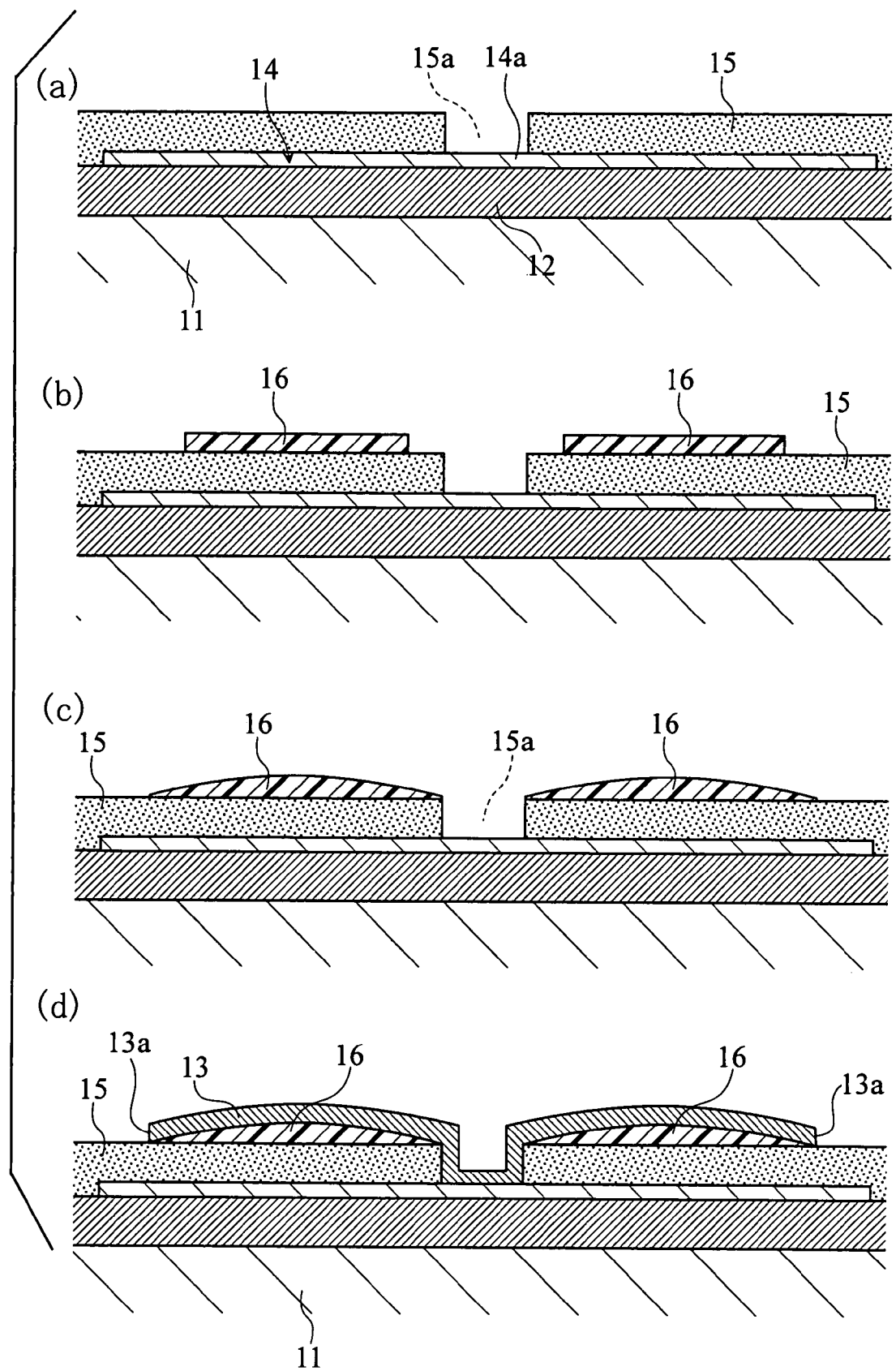
FIG. 12 shows a method of making the variable capacitor in FIG. 11.

FIG. 12 shows a method of making the third variation, in a series of sectional views each corresponding to the section shown in FIG. 11. In the present method, first, a fixed electrode 12, a dielectric film 14, and a sacrifice film 15 are formed in lamination on a substrate 11 as shown in FIG. 12(a). Specifically, the same procedures as described with reference to FIG. 6(a) and FIG. 6(b) will be performed.

Next, as shown in FIG. 12(b), a resist pattern 16 is formed on the sacrifice film 15. The resist pattern 16 can be formed by e.g. first forming a predetermined resist film on the substrate 11, on the sacrifice film 15 and in the opening 15a, and then by patterning the resist film using photolithography. By controlling the thickness of the resist pattern 16, it is possible to control the extent of the above-described curving in the movable electrode 13. Thereafter, a heating process is employed to deform the resist pattern 16 as shown in FIG. 12(c).

Next, as shown in FIG. 12(d), a movable electrode 13 is formed. The movable electrode 13 can be formed by e.g. first forming a film of aluminum using sputtering method on the substrate 11, on the sacrifice film 15, on the resist pattern 16 and in the opening 15a, and then etching the Al film via a mask of a predetermined resist pattern. Thereafter, wet etching for example is performed to remove the sacrifice film 15 and the resist pattern 16 in a single step or individual steps. By following the above-described steps, the third variation in FIG. 11 of the variable capacitor X1 can be manufactured successfully.

The curved electrode such as the movable electrode 13 in the third variation may be made by laminating a plurality (e.g. two) of films each having a different internal stress (tensile stress, compression stress) from the other. Specifically, the laminated electrode is patterned on a sacrifice film such as the sacrifice film 15 in FIG. 12, and then the sacrifice film is removed. This procedure leaves the laminated electrode which is curved in a predetermined direction in accordance with internal stresses differences in each layer of the laminated electrode. A movable electrode which has a curved portion as described later can also be formed by these methods.

Figure 13:
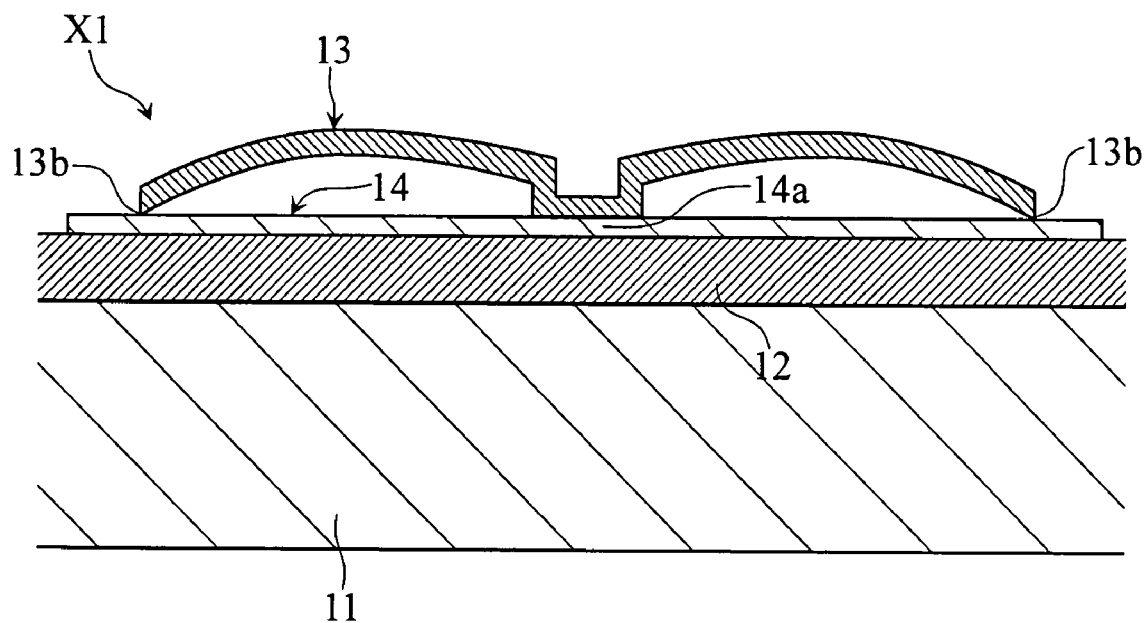
FIG. 13 is a sectional view of a fourth variation of the variable capacitor in FIG. 1.

FIG. 13 is a sectional view of a fourth variation of the variable capacitor X1. The view corresponds to FIG. 4 which shows a section of the variable capacitor X1 in FIG. 1. In the variable capacitor X1, the movable electrode 13 may have a shape as shown in FIG. 13. In the present variation, the movable electrode 13 has an initial shape which includes portions curved away from the fixed electrode 12, and the movable electrode 13 has ends 13b shown in FIG. 13 which contact with, or which is pressed against, the fixed electrode 12 via the dielectric film 14, within a region of the movable electrode 13 which faces the fixed electrode 12. When the movable electrode 13 having such a shape is driven, the area of the movable electrode 13 contacting with the fixed electrode 12 via the dielectric film 14 varies as the device is driven, with the ends 13b shown in FIG. 13 serving as a base point. The electrostatic attraction generated between electrodes under a given voltage tends to be greater as the distance between capacitor electrodes is smaller. For this reason, the arrangement where the movable electrode 13 makes partial contact with the fixed electrode 12 via the dielectric film 14 is preferable in view of low voltage operation of the variable capacitor X1.

Figure 14:
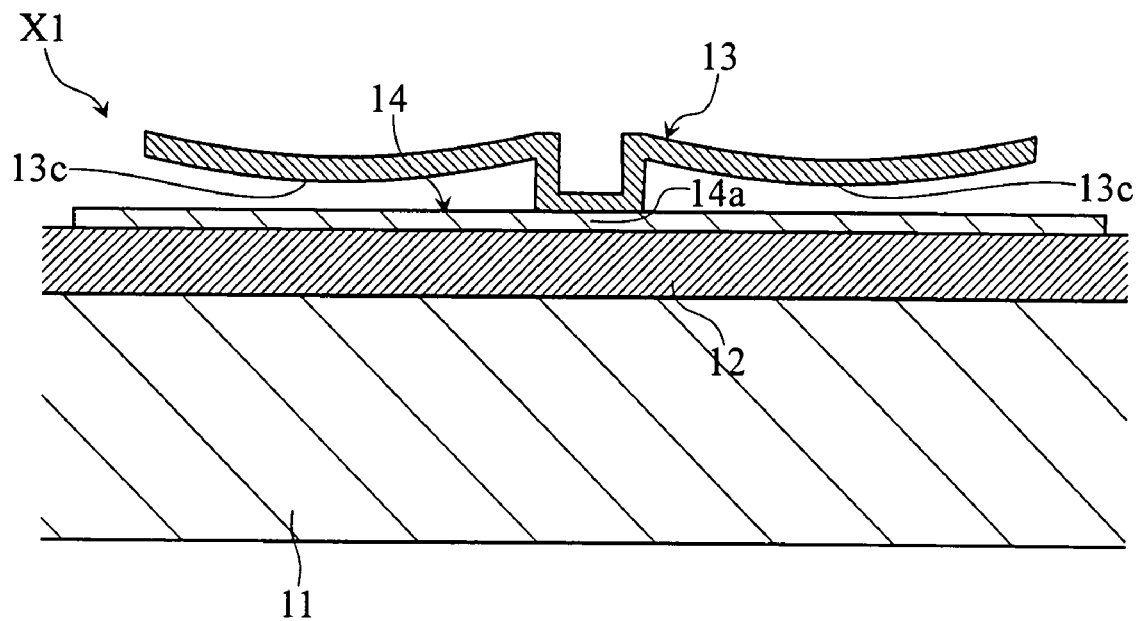
FIG. 14 is a sectional view of a fifth variation of the variable capacitor in FIG. 1.

FIG. 14 is a sectional view of a fifth variation of the variable capacitor X1. The view corresponds to FIG. 4 which shows a section of the variable capacitor X1 in FIG. 1. In the variable capacitor X1, the movable electrode 13 may have a shape as shown in FIG. 14. The movable electrode 13 according to the present variation has an initial shape which includes portions curved toward the fixed electrode 12. When the movable electrode 13 having such a shape is driven, the fixed electrode 12 is first contacted, via the dielectric film 14, by portions 13c indicated in FIG. 14 within a region of the movable electrode 13 which faces the fixed electrode 12. The portions 13c also are the last to leave the dielectric film 14 i.e. the fixed electrode 12. The shape of the movable electrode 13 as indicated in FIG. 14 is preferable in that the shape ensures potential partial contact of the movable electrode 13 with the fixed electrode 12 via the dielectric film 14 during operation.

Figure 15:
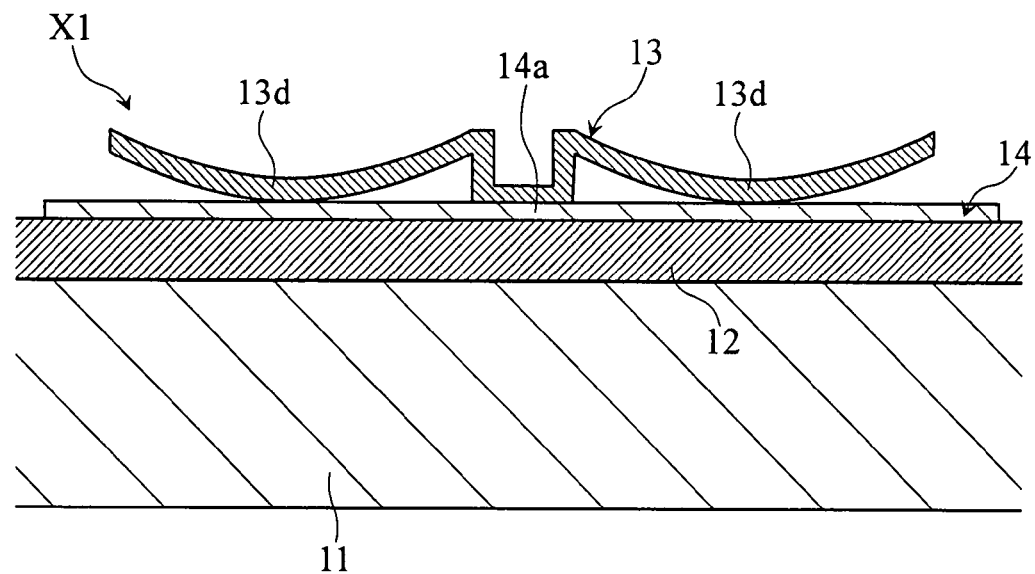
FIG. 15 is a sectional view of a sixth variation of the variable capacitor in FIG. 1.

FIG. 15 is a sectional view of a sixth variation of the variable capacitor X1. The view corresponds to FIG. 4 which shows a section of the variable capacitor X1 in FIG. 1. In the variable capacitor X1, the movable electrode 13 may have a shape as shown in FIG. 15. In the present variation, the movable electrode 13 has an initial shape which includes portions curved toward the fixed electrode 12, and portions 13d shown in FIG. 15 which contact with the fixed electrode 12 via the dielectric film 14, within a region of the movable electrode 13 that faces the fixed electrode 12. When the movable electrode 13 having such a shape is driven, the area of the movable electrode 13 contacting with the fixed electrode 12 via the dielectric film 14 varies as the device is driven, with the portions 13d shown in FIG. 13 serving as base points. The arrangement where the movable electrode 13 has an initial shape which makes partial contact with the fixed electrode 12 via the dielectric film 14 is preferable in view of low voltage operation of the variable capacitor X1.

Figure 16:
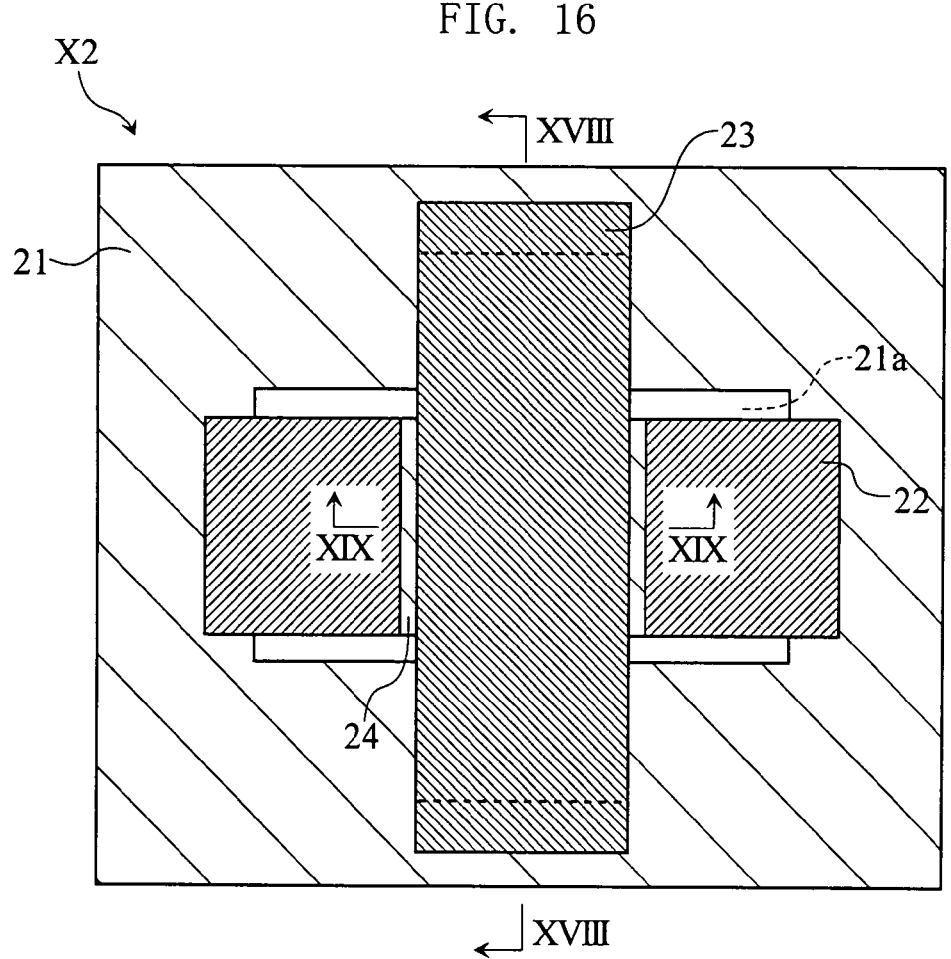
FIG. 16 is a plan view of a variable capacitor according to a second embodiment of the present invention.
Figure 17:
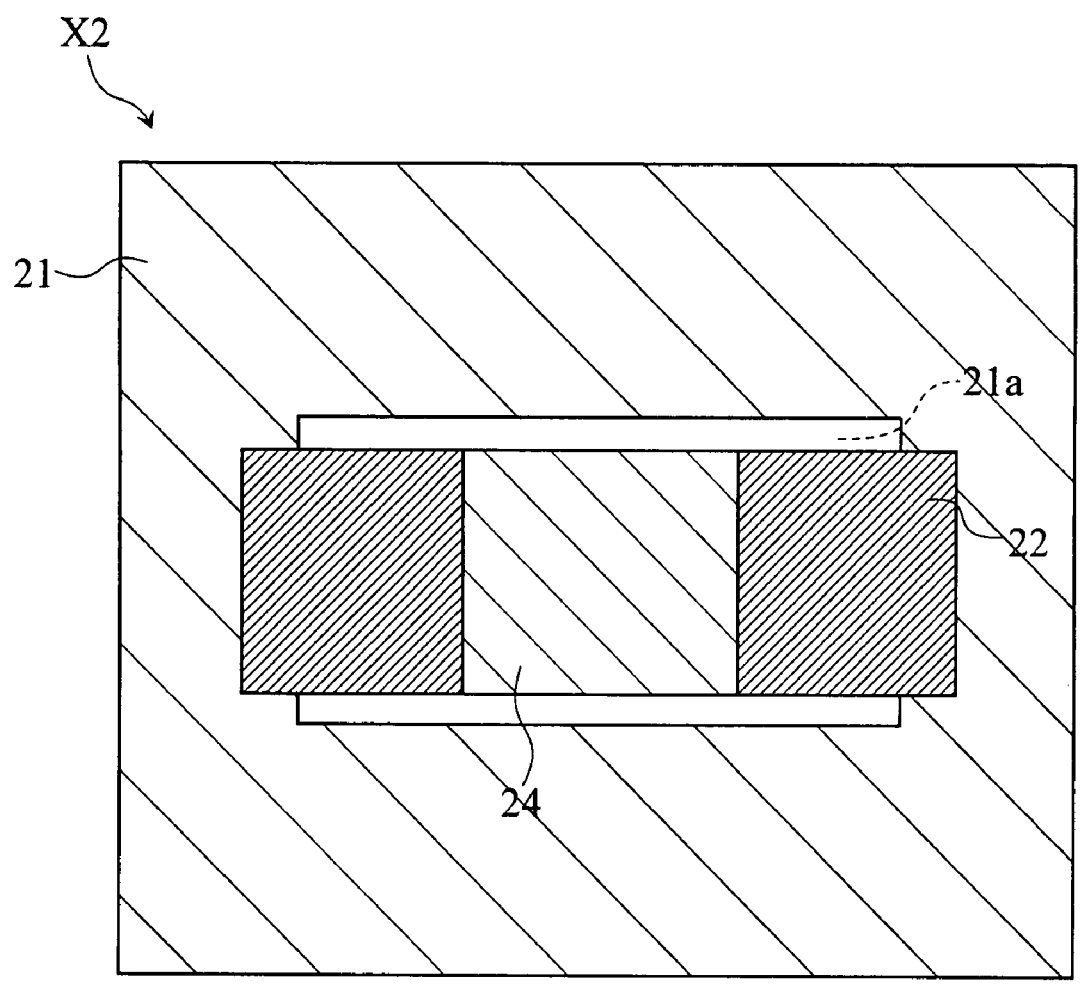
FIG. 17 is a partially unillustrated plan view of the variable capacitor according to the second embodiment of the present invention.
Figure 18:
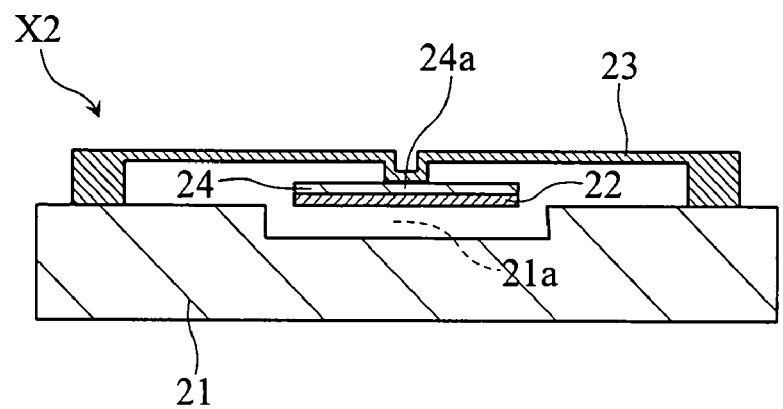
FIG. 18 is a sectional view taken in lines XVIII-XVIII in FIG. 16.
Figure 19:
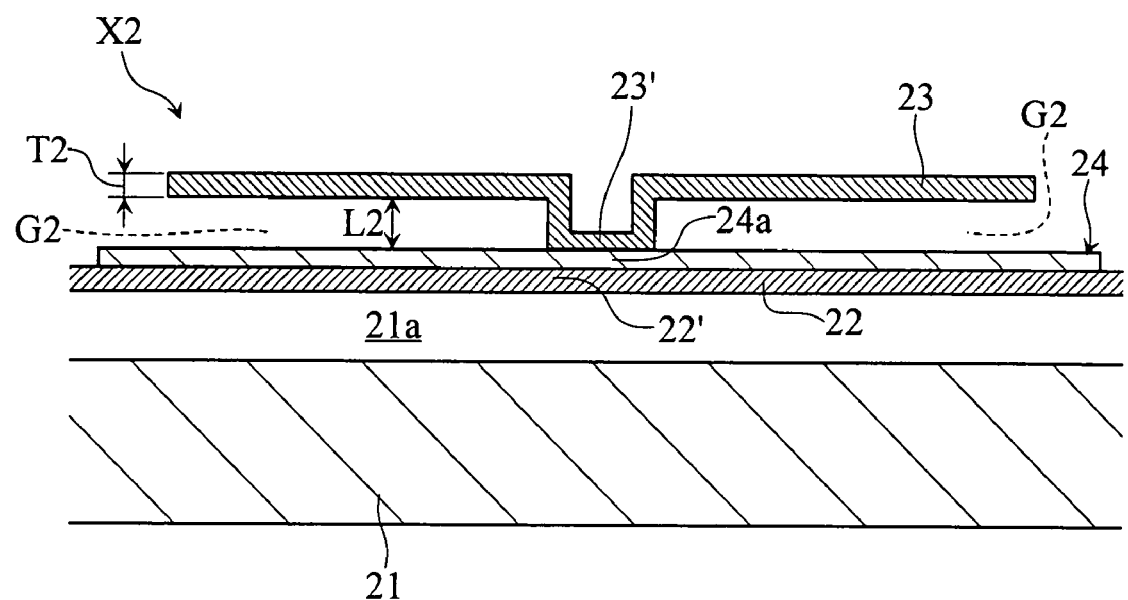
FIG. 19 is an enlarged partial sectional view taken in lines XIX-XIX in FIG. 16.

FIG. 16 through FIG. 19 show a variable capacitor X2 according to a second embodiment of the present invention. FIG. 16 is a plan view of the variable capacitor X2. FIG. 17 is a partially unillustrated plan view of the variable capacitor X2. FIG. 18 is a sectional view taken in lines XVIII-XVIII in FIG. 16. FIG. 19 is an enlarged partial sectional view taken in lines XIX-XIX in FIG. 16.

The variable capacitor X2 includes a substrate 21, a movable electrode 22, a movable electrode 23 (not illustrated in FIG. 17), and a dielectric film 24. The substrate 21 has a recess 21a, and is made of a silicon material for example. The movable electrode 22 has two ends bonded to the substrate 21, and extends over the recess 21a. The movable electrode 23 is built on the substrate 21. The movable electrode 23 has a thickness T2 as shown in FIG. 19, of 1 through 2 μm for example. As shown clearly in FIG. 16, the movable electrodes 22, 23 cross each other, opposing partially to each other. The opposed region has an area of 10000 through 40000 μm² for example. A distance L2 shown in FIG. 19 between the movable electrodes 22 and 23 is 0.5 through 2 μm for example. Preferably, one of the movable electrodes 22, 23 is grounded. The movable electrodes 22, 23 as described are formed of electrically conductive materials such as Al and Cu. The dielectric film 24 is formed on the movable electrode 22, on a side facing the movable electrode 23, and includes an anchor portion 24a as shown in FIG. 18 and FIG. 19. The dielectric film 24 appropriately prevents the movable electrodes 22, 23 from contacting directly with each other. The anchor portion 24a is sandwiched between the movable electrodes 22, 23, providing partial connection between the movable electrodes 22, 23. The dielectric film 24 has a thickness of 0.1 through 0.5 μm for example. The dielectric film 24 as described is formed of a dielectric material such as $Al_2O_3$, $SiO_2$ and $SiN_x$. A predetermined wiring pattern (not illustrated) electrically connected with the movable electrode 22 or with the movable electrodes 23 is formed on the substrate 21.

Figure 20:
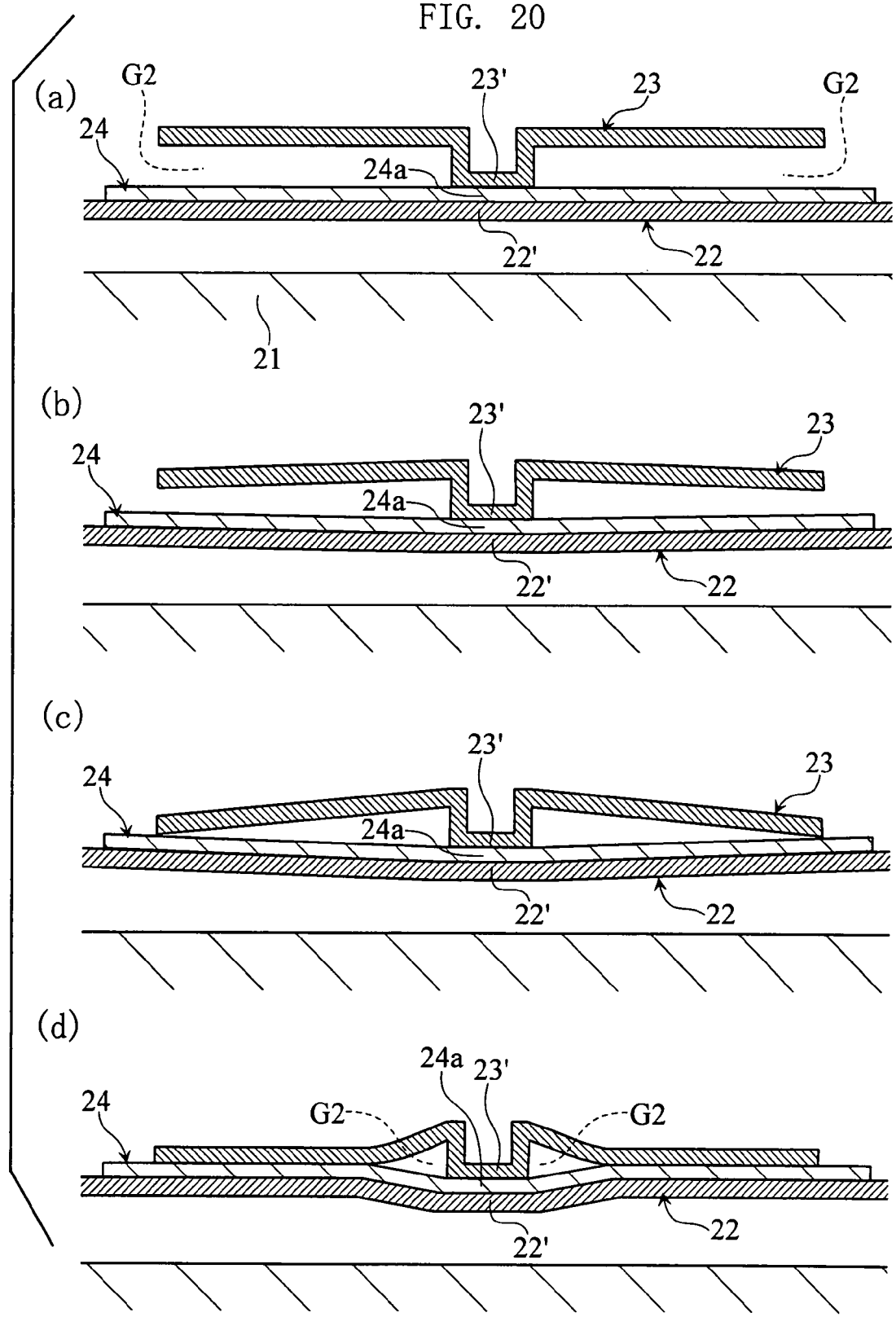
FIG. 20 shows different states of operation of the variable capacitor in FIG. 16.

According to the variable capacitor X2 which has the constitution as described above, it is possible to generate an electrostatic attraction between the movable electrodes 22, 23 by applying a voltage between the movable electrodes 22, 23, and by using the electrostatic attraction, it is possible to draw the movable electrodes 22, 23 closely to each other, excluding the regions bonded to the anchor portion 24a (bonded regions 22', 23'), and thereby varying the volume of a gap G2 between the movable electrodes 22, 23 as shown in FIG. 20. The electrostatic capacitance of the variable capacitor X2 varies in accordance with the gap volume. Therefore, according to the variable capacitor X2, it is possible to control the electrostatic capacitance by controlling the drive voltage (0 through 20 V for example) which is applied between the movable electrodes 22, 23.

Further, according to the variable capacitor X2, the movable electrodes 22, 23 are partially connected with or joined on each other by the anchor portion 24a; this reduces shape deformation or curving of the movable electrodes 22, 23 caused by temperature changes both in operation and in non-operation. Since curving of both movable electrodes 22, 23 is reduced in its initial shape (the shape in non-operation), inconsistency in initial electrostatic capacitance (0.5 through 1 pF for example) during non-operation is reduced in the variable capacitor X2. Further, because of the reduced shape deformation of both movable electrodes 22, 23 caused by temperature changes during operation and during non-operation, inconsistency in the relationship between electrostatic capacitance and drive voltage is reduced also. As described, the variable capacitor X2 is well suited to reduce electrostatic capacitance inconsistency caused by temperature changes. The variable capacitor X2 as described above is well suited to operate highly accurately.

In addition, according to the variable capacitor X2, it is possible to vary the electrostatic capacitance widely. As has been described, in the conventional variable capacitor Y it is not possible to vary the electrostatic capacitance widely because the movable electrode 93 must be moved within a limited range in order to avoid the pull-in phenomenon. On the contrary, when driving the variable capacitor X2 according to the present invention, it is possible as shown in FIG. 20(c) and FIG. 20(d), to make the movable electrodes 22, 23 partially contact with each other via the dielectric film 24 and further, to control the area of partial contact. Hence, according to the variable capacitor X2, it is possible to vary the gap volume between the movable electrodes 22, 23 widely from the initial state shown in FIG. 20(a) to the state where the area of contact between the movable electrodes 22, 23 via the dielectric film 14 reaches a maximum value (e.g. the state as shown in FIG. 20(d)). Therefore, the variable capacitor X2 is capable of offering a large amount or rate of electrostatic capacitance variation.

Figure 21:
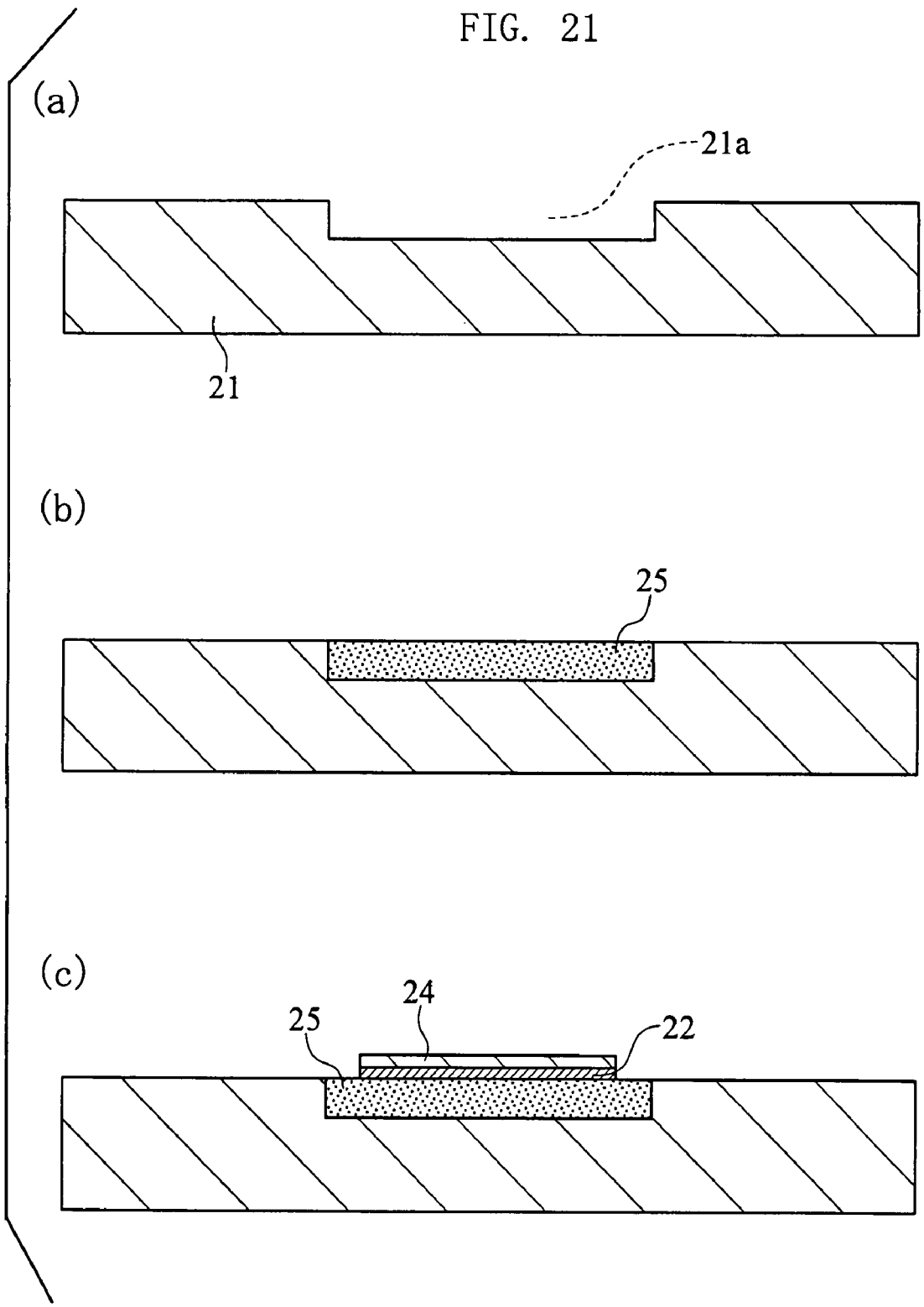
FIG. 21 shows part of a method of making the variable capacitor in FIG. 16.
Figure 22:
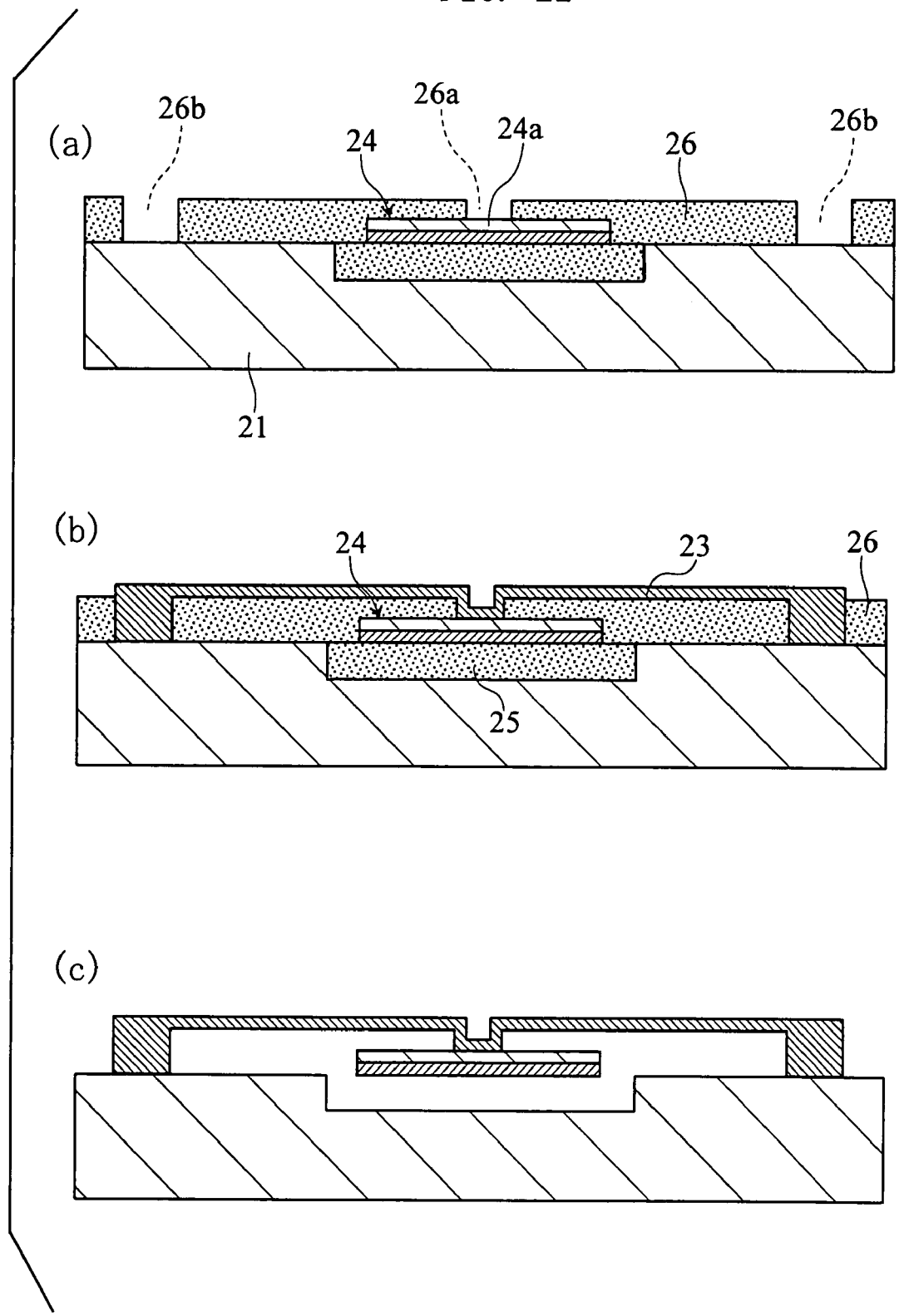
FIG. 22 shows steps continued from FIG. 21.

FIG. 21 and FIG. 22 show a method of making the variable capacitor X2, in a series of sectional views each corresponding to the section shown in FIG. 18. The present method uses so called MEMS technology for the manufacture of the variable capacitor X2.

In the manufacture of the variable capacitor X2, first, a substrate 21 which has a recess 21a as shown in FIG. 21(a) is prepared. The substrate 21 which has the recess 21a can be formed by e.g. performing anisotropic dry etching to a predetermined silicon substrate via a mask of a predetermined resist pattern. An example of the anisotropoic dry etching usable for this process is reactive ion etching (RIE).

Next, as shown in FIG. 21(b), a sacrifice material 25 is filled in the recess 21a of the substrate 21. Specifically, sputtering method for example can be used to fill the sacrifice material in the recess 21a as well as to cover the substrate 21 with more than a sufficient amount of the sacrifice material 25, and then the excess amount of the sacrifice material 25 on the substrate 21 is polished off. The sacrifice material 25 is provided by a photoresist for example.

Next, as shown in FIG. 21(c), a fixed electrode 22 and a dielectric film 24 are formed in lamination on the substrate 21. The movable electrode 22 and the dielectric film 24 can be formed using the same procedures as described with reference to FIG. 6(a) used for forming the fixed electrode 12 and the dielectric film 14.

Next, as shown in FIG. 22(a), a sacrifice film 26 is formed. The sacrifice film 26 has an opening 26a for partially exposing the dielectric film 24, and openings 26b for partially exposing the substrate 21. The region of the dielectric film 24 exposed by the opening 26a will become the anchor portion 24a described earlier. The sacrifice film 26 can be formed of the same material and by the same procedures as used for formation of the sacrifice film 15 described earlier with reference to FIG. 6(b). By controlling the thickness of the sacrifice film 26 formed in this step, it is possible to control the initial-state distance L2 between the movable electrodes 22, 23 in the variable capacitor X2 obtained.

Next, as shown in FIG. 22(b), a movable electrode 23 is formed. The movable electrode 23 can be formed by the same procedures as used for formation of the movable electrode 13 described earlier with reference to FIG. 6(c). The movable electrode 23 formed in this step is bonded to the dielectric film 24 in the opening 26a of the sacrifice film 26, and to the substrate 21 in the openings 26b. Note that for the sake of simplicity in the drawing, the two ends of movable electrode 23 are shown as formed by filling the openings 26b of the sacrifice film 26 with an electrically conductive material.

Next, as shown in FIG. 22(c), the sacrifice film 26 and the sacrifice material 25 are removed. Specifically, the sacrifice film 26 and the sacrifice material 25 are removed by wet etching method using a predetermined resist remover. By following the above-described steps, the variable capacitor X2 can be manufactured successfully.

Figure 23:
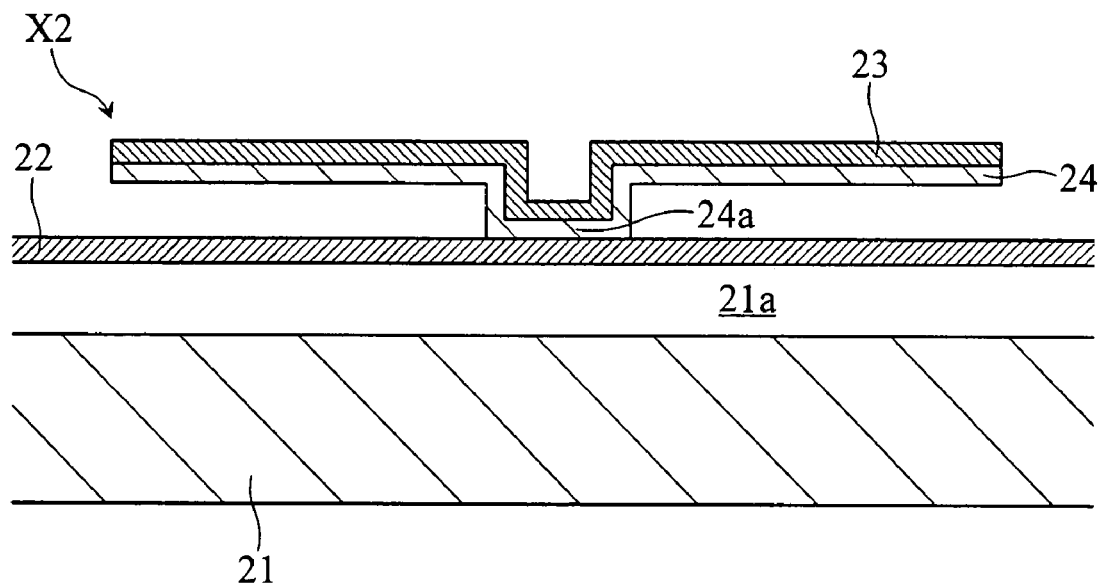
FIG. 23 is a sectional view of a first variation of the variable capacitor in FIG. 16.

FIG. 23 is a sectional view of a first variation of the variable capacitor X2. The view corresponds to FIG. 19 which shows a section of the variable capacitor X2 in FIG. 16. In the variable capacitor X2, a dielectric film 24 is formed on the movable electrode 22, on the side facing the movable electrode 23; instead of this arrangement, a dielectric film 24 may be formed on the movable electrode 23, on the side facing the movable electrode 22 as shown in FIG. 23.

Figure 24:
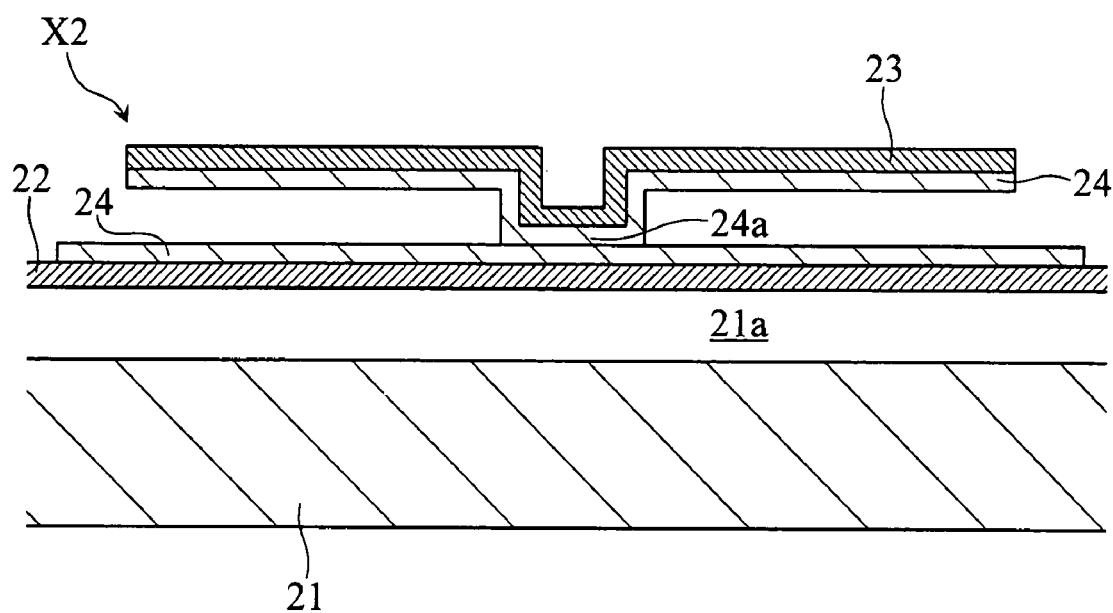
FIG. 24 is a sectional view of a second variation of the variable capacitor in FIG. 16.

FIG. 24 is a sectional view of a second variation of the variable capacitor X2. The view corresponds to FIG. 19 which shows a section of the variable capacitor X2 in FIG. 16. In the variable capacitor X2, a dielectric film 24 is formed on the movable electrode 22, on the side facing the movable electrode 23; In addition to this arrangement, a dielectric film 24 may also be formed on the movable electrode 23, on the side facing the movable electrode 22 as shown in FIG. 23.

Figure 25:
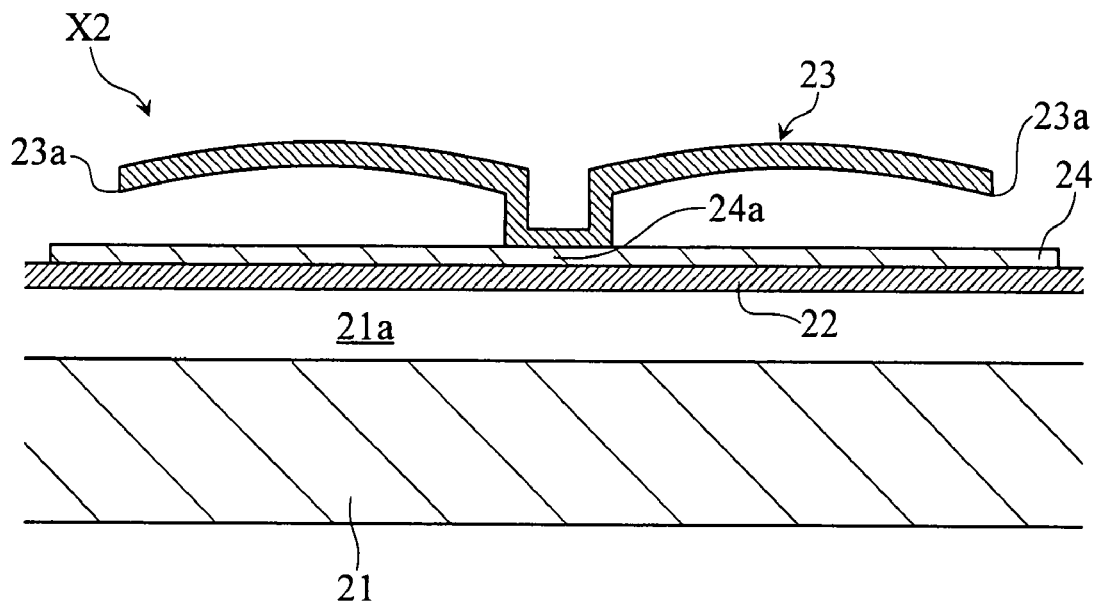
FIG. 25 is a sectional view of a third variation of the variable capacitor in FIG. 16.

FIG. 25 is a sectional view of a third variation of the variable capacitor X2. The view corresponds to FIG. 19 which shows a section of the variable capacitor X2 in FIG. 16. In the variable capacitor X2, the movable electrode 23 may have a shape as shown in FIG. 25. The movable electrode 23 according to the present variation has an initial shape which includes portions curved away from the movable electrode 22. When the movable electrode 23 having such a shape is driven, the movable electrode 22 is first contacted, via the dielectric film 24, by ends 23a indicated in FIG. 25 within a region of the movable electrode 23 which faces the movable electrode 22. The ends 23a also are the last to leave the dielectric film 24 i.e. the movable electrode 22. The shape of the movable electrode 23 as shown in FIG. 25 is preferable in that the shape ensures potential partial contact between the movable electrodes 22, 23 via the dielectric film 24 during operation.

Figure 26:
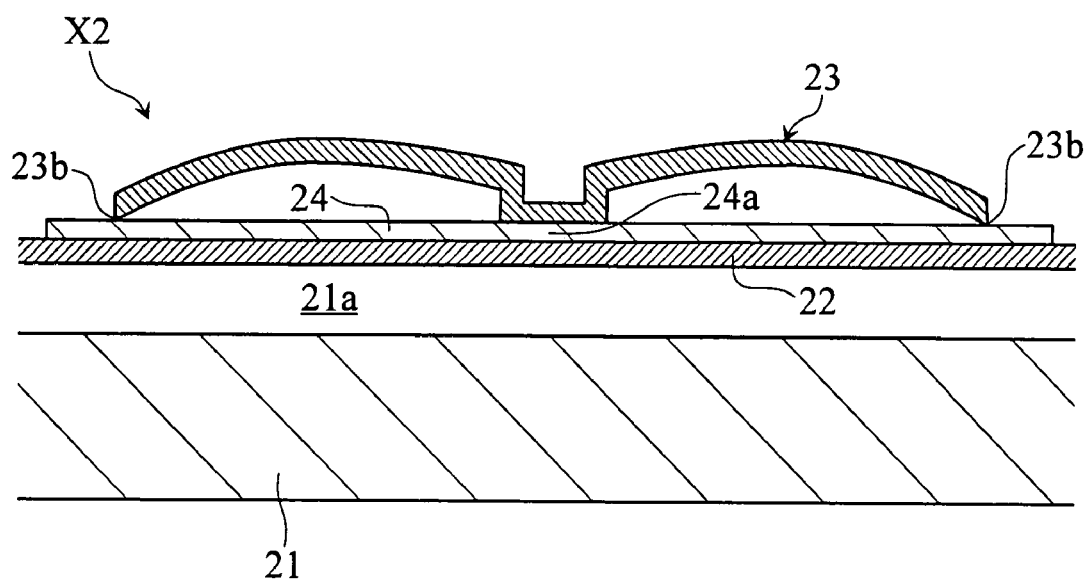
FIG. 26 is a sectional view of a fourth variation of the variable capacitor in FIG. 16.

FIG. 26 is a sectional view of a fourth variation of the variable capacitor X2. The view corresponds to FIG. 19 which shows a section of the variable capacitor X2 in FIG. 16. In the variable capacitor X2, the movable electrode 23 may have a shape as shown in FIG. 26. In the present variation, the movable electrode 23 has an initial shape which includes portions curved away from the movable electrode 22, and the movable electrode 23 has ends 23b shown in FIG. 26 which contact with the movable electrode 12 via the dielectric film 24, within a region of the movable electrode 23 facing the movable electrode 22. When the movable electrode 23 having such a shape is driven, the area of mutual contact between the movable electrodes 22, 23 via the dielectric film 24 varies as the device is driven, with the ends 23b serving as a base point. The arrangement where the movable electrodes 22, 23 make mutual partial contact via the dielectric film 24 is preferable in view of low voltage operation of the variable capacitor X2.

Figure 27:
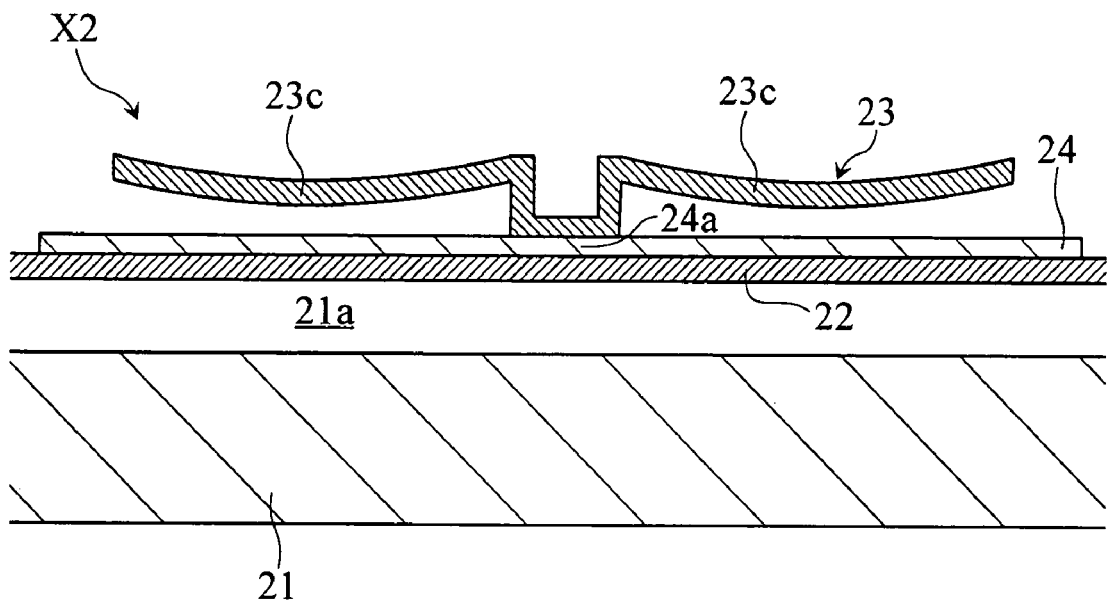
FIG. 27 is a sectional view of a fifth variation of the variable capacitor in FIG. 16.

FIG. 27 is a sectional view of a fifth variation of the variable capacitor X2. The view corresponds to FIG. 19 which shows a section of the variable capacitor X2 in FIG. 16. In the variable capacitor X2, the movable electrode 23 may have a shape as shown in FIG. 27. The movable electrode 23 according to the present variation has an initial shape which includes portions curved toward the movable electrode 22. When the movable electrode 23 having such a shape is driven, the movable electrode 22 is first contacted, via the dielectric film 24, by portions 23c indicated in FIG. 27 within a region of the movable electrode 23 which faces the movable electrode 22. The ends 23c also are the last to leave the dielectric film 24 i.e. the movable electrode 22. The shape of the movable electrode 23 as shown in FIG. 27 is preferable in that the shape ensures potential partial mutual contact between the movable electrodes 22, 23 via the dielectric film 24 during operation.

Figure 28:
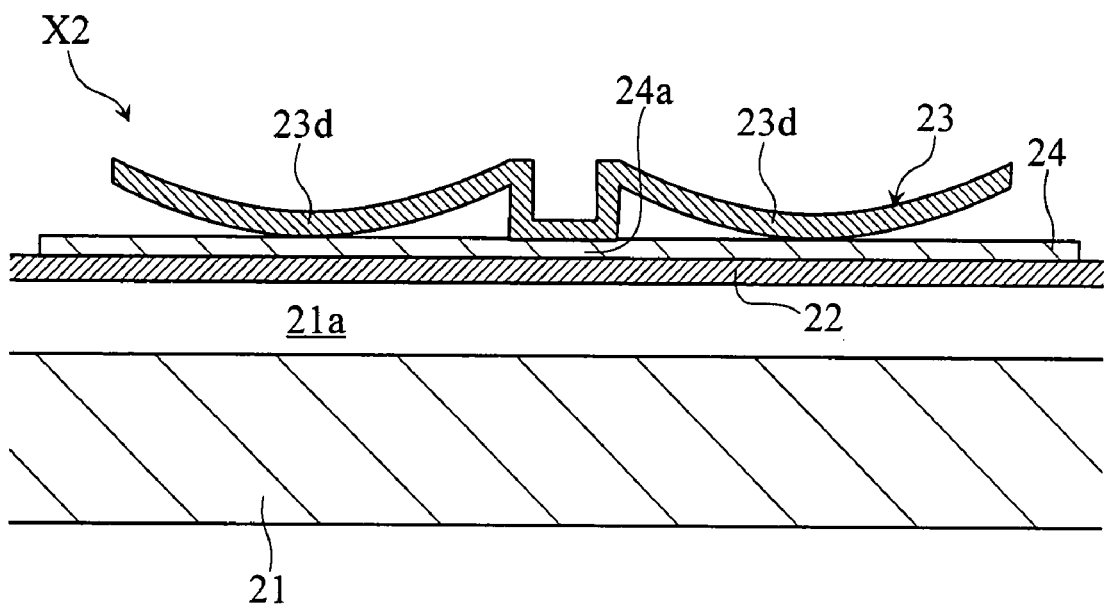
FIG. 28 is a sectional view of a sixth variation of the variable capacitor in FIG. 16.

FIG. 28 is a sectional view of a sixth variation of the variable capacitor X2. The view corresponds to FIG. 19 which shows a section of the variable capacitor X2 in FIG. 16. In the variable capacitor X2, the movable electrode 23 may have a shape as shown in FIG. 28. In the present variation, the movable electrode 23 has an initial shape which includes portions curved toward the movable electrode 22, and portions 23d shown in FIG. 28 which contact with the movable electrode 22 via the dielectric film 24, within a region of the movable electrode 23 that faces the movable electrode 22. When the movable electrode 23 having such a shape is driven, the area of mutual contact between the movable electrodes 22, 33 via the dielectric film 24 varies as the device is driven, with the portions 23d shown in FIG. 28 serving as a base point. The arrangement that the movable electrodes 22, 23 make mutual partial contact via the dielectric film 24 in their initial states is preferable in view of low voltage operation of the variable capacitor X2.

Figure 29:
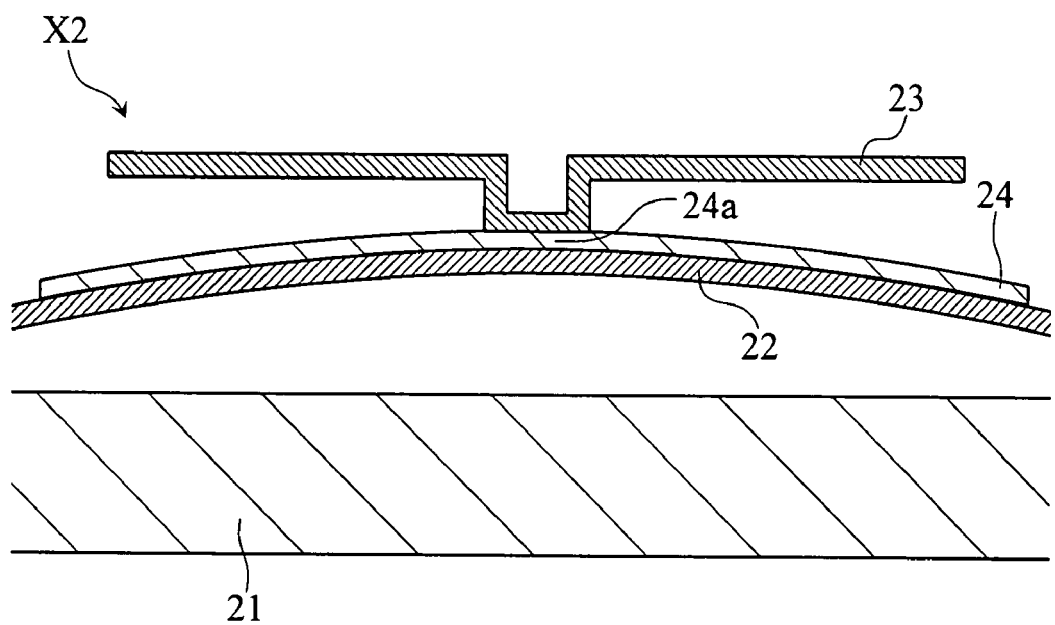
FIG. 29 is a sectional view of a seventh variation of the variable capacitor in FIG. 16.

FIG. 29 is a sectional view of a seventh variation of the variable capacitor X2. The view corresponds to FIG. 19 which shows a section of the variable capacitor X2 in FIG. 16.

In the variable capacitor X2, the movable electrode 22 may have a shape as shown in FIG. 29. In the present variation, the movable electrode 22 has an initial shape which includes a portion curved toward the movable electrode 23 at a place bonded to the anchor portion 24a of the dielectric film 24. The shape of the movable electrode 22 as shown in FIG. 29 is preferable in that the shape ensures potential partial contact between the movable electrodes 22, 23 via the dielectric film 24 during operation. The curved shape of the movable electrode 22 according to the present variation can be achieved by e.g. using a resist pattern, in the same way as a curvature is made by using a resist pattern in the movable electrode 13 in the third variation of the variable capacitor X1.

Figure 30:
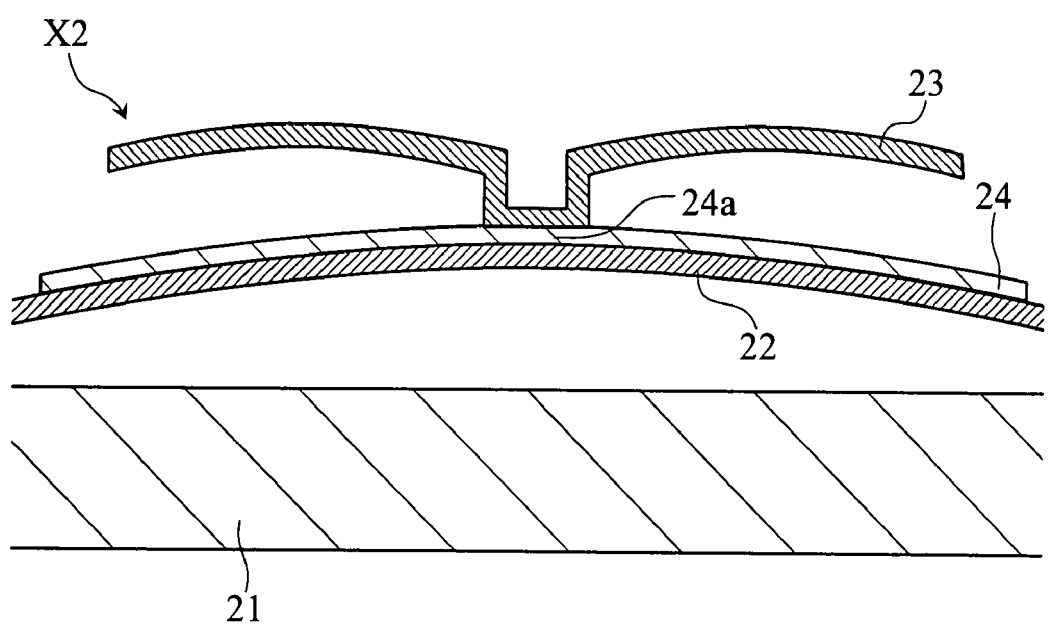
FIG. 30 is a sectional view of an eighth variation of the variable capacitor in FIG. 16.

FIG. 30 is a sectional view of an eighth variation of the variable capacitor X2. The view corresponds to FIG. 19 which shows a section of the variable capacitor X2 in FIG. 16. In the variable capacitor X2, the movable electrodes 22, 23 may be shaped as shown in FIG. 30. In the present variation, the movable electrode 22 has an initial shape which includes a portion curved toward the movable electrode 23 at a place bonded to the anchor portion 24a of the dielectric film 24 whereas the movable electrode 23 has an initial shape which include portions curved away from the movable electrode 22. The shapes of the movable electrodes 22, 23 as shown in FIG. 30 are preferable in that the shapes ensure potential partial contact between the movable electrodes 22, 23 via the dielectric film 24 during operation.

Figure 31:
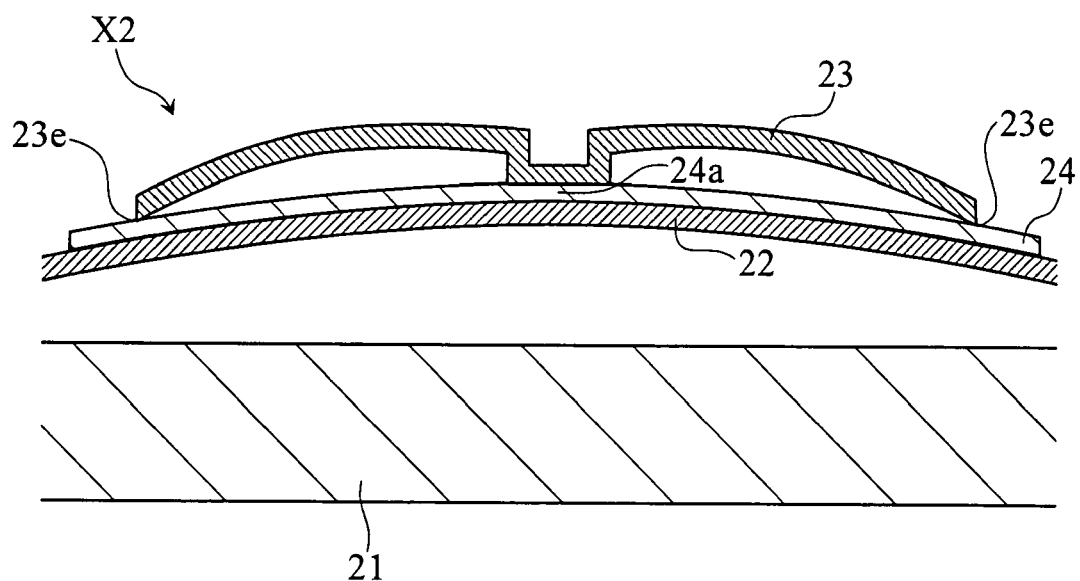
FIG. 31 is a sectional view of a ninth variation of the variable capacitor in FIG. 16.

FIG. 31 is a sectional view of a ninth variation of the variable capacitor X2. The view corresponds to FIG. 19 which shows a section of the variable capacitor X2 in FIG. 16. In the variable capacitor X2, the movable electrodes 22, 23 may be shaped as shown in FIG. 31. In the present variation, the movable electrode 22 has an initial shape which includes a portion curved toward the movable electrode 23 at a place bonded to the anchor portion 24a of the dielectric film 24. The movable electrode 23 according to the present variation has an initial shape which includes portions curved away from the movable electrode 22, and ends 23e shown in FIG. 31 which contact with the movable electrode 22 via the dielectric film 24, within a region of the movable electrode 23 which faces the movable electrode 22. When the movable electrode 23 having such a shape is driven, the area of the movable electrode 23 contacting the movable electrode 22 via the dielectric film 24 varies as the device is driven, with the ends 23e shown in FIG. 31 serving as a base point. The arrangement where the movable electrodes 22, 23 make mutual partial contact via the dielectric film 24 in their initial states is preferable in view of low voltage operation of the variable capacitor X2.

Figure 32:
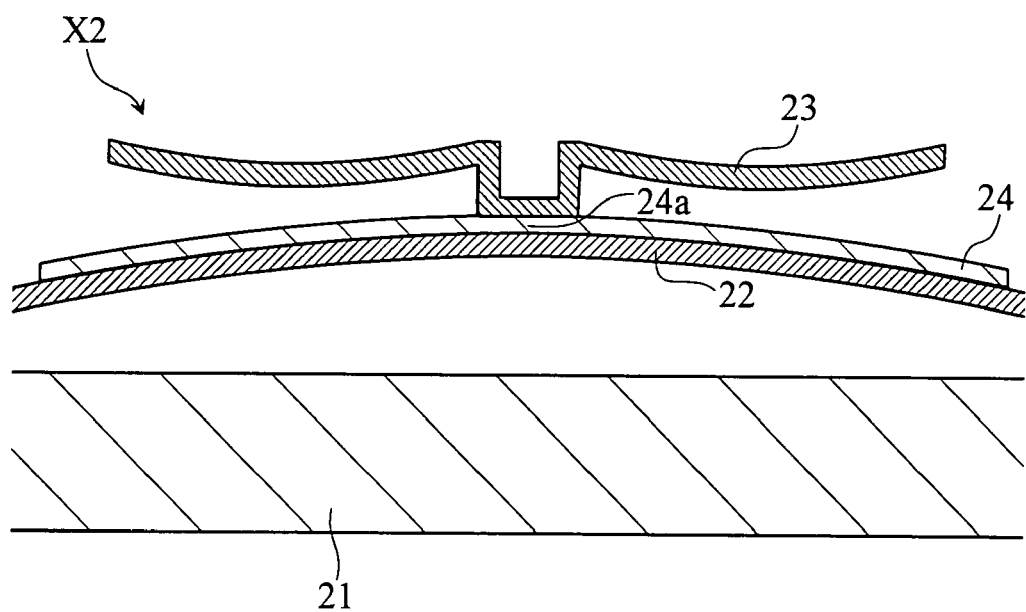
FIG. 32 is a sectional view of a tenth variation of the variable capacitor in FIG. 16.

FIG. 32 is a sectional view of a tenth variation of the variable capacitor X2. The view corresponds to FIG. 19 which shows a section of the variable capacitor X2 in FIG. 16. In the variable capacitor X2, the movable electrodes 22, 23 may be shaped as shown in FIG. 32. In the present variation, the movable electrode 22 has an initial shape which includes a portion curved toward the movable electrode 23 at a place bonded to the anchor portion 24a of the dielectric film 24 whereas the movable electrode 23 has an initial shape which includes portions curved toward the movable electrode 22. The shapes of the movable electrodes 22, 23 as shown in FIG. 32 are preferable in that they ensure potential partial contact between the movable electrodes 22, 23 via the dielectric film 24 during operation.

Figure 33:
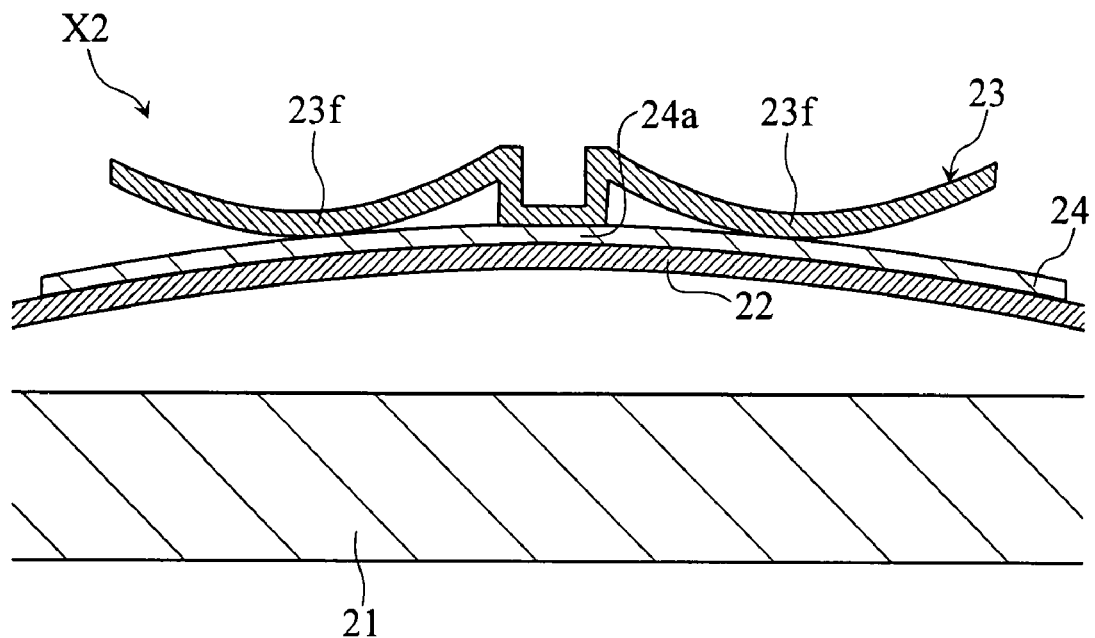
FIG. 33 is a sectional view of an eleventh variation of the variable capacitor in FIG. 16.

FIG. 33 is a sectional view of an eleventh variation of the variable capacitor X2. The view corresponds to FIG. 19 which shows a section of the variable capacitor X2 in FIG. 16. In the variable capacitor X2, the movable electrodes 22, 23 may be shaped as shown in FIG. 33. In the present variation, the movable electrode 22 has an initial shape which includes a portion curved toward the movable electrode 23 at a place bonded to the anchor portion 24a of the dielectric film 24. The movable electrode 23 according to the present variation has an initial shape which includes portions curved toward the movable electrode 22, and portions 23f shown in FIG. 33 which contact with the movable electrode 22 via the dielectric film 24, within a region of the movable electrode 23 that faces the movable electrode 22. When the movable electrode 23 having such a shape is driven, the area of the movable electrode 23 contacting the movable electrode 22 via the dielectric film 24 varies as the device is driven, with the portions 23f shown in FIG. 33 serving as base points. The arrangement where the movable electrodes 22, 23 contact with each other via the dielectric film 24 is preferable in view of low voltage operation of the variable capacitor X2.

Figure 34:
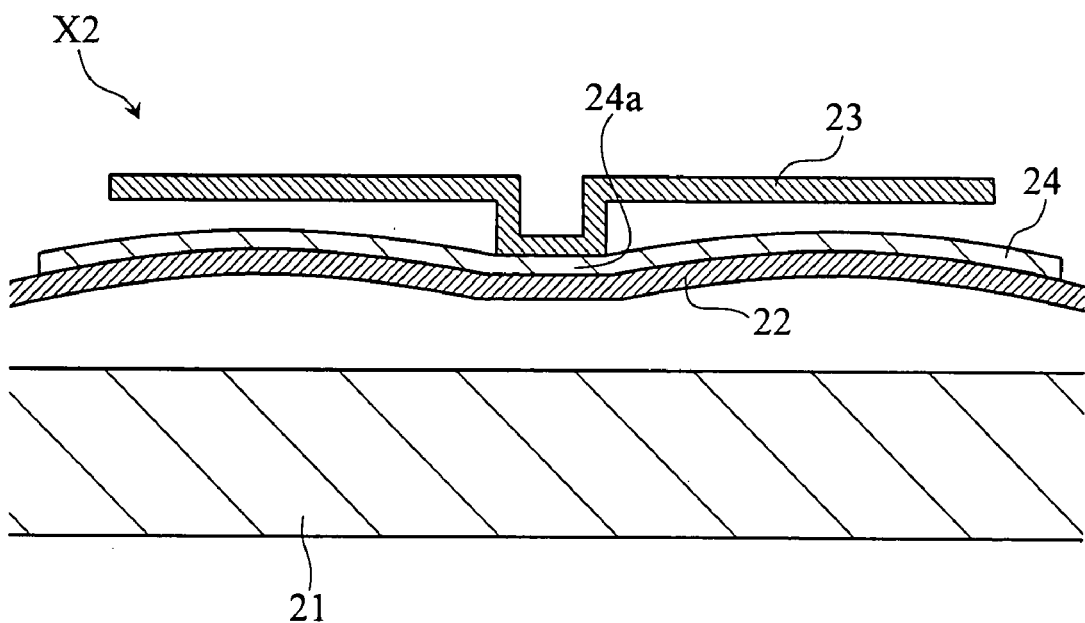
FIG. 34 is a sectional view of a twelfth variation of the variable capacitor in FIG. 16.

FIG. 34 is a sectional view of a twelfth variation of the variable capacitor X2. The view corresponds to FIG. 19 which shows a section of the variable capacitor X2 in FIG. 16. In the variable capacitor X2, the movable electrode 22 may be shaped as shown in FIG. 34. In the present variation, the movable electrode 22 has an initial shape which includes portions curved toward the movable electrode 23 at places not bonded to the anchor portion 24a of the dielectric film 24. The shape of the movable electrode 22 as shown in FIG. 34 is preferable in that the shape ensures potential partial contact between the movable electrodes 22, 23 via the dielectric film 24 during operation. The curved shape of the movable electrode 22 according to the present variation can be achieved by e.g. using a resist pattern, in the same way as a curvature is made by using a resist pattern in the movable electrode 13 in the third variation of the variable capacitor X1.

Figure 35:
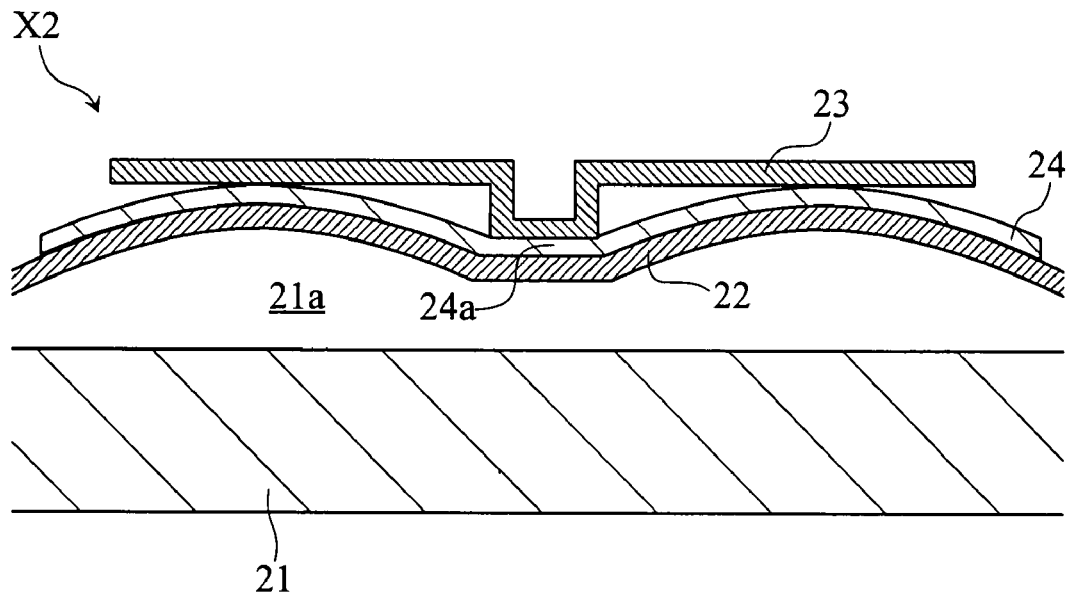
FIG. 35 is a sectional view of a thirteenth variation of the variable capacitor in FIG. 16.

FIG. 35 is a sectional view of a thirteenth variation of the variable capacitor X2. The view corresponds to FIG. 19 which shows a section of the variable capacitor X2 in FIG. 16. In the variable capacitor X2, the movable electrodes 22, 23 may be shaped as shown in FIG. 35. In the present variation, the movable electrode 22 has an initial shape which includes portions curved toward the movable electrode 23 at places not bonded to the anchor portion 24a of the dielectric film 24 whereas the movable electrode 23 has an initial shape which makes partial contact with the movable electrode 22. The arrangement that the movable electrodes 22, 23 make partial contact with each other in their initial states is preferable in view of low voltage operation of the variable capacitor X2.

Figure 36:
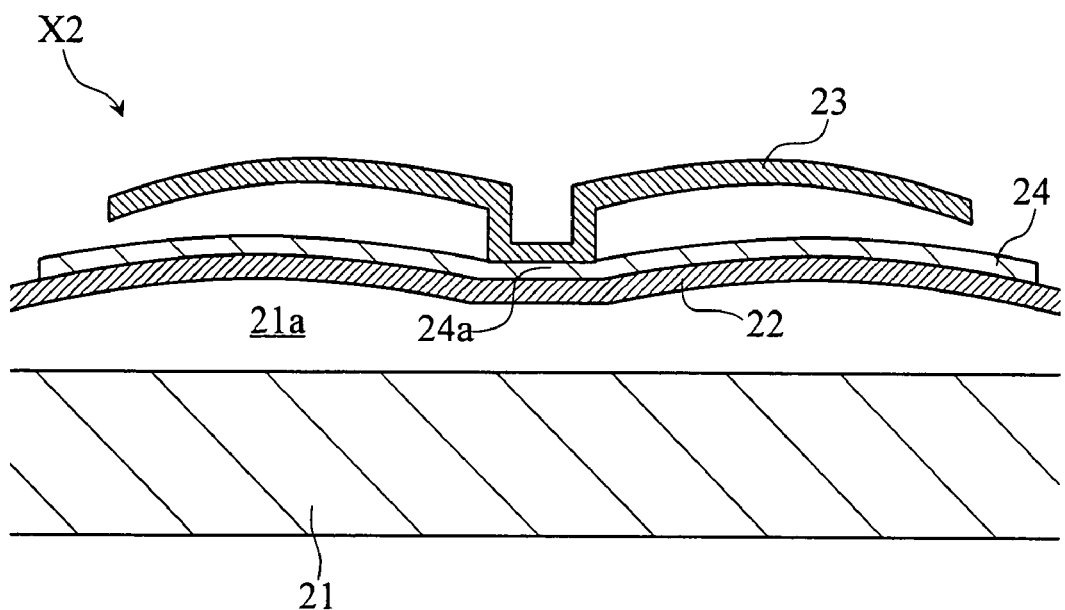
FIG. 36 is a sectional view of a fourteenth variation of the variable capacitor in FIG. 16.

FIG. 36 is a sectional view of a fourteenth variation of the variable capacitor X2. The view corresponds to FIG. 19 which shows a section of the variable capacitor X2 in FIG. 16. In the variable capacitor X2, the movable electrodes 22, 23 may be shaped as shown in FIG. 36. In the present variation, the movable electrode 22 has an initial shape which includes portions curved toward the movable electrode 23 at places not bonded to the anchor portion 24a of the dielectric film 24 whereas the movable electrode 23 has an initial shape which includes portions curved away from the movable electrode 22. The shapes of the movable electrodes 22, 23 as shown in FIG. 36 are preferable in that the shapes ensure potential partial contact between the movable electrodes 22, 23 via the dielectric film 14 during operation.

Figure 37:
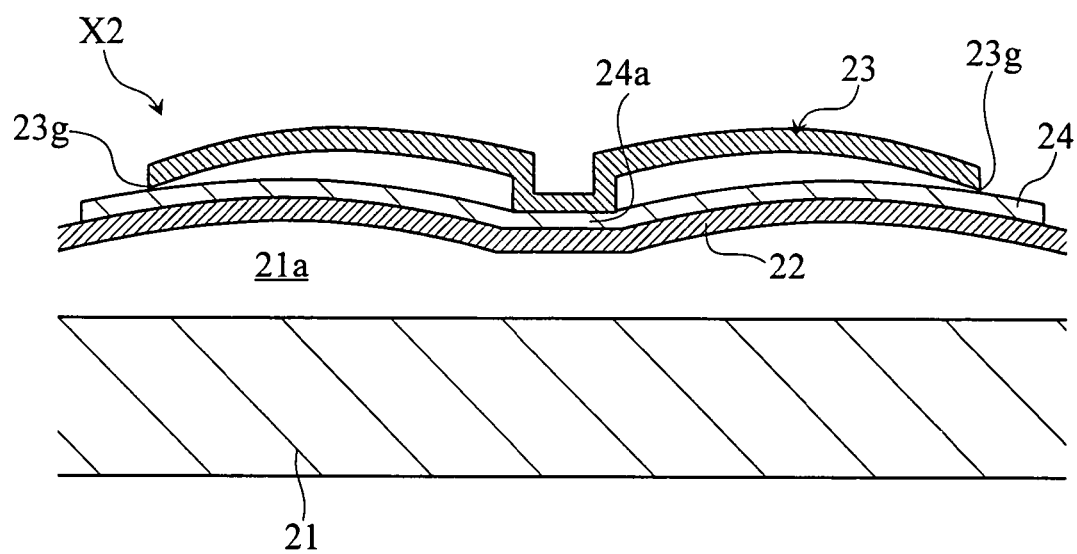
FIG. 37 is a sectional view of a fifteenth variation of the variable capacitor in FIG. 16.

FIG. 37 is a sectional view of a fifteenth variation of the variable capacitor X2. The view corresponds to FIG. 19 which shows a section of the variable capacitor X2 in FIG. 16. In the variable capacitor X2, the movable electrodes 22, 23 may be shaped as shown in FIG. 37. In the present variation, the movable electrode 22 has an initial shape which includes portions curved toward the movable electrode 23 at places not bonded to the anchor portion 24a of the dielectric film 24. The movable electrode 23 according to the present variation has an initial shape which includes portions curved away from the movable electrode 22, and ends 23g shown in FIG. 37 which contact with the movable electrode 22 via the dielectric film 24, within a region of the movable electrode 23 which faces the movable electrode 22. When the movable electrode 23 having such a shape is driven, the area of the movable electrode 23 contacting the movable electrode 22 via the dielectric film 24 varies as the device is driven, with the ends 23g shown in FIG. 37 serving as base points. The arrangement where the movable electrodes 22, 23 make mutual partial contact via the dielectric film 24 is preferable in view of low voltage operation of the variable capacitor X2.

Figure 38:
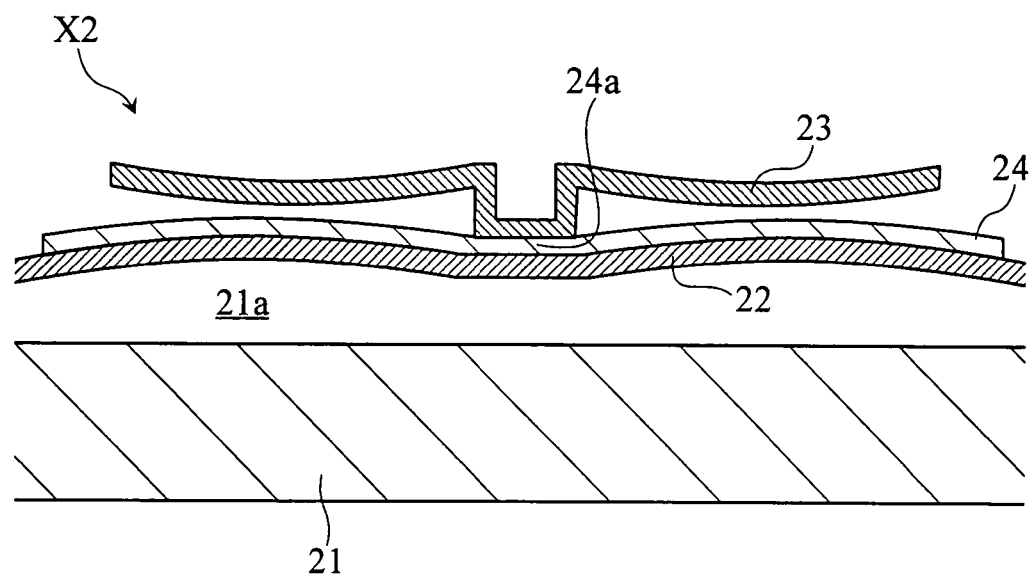
FIG. 38 is a sectional view of a sixteenth variation of the variable capacitor in FIG. 16.

FIG. 38 is a sectional view of a sixteenth variation of the variable capacitor X2. The view corresponds to FIG. 19 which shows a section of the variable capacitor X2 in FIG. 16. In the variable capacitor X2, the movable electrodes 22, 23 may be shaped as shown in FIG. 38. In the present variation, the movable electrode 22 has an initial shape which includes portions curved toward the movable electrode 23 at places not bonded to the anchor portion 24a of the dielectric film 24 whereas the movable electrode 23 has an initial shape which includes portions curved toward the movable electrode 22. The shapes of the movable electrodes 22, 23 as shown in FIG. 38 are preferable in that the shapes ensure potential partial contact between the movable electrodes 22, 23 via the dielectric film 24 during operation.

Figure 39:
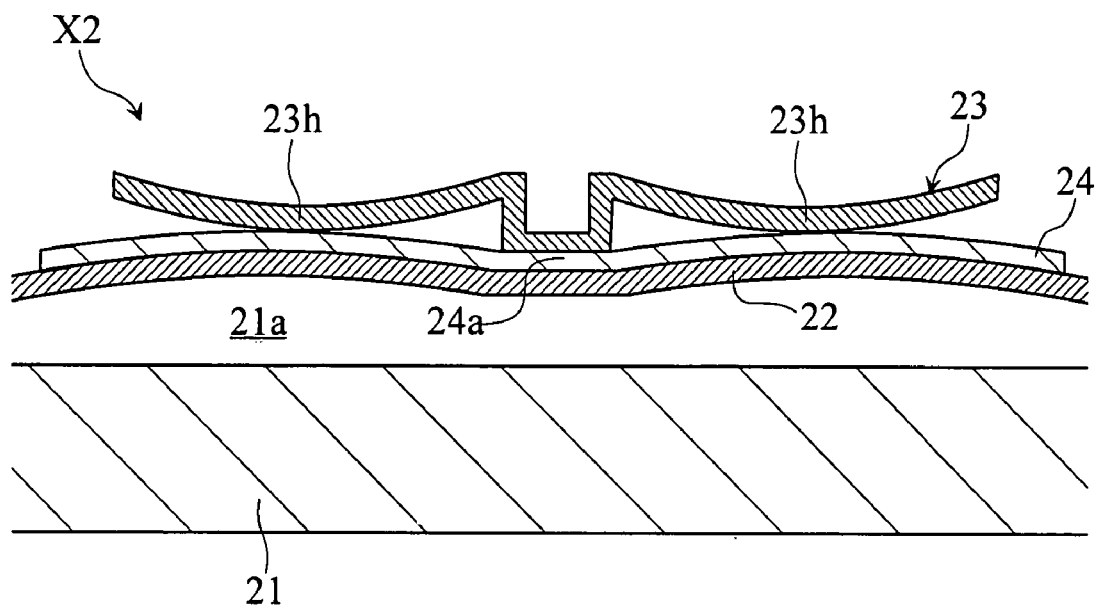
FIG. 39 is a sectional view of a seventeenth variation of the variable capacitor in FIG. 16.

FIG. 39 is a sectional view of a seventeenth variation of the variable capacitor X2. The view corresponds to FIG. 19 which shows a section of the variable capacitor X2 in FIG. 16. In the variable capacitor X2, the movable electrodes 22, 23 may be shaped as shown in FIG. 39. In the present variation, the movable electrode 22 has an initial shape which includes portions curved toward the movable electrode 23 at places not bonded to the anchor portion 24a of the dielectric film 24. Further, in the present variation, the movable electrode 23 has an initial shape which includes portions curved toward the movable electrode 22 and further, portions 23h shown in FIG. 39 which contact with the movable electrode 22 via the dielectric film 24, within the region of the movable electrode 23 facing the movable electrode 22. When the movable electrode 23 having such a shape is driven, the area of the movable electrode 23 contacting the movable electrode 22 via the dielectric film 24 varies as the device is driven, with the portions 23h shown in FIG. 39 serving as base points. The arrangement where the movable electrodes 22, 23 contact with each other via the dielectric film 24 in their initial shapes is preferable in view of low voltage operation of the variable capacitor X2.

Figure 40:
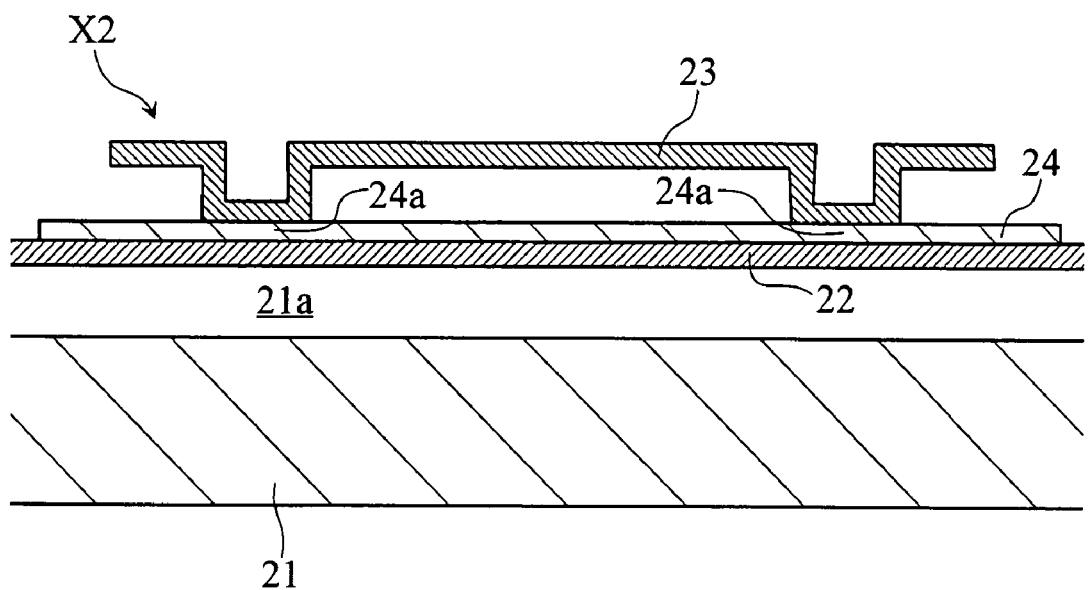
FIG. 40 is a sectional view of an eighteenth variation of the variable capacitor in FIG. 16.

FIG. 40 is a sectional view of an eighteenth variation of the variable capacitor X2. The view corresponds to FIG. 19 which shows a section of the variable capacitor X2 in FIG. 16. The movable electrodes 22, 23 according to the present variation are connected with each other via the dielectric film 24 at two locations. In other words, the present variation has two anchor portions 24a.

Figure 41:
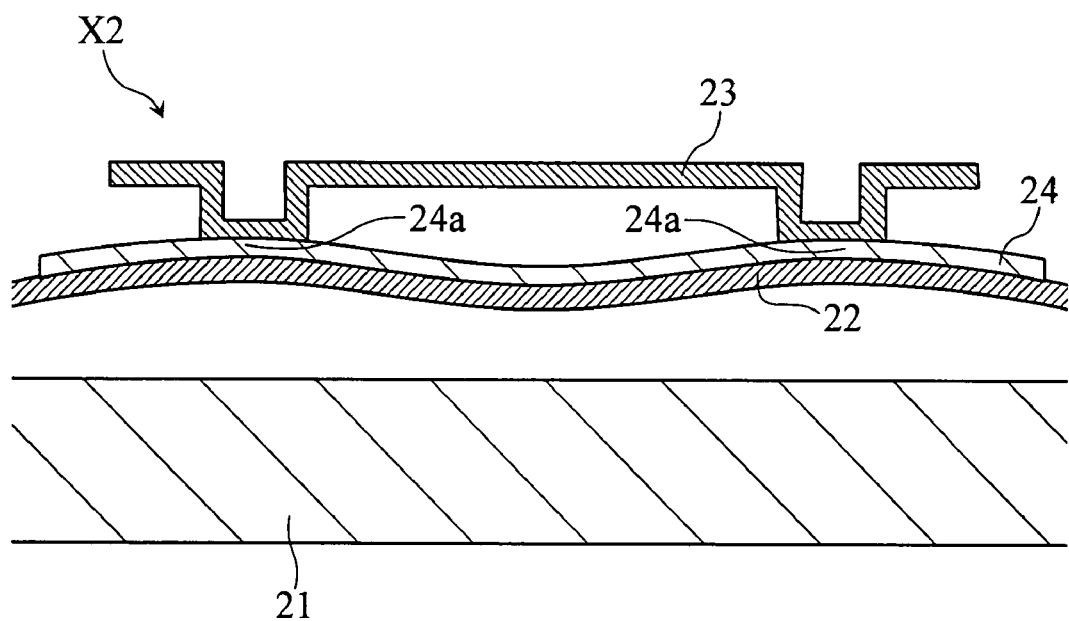
FIG. 41 is a sectional view of a nineteenth variation of the variable capacitor in FIG. 16.

FIG. 41 is a sectional view of a nineteenth variation of the variable capacitor X2. The view corresponds to FIG. 19 which shows a section of the variable capacitor X2 in FIG. 16. The movable electrodes 22, 23 according to the present variation are connected with each other via the dielectric film 24 at two locations. (In other words, the present variation has two anchor portions 24a.) Further, according to the present variation, the movable electrode 22 has an initial shape curved toward the movable electrode 23 at each place bonded to the anchor portion 24a of the dielectric film 24. The shapes of the movable electrodes 22, 23 as shown in FIG. 41 are preferable in that the shapes ensure potential partial contact between the movable electrodes 22, 23 via the dielectric film 24 during operation.

Figure 42:
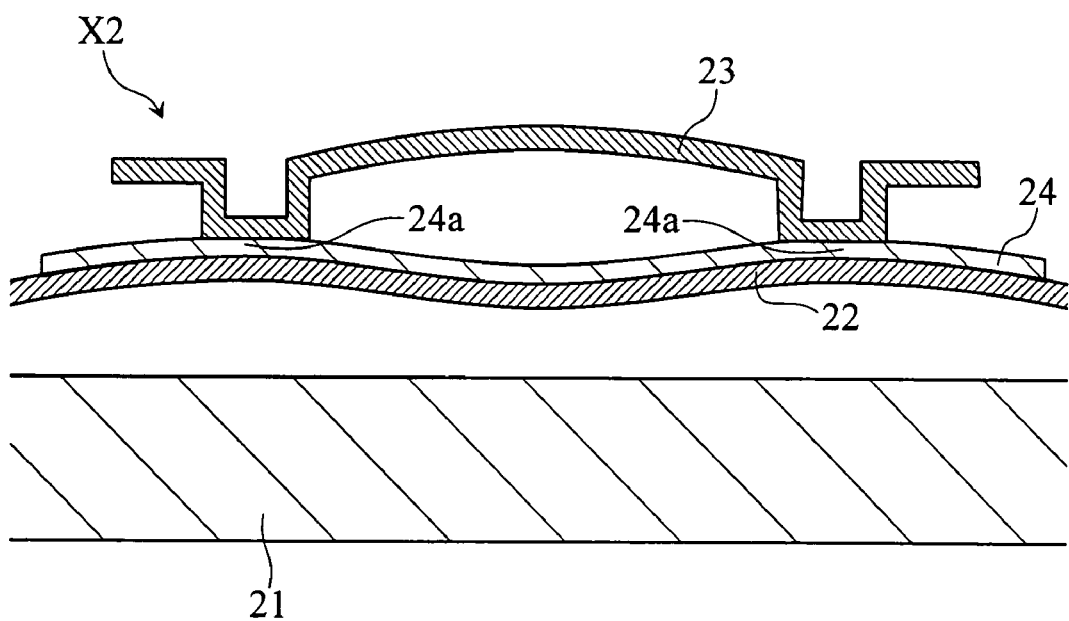
FIG. 42 is a sectional view of a twentieth variation of the variable capacitor in FIG. 16.

FIG. 42 is a sectional view of a twentieth variation of the variable capacitor X2. The view corresponds to FIG. 19 which shows a section of the variable capacitor X2 in FIG. 16. The movable electrodes 22, 23 according to the present variation are connected with each other via the dielectric film 24 at two locations. (In other words, the present variation has two anchor portions 24a.) Further, according to the present variation, the movable electrode 22 has an initial shape curved toward the movable electrode 23 at each place bonded to the anchor portion 24a of the dielectric film 24. Further, the movable electrode 23 has an initial shape which includes a portion curved away from the movable electrode 22. The shapes of the movable electrodes 22, 23 as shown in FIG. 42 are preferable in that the shapes ensure potential partial contact between the movable electrodes 22, 23 via the dielectric film 24 during operation.

Figure 43:
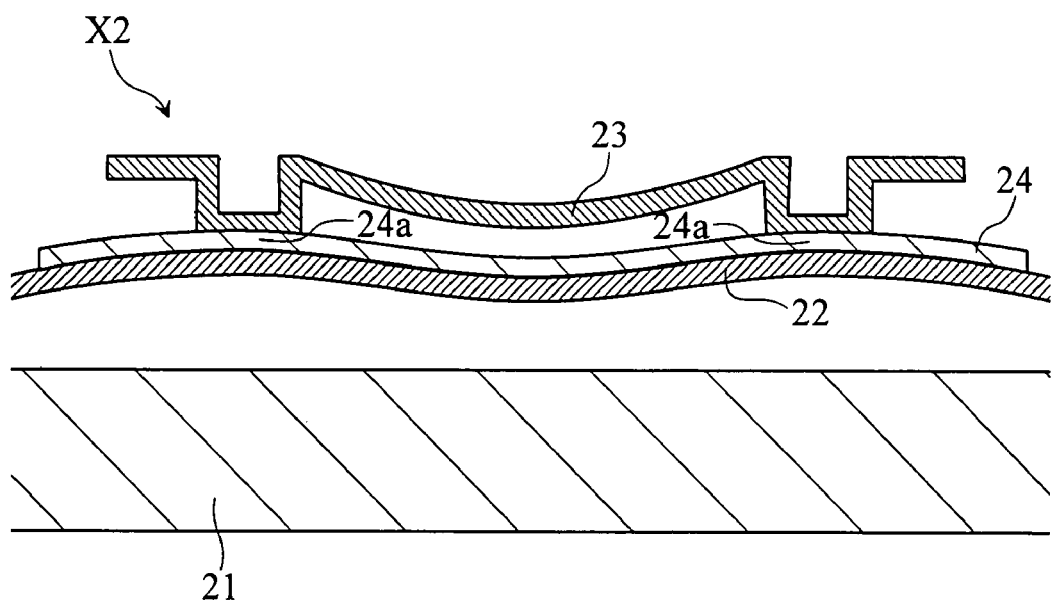
FIG. 43 is a sectional view of a twenty-first variation of the variable capacitor in FIG. 16.

FIG. 43 is a sectional view of a twenty-first variation of the variable capacitor X2. The view corresponds to FIG. 19 which shows a section of the variable capacitor X2 in FIG. 16. The movable electrodes 22, 23 according to the present variation are connected with each other via the dielectric film 24 at two locations. (In other words, the present variation has two anchor portions 24a.) Further, according to the present variation, the movable electrode 22 has an initial shape curved toward the movable electrode 23 at each place bonded to the anchor portion 24a of the dielectric film 24 whereas the movable electrode 23 has an initial shape which includes a portion curved toward the movable electrode 22. The shapes of the movable electrodes 22, 23 as shown in FIG. 43 are preferable in that the shapes ensure potential partial contact between the movable electrodes 22, 23 via the dielectric film 24 during operation.

Figure 44:
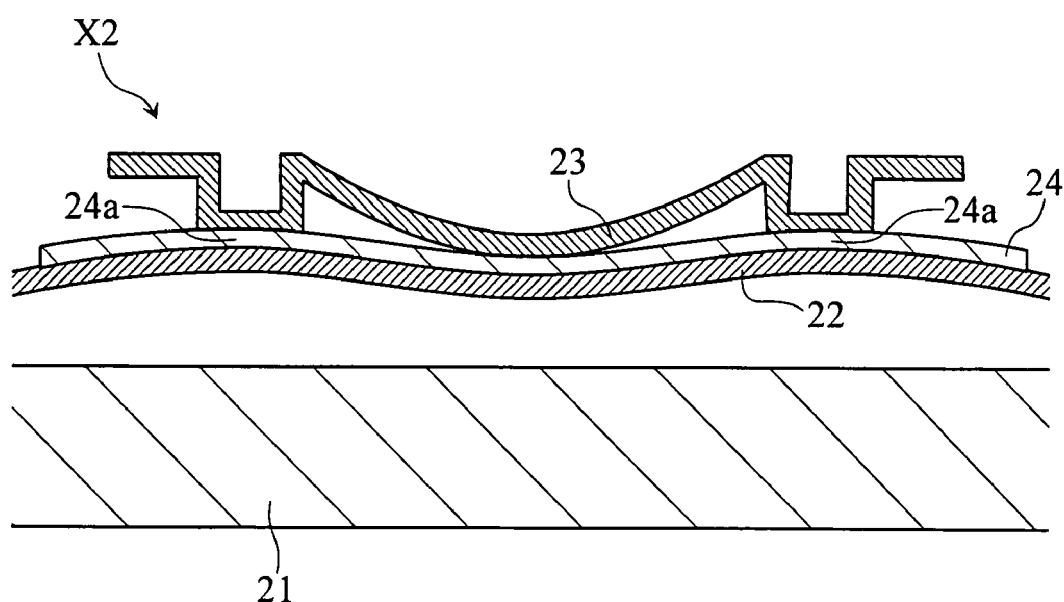
FIG. 44 is a sectional view of a twenty-second variation of the variable capacitor in FIG. 16.

FIG. 44 is a sectional view of a twenty-second variation of the variable capacitor X2. The view corresponds to FIG. 19 which shows a section of the variable capacitor X2 in FIG. 16. The movable electrodes 22, 23 according to the present variation are connected with each other, via the dielectric film 24, at two locations. (In other words, the present variation has two anchor portions 24a.) Further, according to the present variation, the movable electrode 22 has an initial shape curved toward the movable electrode 23 at each place bonded to the anchor portion 24a of the dielectric film 24. The movable electrode 23 according to the present variation has an initial shape which includes a portion curved toward the movable electrode 22, and this portion contacts with the movable electrode 22 via the dielectric film 24. The arrangement where the movable electrodes 22, 23 make mutual partial contact via the dielectric film 24 in their initial shapes is preferable in view of low voltage operation of the variable capacitor X2.

Figure 45:
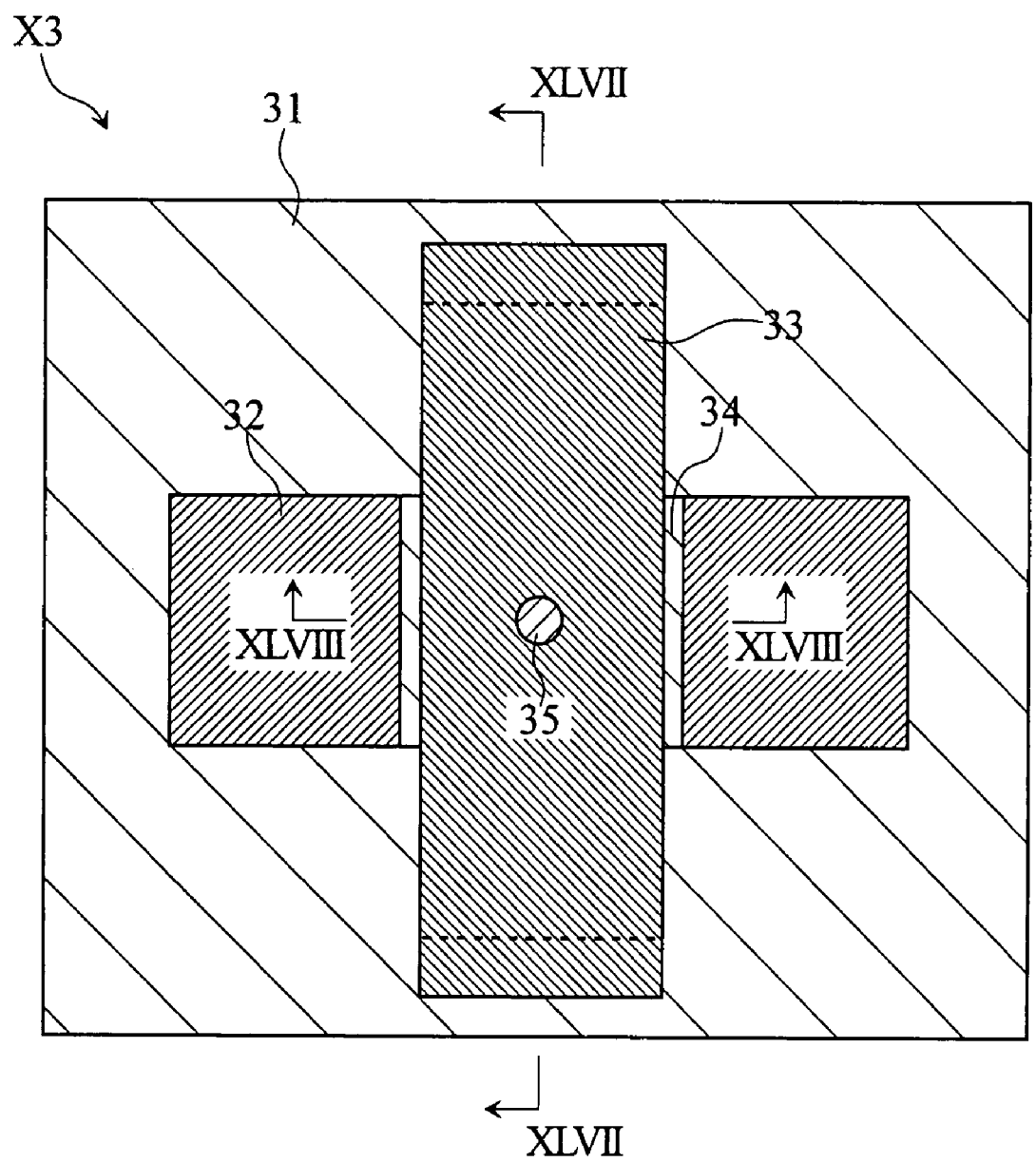
FIG. 45 is a plan view of a variable capacitor according to a third embodiment of the present invention.
Figure 46:
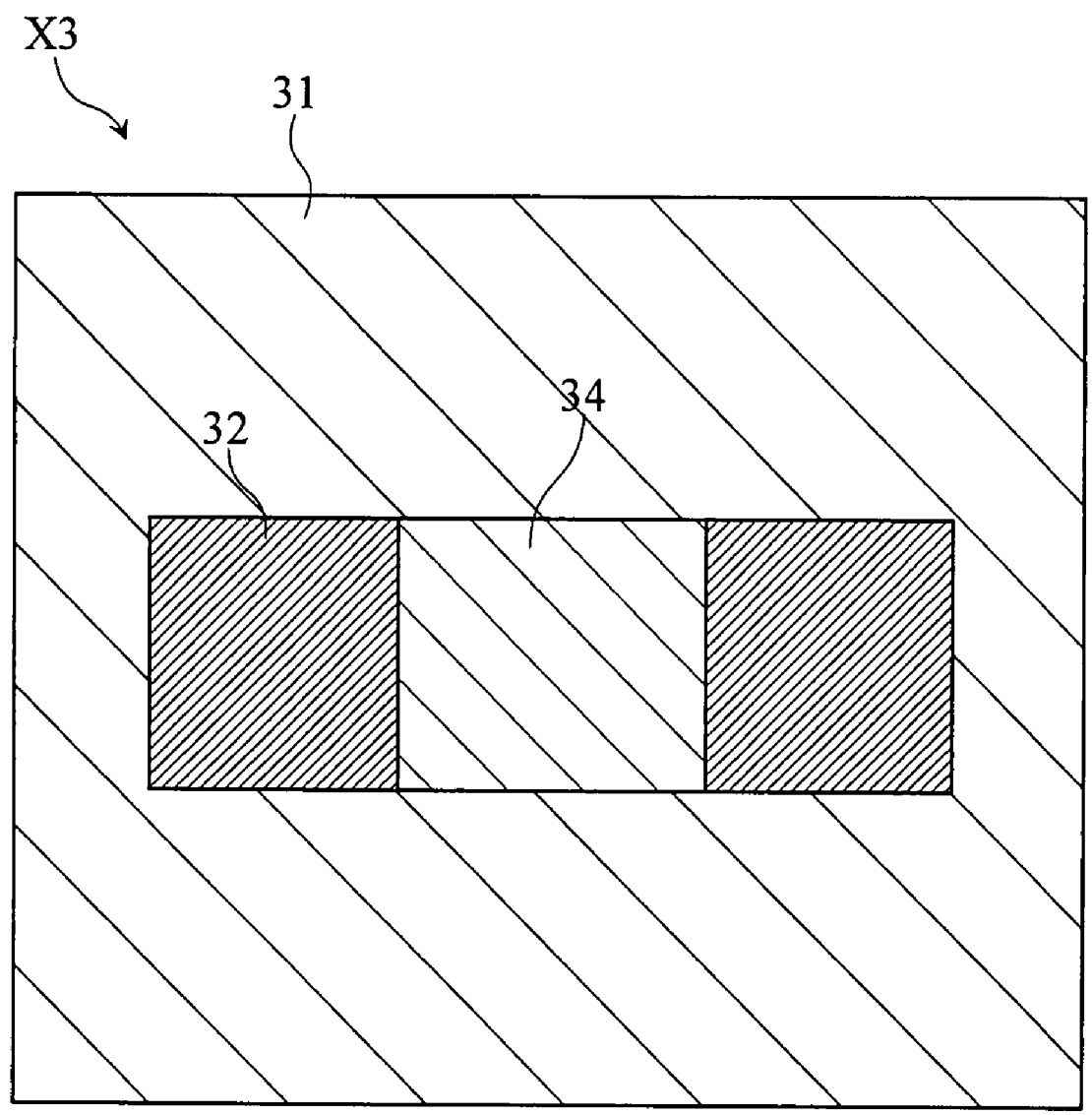
FIG. 46 is a partially unillustrated plan view of the variable capacitor according to the third embodiment of the present invention.
Figure 47:
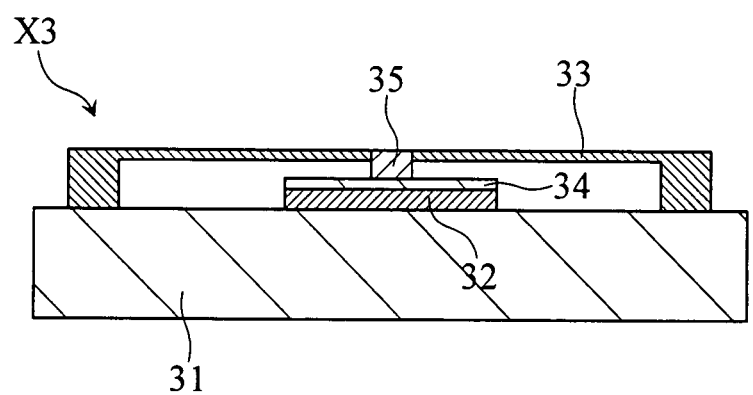
FIG. 47 is a sectional view taken in lines XLVII-XLVII in FIG. 45.
Figure 48:
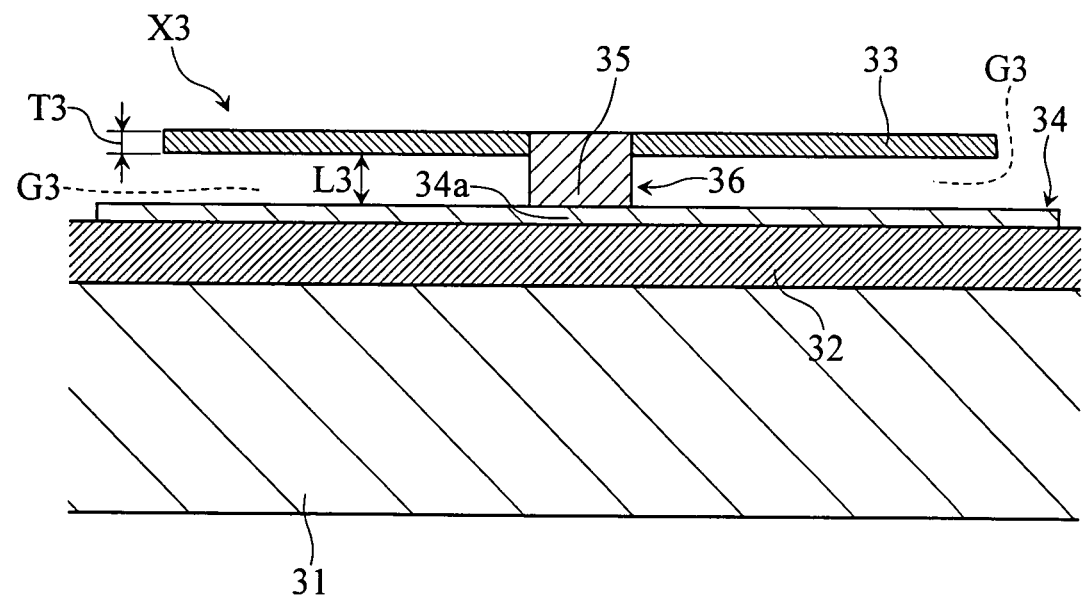
FIG. 48 is an enlarged partial sectional view taken in lines XLVIII-XLVIII in FIG. 45.

FIG. 45 through FIG. 48 show a variable capacitor X3 according to a third embodiment of the present invention. FIG. 45 is a plan view of the variable capacitor X3. FIG. 46 is a partially unillustrated plan view of the variable capacitor X3. FIG. 47 is a sectional view taken in lines XLVII-XLVII in FIG. 45. FIG. 48 is an enlarged partial sectional view taken in lines XLVIII-XLVIII in FIG. 45.

The variable capacitor X3 includes a substrate 31, a fixed electrode 32, a movable electrode 33 (not illustrated in FIG. 46), a dielectric film 34 and a plug 35. The fixed electrode 32 is formed on the substrate 31. The movable electrode 33 is built on the substrate 31. The movable electrode 33 has a thickness T3 as shown in FIG. 48, of 1 through 2 μm for example. As shown clearly in FIG. 45, the fixed electrode 32 and the movable electrode 33 cross each other, opposing partially to each other. The opposed region has an area of 10000 through 40000 μm² for example. A distance L3 shown in FIG. 48 between the fixed electrode 32 and the movable electrode 33 is 0.5 through 2 μm for example. Preferably, one of the fixed electrode 32 and the movable electrode 33 is grounded. The dielectric film 34 is formed on the fixed electrode 32, on a side facing the movable electrode 33. The dielectric film 34 has a thickness of 0.1 through 0.5 μm for example. The substrate 31, the fixed electrode 32, the movable electrode 33, and the dielectric film 34 are formed of the same materials as are their respective counterparts in the first embodiment, i.e. the substrate 11, the fixed electrode 12, the movable electrode 13, and the dielectric film 14. The plug 35 penetrates the movable electrode 33, is bonded to the movable electrode 33, and is bonded to the dielectric film 34. The plug 35 as described above is made of a dielectric material such as alumina ($Al_2O_3$), silicon oxide ($SiO_2$) and silicon nitride ($SiN_x$). A predetermined wiring pattern (not illustrated) electrically connected with the fixed electrode 32 or with the movable electrodes 33 is formed on the substrate 31.

In the variable capacitor X3 shown in FIG. 45, an anchor portion 36 according to the present invention is constituted by the plug 35 and, as clearly shown in FIG. 48, a portion 34*a* of the dielectric film 34 which the plug is bonded to. The anchor portion 36 provides a partial connection between the mutually opposed fixed electrode 32 and movable electrode 33.

Figure 49:
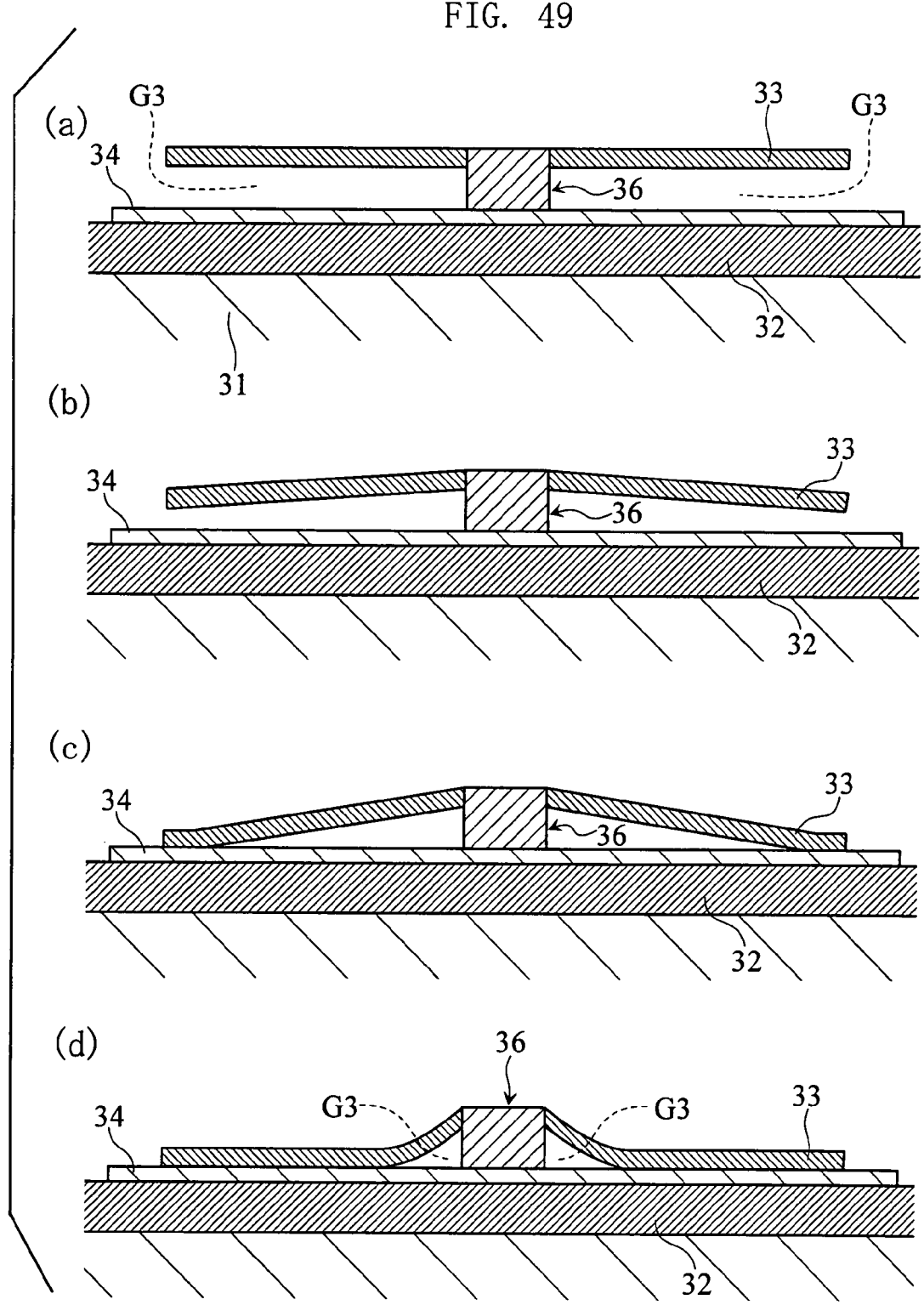
FIG. 49 shows different states of operation of the variable capacitor in FIG. 45.

According to the variable capacitor X3 which has the constitution as described above, it is possible to generate an electrostatic attraction between the fixed electrode 32 and the movable electrode 33 by applying a voltage between the fixed electrode 32 and the movable electrode 33, and by using the electrostatic attraction, it is possible to draw the movable electrode 33 toward the fixed electrode 32, excluding the region bonded to the anchor portion 36, and thereby varying the volume of a gap G3 between the fixed electrode 32 and the movable electrode 33 as shown in FIG. 49. (The amount or the distance of the drawing movement toward the fixed electrode 32 is not uniform over the entire region of the movable electrode 33 which faces the fixed electrode 32. The region bonded to the anchor portion 36 is not moved at all, and regions of the movable electrode 33 closer to the junction tend to be drawn by a smaller amount). The electrostatic capacitance of the variable capacitor X3 varies in accordance with the gap volume. Therefore, according to the variable capacitor X3, it is possible to control the electrostatic capacitance by controlling the drive voltage (0 through 20 V for example) which is applied between the fixed electrode 32 and the movable electrode 33.

Further, according to the variable capacitor X3, the movable electrode 33 is partially connected with or joined on the fixed electrode 32 by the anchor portion 36; this reduces shape deformation or curving of the movable electrode 33 caused by temperature changes both in operation and in non-operation. Specifically, shape deformation or curving of the movable electrode 33 caused by temperature changes becomes less even if the thermal expansion rate of the substrate 31 differs from the thermal expansion rate of the movable electrode 33, and even if the difference is relatively large. Since curving of the movable electrode 33 is reduced in its initial shape (the shape in non-operation), inconsistency in initial electrostatic capacitance (0.5 through 1 pF for example) during non-operation is reduced in the variable capacitor X3. Further, because of the reduced shape deformation of the movable electrode 33 caused by temperature changes both during operation and during non-operation, inconsistency in the relationship between electrostatic capacitance and drive voltage is reduced also. As described, the variable capacitor X3 is well suited to reduce electrostatic capacitance inconsistency caused by temperature changes. The variable capacitor X3 as described above is able to operate highly accurately.

In addition, according to the variable capacitor X3, it is possible to vary the electrostatic capacitance widely. As has been described earlier, in the conventional variable capacitor Y, the movable electrode 93 must be moved within a limited range in order to avoid so called pull-in phenomenon, so it is not possible to vary the electrostatic capacitance over a wide range. On the contrary, according to the variable capacitor X3 provided by the present invention, it is possible as shown in FIG. 49(*c*) and FIG. 49(*d*), to make the movable electrode 33 partially contact with the fixed electrode 32 via the dielectric film 34 and further, to control the area of partial contact. Hence, according to the variable capacitor X3, it is possible to vary the gap volume between the fixed electrode 32 and the movable electrode 33 widely from the initial state shown in FIG. 49(*a*) to the state where the area of contact between the fixed electrode 32 and the movable electrode 33 via the dielectric film 14 reaches a maximum value (e.g. the state as shown in FIG. 49(*d*)). In addition to this, according to the variable capacitor X3, the movable electrode 33 has no region which faces the fixed electrode 32 via the anchor portion 36. In other words, there is no partial capacitor structure which has an invariable electrode-to-electrode distance via the anchor portion 36 (and therefore has a fixed electrostatic capacitance). If a variable capacitor includes a partial capacitor structure which has a fixed electrostatic capacitance, a minimum electrostatic capacitance for the entire variable capacitor cannot be smaller than the fixed electrostatic capacitance. On the contrary, the variable capacitor X3 which does not include any partial capacitor structure that has a fixed electrostatic capacitance does not have such a limitation to the minimum electrostatic capacitance for the entire variable capacitor. Hence, it is easy in the variable capacitor X3, to offer a small minimum electrostatic capacitance. As described, according to the variable capacitor X3, it is possible to vary the gap volume between the fixed electrode 32 and the movable electrode 33 widely, and to make a setting for a small value for the minimum electrostatic capacitance because of the structure where there is no fixed electrode-to-electrode distance via the anchor portion 36. Therefore, the variable capacitor X3 is capable of offering a large amount or rate, of electrostatic capacitance variation.

FIG. 50 shows a method of making the variable capacitor X3, in a series of sectional views each corresponding to the section shown in FIG. 47. The present method uses so called MEMS technology for the manufacture of the variable capacitor X3.

In the manufacture of the variable capacitor X3, first as shown in FIG. 50(*a*), a fixed electrode 32 and a dielectric film 34 are formed in lamination on a substrate 31. The fixed electrode 32 and the dielectric film 34 can be formed by the same procedures as used for formation of the fixed electrode 12 and the dielectric film 14 described with reference to FIG. 6(*a*).

Next, as shown in FIG. 50(*b*), a sacrifice film 37 is formed. The sacrifice film 37 has an opening 37*a* for partially exposing the dielectric film 34, and openings 37*b* for partially exposing the substrate 31. A part 34*a* of the dielectric film 34 which is the part exposed by the opening 37*a* will be part of the anchor portion 36 described earlier. The sacrifice film 37 can be formed of the same material and by the same procedures as used for formation of the sacrifice film 15 described earlier with reference to FIG. 6(*b*). By controlling the thickness of the sacrifice film 37 formed in this step, it is possible to control the initial-state distance L3 between the fixed electrode 32 and the movable electrodes 33 in the variable capacitor X3 obtained.

Next, as shown in FIG. 50(c), a movable electrode 33 is formed. The movable electrode 33 has an opening 33a which communicates with the opening 37a of the sacrifice film 37. The movable electrode 33 is formed by e.g. first forming a film of aluminum on the sacrifice film 37 and in the openings 37a, 37b by sputtering method, and then etching the film of aluminum via a mask of a predetermined resist pattern. Note that for the sake of simplicity in the drawing, the two ends of movable electrode 33 are shown as formed by filling the openings 37b in the sacrifice film 37 with an electrically conductive material.

Next, a plug 35 is formed as shown in FIG. 50(d). The plug 35 can be formed by e.g. sputtering method thereby filling the through hole provided by the openings 33a, 37a, with a dielectric material.

Thereafter, wet etching is performed with a predetermined resist remover, to remove the sacrifice film 37. By following the above-described steps, the variable capacitor X3 can be manufactured successfully.

Figure 51:
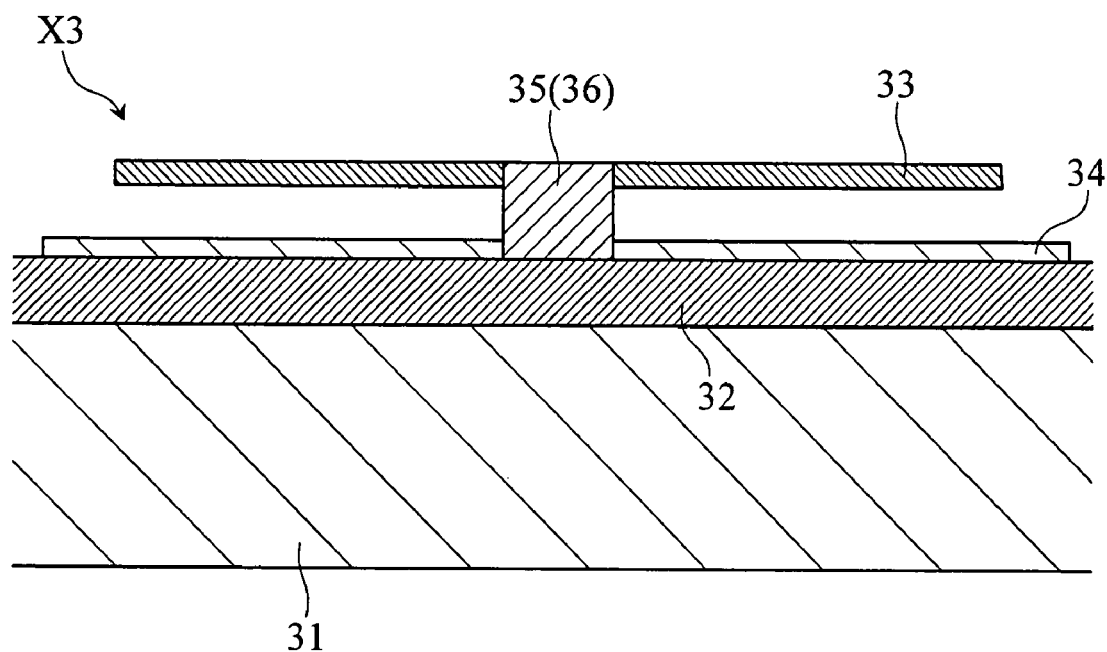
FIG. 51 is a sectional view of a first variation of the variable capacitor in FIG. 45.

FIG. 51 is a sectional view of a first variation of the variable capacitor X3. The view corresponds to FIG. 48 which shows a section of the variable capacitor X3 in FIG. 45. As shown in FIG. 51, in the variable capacitor X3, the plug 35 may penetrate the dielectric film 34, to be bonded to the fixed electrode 32. In such a variation, the plug 35 constitutes an anchor portion 36 which provides partial connection between the mutually opposed fixed electrode 32 and movable electrode 33. The present variation can be manufactured by the same method as described above as for the manufacture of the variable capacitor X3, with an additional step after the one shown in FIG. 50(a), of making an opening in the dielectric film 34 which is to be fitted by the plug 35 according to the present variation.

Figure 52:
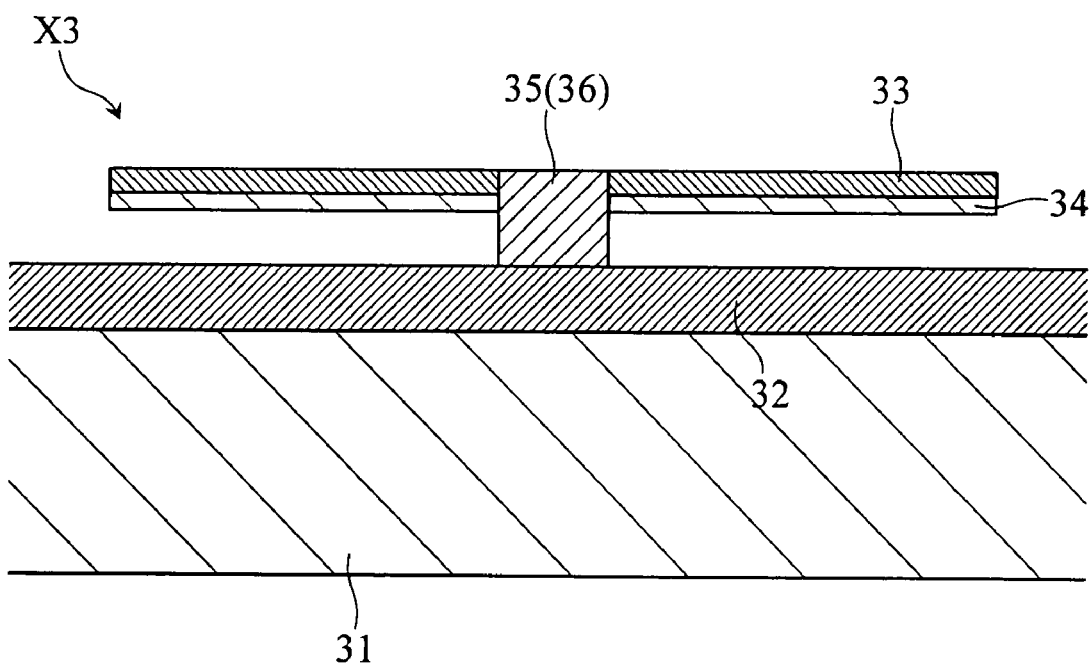
FIG. 52 is a sectional view of a second variation of the variable capacitor in FIG. 45.

FIG. 52 is a sectional view of a second variation of the variable capacitor X3. The view corresponds to FIG. 48 which shows a section of the variable capacitor X3 in FIG. 45. In the variable capacitor X3, a dielectric film 34 is formed on the fixed electrode 32, on the side facing the movable electrode 33; instead of this arrangement, a dielectric film 34 may be formed on the movable electrode 33, on the side facing the fixed electrode 32 as shown in FIG. 52. In such a variation, the plug 35 constitutes an anchor portion 36 which provides partial connection between the mutually opposed fixed electrode 32 and movable electrode 33. The present variation can be manufactured by the same method as described above for the manufacture of the variable capacitor X3, with the following changes for example: Specifically, the step of forming the sacrifice film 37 after the formation of the dielectric film 34 is replaced by a step of forming a sacrifice film 37 which has an opening 37a and covers the fixed electrode 32, and a step thereafter of forming a dielectric film 34 which has a predetermined opening that communicates with the opening 37a on the dielectric film 37.

Figure 53:
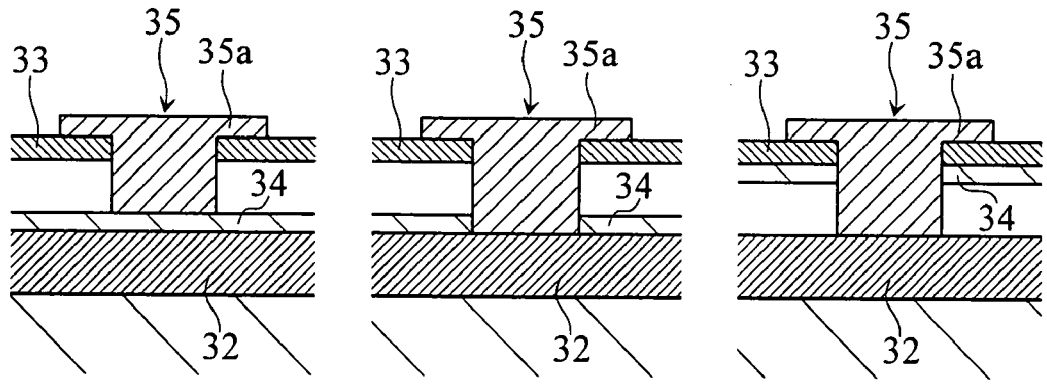
FIG. 53 shows sectional views of plugs having a cap.

As shown in FIG. 53, the plug 35 according to the variable capacitor X3 including the first variation and the second variation may have a cap 35a. The caps 35a as shown help ensure the bonding relationship between the movable electrode 33 and the plug 35.

The movable electrode 33 according to the variable capacitor X3 including the first variation and the second variation may be like the movable electrode 13 according to one of the variations of the variable capacitor X1 shown in FIG. 11 and FIG. 14, i.e. may have an initial shape which includes curved portions. Otherwise, the movable electrode 33 according to the variable capacitor X3 including the first variation and the second variation may be like the movable electrode 13 according to one of the variations of the variable capacitor X1 shown in FIG. 13 and FIG. 15, i.e. may have an initial shape which includes curved portions as well as having portions contacting with the fixed electrode via the dielectric film.

Figure 54:
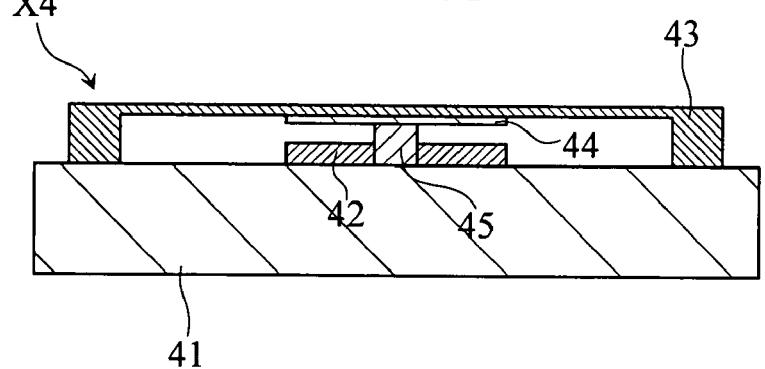
FIG. 54 is a sectional view of a variable capacitor according to a fourth embodiment of the present invention.
Figure 55:
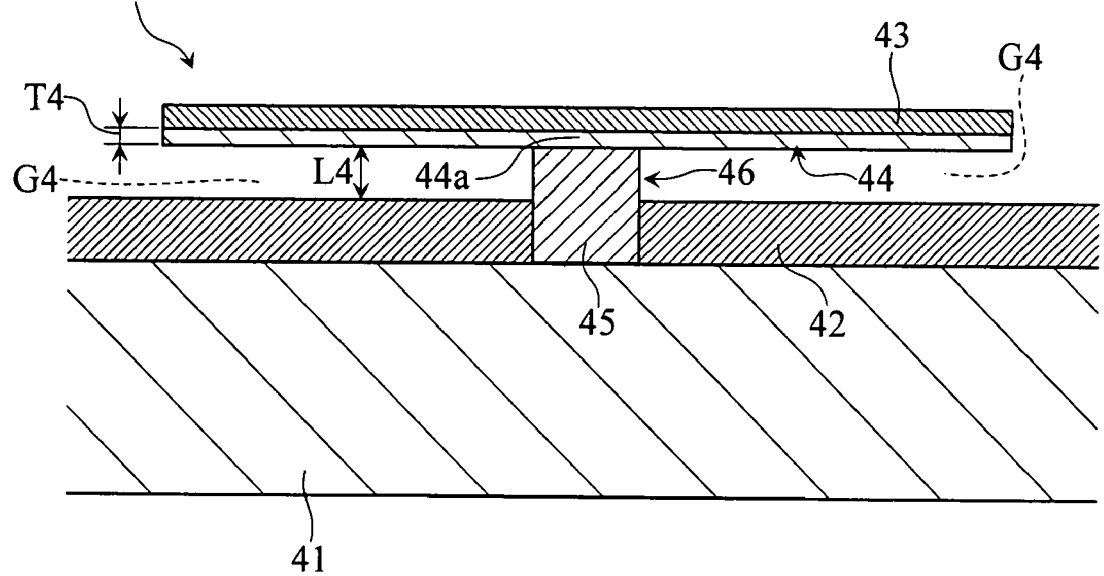
FIG. 55 is an enlarged partial sectional view of the variable capacitor according to the fourth embodiment of the present invention.

FIG. 54 and FIG. 55 show a variable capacitor X4 according to a fourth embodiment of the present invention. FIG. 54 is a sectional view of the variable capacitor X4, and corresponds to FIG. 47 which shows a section of the variable capacitor X3 described above. FIG. 55 is an enlarged partial sectional view of the variable capacitor X4, and corresponds to FIG. 48 which shows a section of the variable capacitor X3 described above.

The variable capacitor X4 includes a substrate 41, a fixed electrode 42, a movable electrode 43, a dielectric film 44 and a plug 45. The fixed electrode 42 is formed on the substrate 41. The movable electrode 43 is built on the substrate 41. The fixed electrode 42 and the movable electrode 43 cross each other, opposing partially to each other. A distance L4 shown in FIG. 55 between the fixed electrode 42 and the movable electrode 43 is 0.5 through 2 μm for example. Preferably, one of the fixed electrode 42 and the movable electrode 43 is grounded. The dielectric film 44 is formed on the movable electrode 43, on a side facing the fixed electrode 42. The plug 45 penetrates the fixed electrode 42, is bonded to the fixed electrode 42, and is bonded to the dielectric film 44. A predetermined wiring pattern (not illustrated) electrically connected with the fixed electrode 42 or with the movable electrodes 43 is formed on the substrate 41. The substrate 41, the fixed electrode 42, the movable electrode 43, and the dielectric film 44 are formed of the same materials as are their respective counterparts in the first embodiment, i.e. the substrate 11, the fixed electrode 12, the movable electrode 13, and the dielectric film 14. The plug 45 is formed of the same material as is the plug 35 in the third embodiment.

In the variable capacitor X4 shown in FIG. 54, an anchor portion 46 according to the present invention is constituted by the plug 45 and, as clearly shown in FIG. 55, a portion 44a of the dielectric film 44 which the plug is bonded to. The anchor portion 46 provides a partial connection between the mutually opposed fixed electrode 42 and movable electrode 43.

According to the variable capacitor X4 which has the constitution as described above, it is possible, as described earlier for the variable capacitor X3, to control the electrostatic capacitance by controlling the drive voltage (0 through 20 V for example) which is applied between the fixed electrode 42 and the movable electrode 43. Further, according to the variable capacitor X4, the movable electrode 43 is partially connected with or joined on the fixed electrode 42 by the anchor portion 46, and therefore shape deformation or curving of the movable electrode 43 caused by temperature changes is reduced both during operation and during non-operation. The variable capacitor X4 as described is able to operate highly accurately as is the variable capacitor X3. In addition, according to the variable capacitor X4, it is possible to vary the gap volume between the fixed electrode 42 and the movable electrode 43 widely, and to make a setting for a small value for the minimum electrostatic capacitance because of the structure where there is no fixed electrode-to-electrode distance via the anchor portion 46. Therefore, the variable capacitor X4 is capable of offering a large amount or rate, of electrostatic capacitance variation as is the variable capacitor X3.

Figure 56:
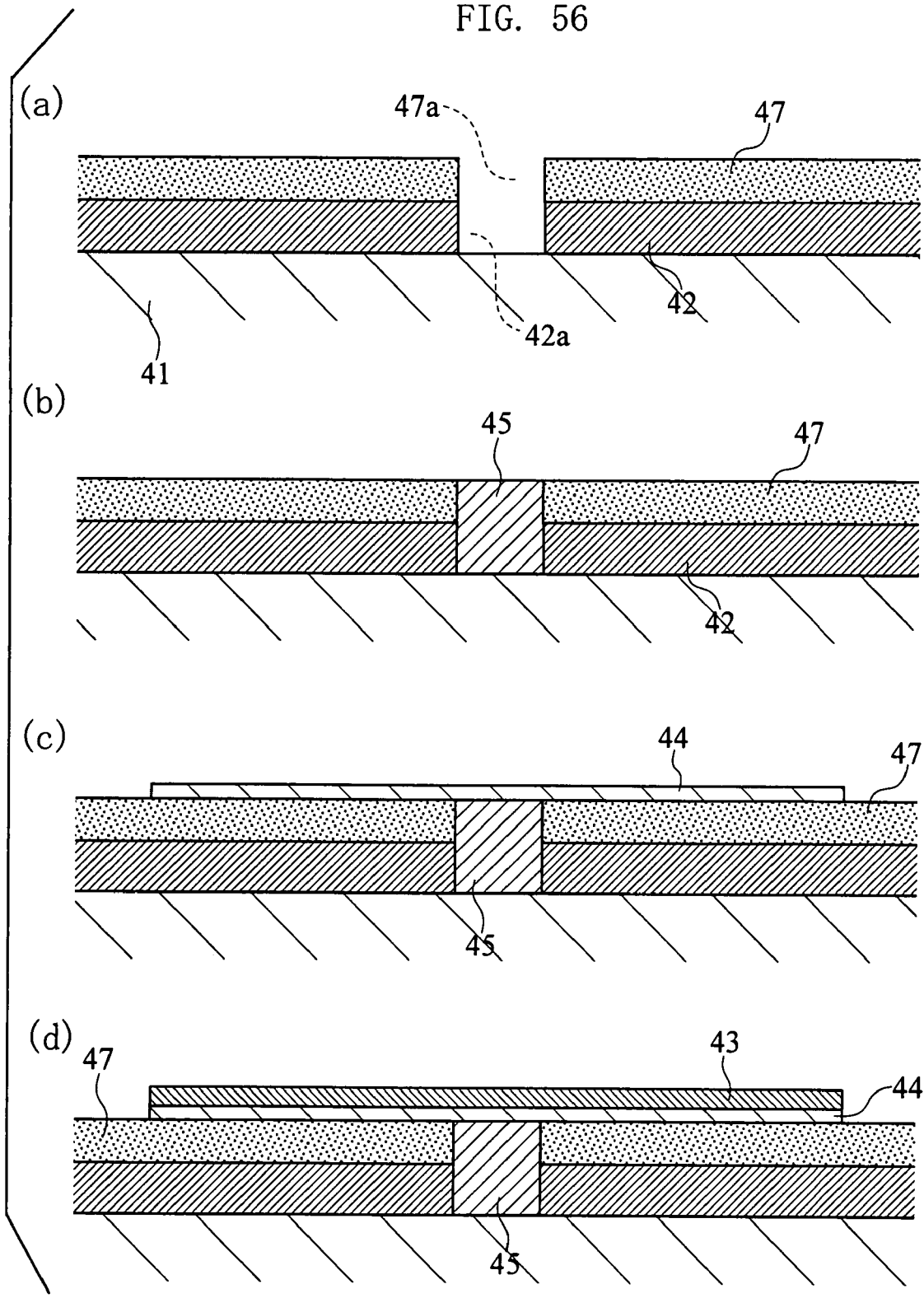
FIG. 56 shows part of a method of making the variable capacitor in FIG. 54.

FIG. 56 shows a method of making the variable capacitor X4, in a series of sectional views each corresponding to the section shown in FIG. 55. The present method uses so called MEMS technology for the manufacture of the variable capacitor X4.

In the manufacture of the variable capacitor X4, first as shown in FIG. 56(a), a fixed electrode 42 and a sacrifice film 47 are formed in lamination on a substrate 41. The fixed electrode 42 has an opening 42a, and the sacrifice film 47 has an opening 47a which communicates with the opening 42a, and an unillustrated opening for partially exposing the substrate 41. The fixed electrode 42 can be formed by e.g. first forming a film of aluminum on the substrate 41 by sputtering method to cover the fixed electrode 43, and then etching the film of aluminum via a mask of a predetermined resist pattern. The sacrifice film 47 can be formed by e.g. first forming a film of sacrifice material on the substrate 41 by sputtering method, and then etching the film via a mask of a predetermined resist pattern. By controlling the thickness of the sacrifice film 47, it is possible to control the initial-state distance L4 between the fixed electrode 42 and the movable electrodes 43 in the variable capacitor X4 obtained.

Next, a plug 45 is formed as shown in FIG. 56(d). The plug 45 can be formed by e.g. sputtering method thereby filling the through hole provided by the openings 42a, 47a, with a dielectric material.

Next, a dielectric film 44 is formed as shown in FIG. 56(c). The dielectric film 44 is formed by e.g. forming a film of a predetermined dielectric material at predetermined locations by sputtering method, and then etching the film via a mask of a predetermined resist pattern. The dielectric film 44 obtained in this way bonds to the plug 45.

Next, a movable electrode 43 is formed as shown in FIG. 56(d). The movable electrode 43 is formed by e.g. forming a film of aluminum on the sacrifice film 47 and in the above-mentioned unillustrated opening in the sacrifice film 47 by sputtering, and then etching the film via a mask of a predetermined resist pattern.

Thereafter, the sacrifice film 47 is removed by wet etching which is performed with a predetermined resist remover. By following the above-described steps, the variable capacitor X4 can be manufactured successfully.

Figure 57:
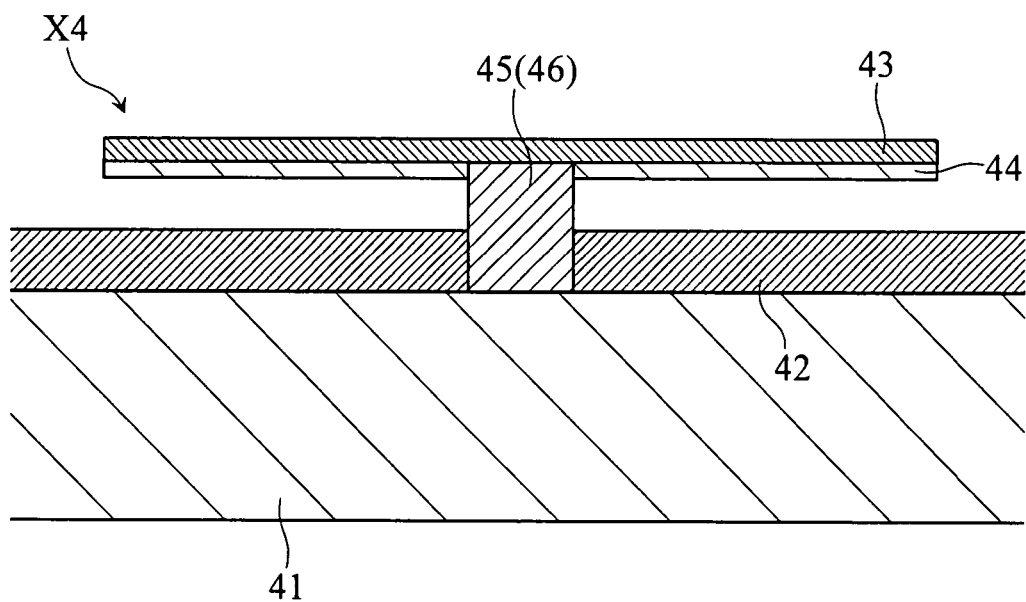
FIG. 57 is a sectional view of a first variation of the variable capacitor in FIG. 54.

FIG. 57 is a sectional view of a first variation of the variable capacitor X4. The view corresponds to FIG. 55 which shows a section of the variable capacitor X4 in FIG. 54. In the variable capacitor X4, the plug 45 may penetrate the dielectric film 44 to be bonded to the movable electrode 43 as shown in FIG. 57. In such a variation, the plug 45 constitutes an anchor portion 46 which provides partial connection between the mutually opposed fixed electrode 42 and movable electrode 43. The present variation can be manufactured by the same method as described above for the manufacture of the variable capacitor X4, with the following change for example: Specifically, the steps of forming the plug 45 and then the dielectric film 44 are replaced by a step of forming a dielectric film 44 which has a predetermined opening that communicates with the opening 47a of the sacrifice film 47 on the sacrifice film 47, and a step thereafter of forming a plug 45 according to the present variation that penetrates the fixed electrode 42, the sacrifice film 47, and the dielectric film 44.

Figure 58:
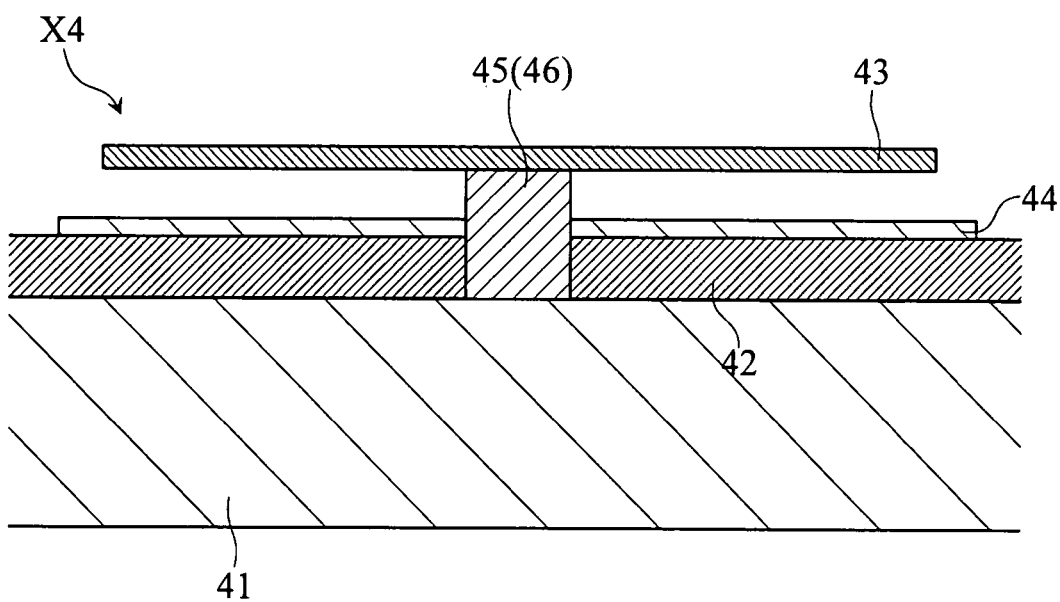
FIG. 58 is a sectional view of a second variation of the variable capacitor in FIG. 54.

FIG. 58 is a sectional view of a second variation of the variable capacitor X4. The view corresponds to FIG. 55 which shows a section of the variable capacitor X4 in FIG. 54. In the variable capacitor X4, a dielectric film 44 is formed on the movable electrode 43, on the side facing the fixed electrode 42; instead of this arrangement, a dielectric film 44 may be formed on the fixed electrode 42, on the side facing the movable electrode 43 as shown in FIG. 58. In such a variation, the plug 45 constitutes an anchor portion 46 which provides partial connection between the mutually opposed fixed electrode 42 and movable electrode 43. The present variation can be manufactured by the same method as described above for the manufacture of the variable capacitor X4, with the following change for example: Specifically, the steps of forming the plug 45 and then the dielectric film 44 are replaced by a step of forming a fixed electrode 42 which has an opening 42a, and a step thereafter of forming a dielectric film 44 which has a predetermined opening that communicates with the opening 42a, on the fixed electrode 42.

The movable electrode 43 according to the variable capacitor X4 including the first variation and the second variation may be like the movable electrode 13 according to one of the variations of the variable capacitor X1 shown in FIG. 11 and FIG. 14, i.e. may have an initial shape which includes curved portions. Otherwise, the movable electrode 43 according to the variable capacitor X4 including the first variation and the second variation may be like the movable electrode 13 according to one of the variations of the variable capacitor X1 shown in FIG. 13 and FIG. 15, i.e. may have an initial shape which includes curved portions as well as having portions contacting with the fixed electrode via the dielectric film.

Figure 59:
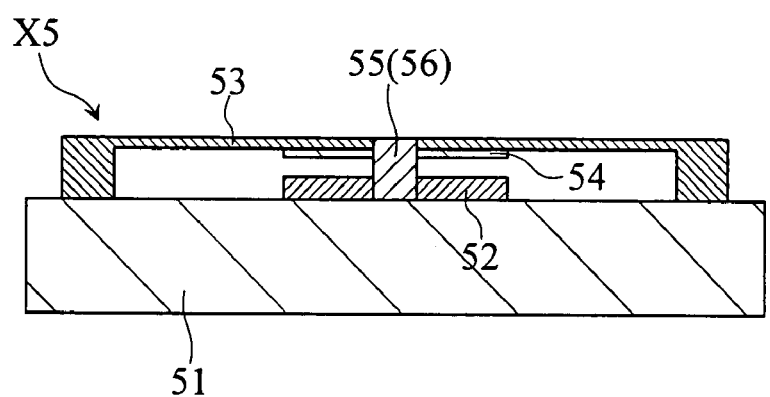
FIG. 59 is a sectional view of a variable capacitor according to a fifth embodiment of the present invention.
Figure 60:
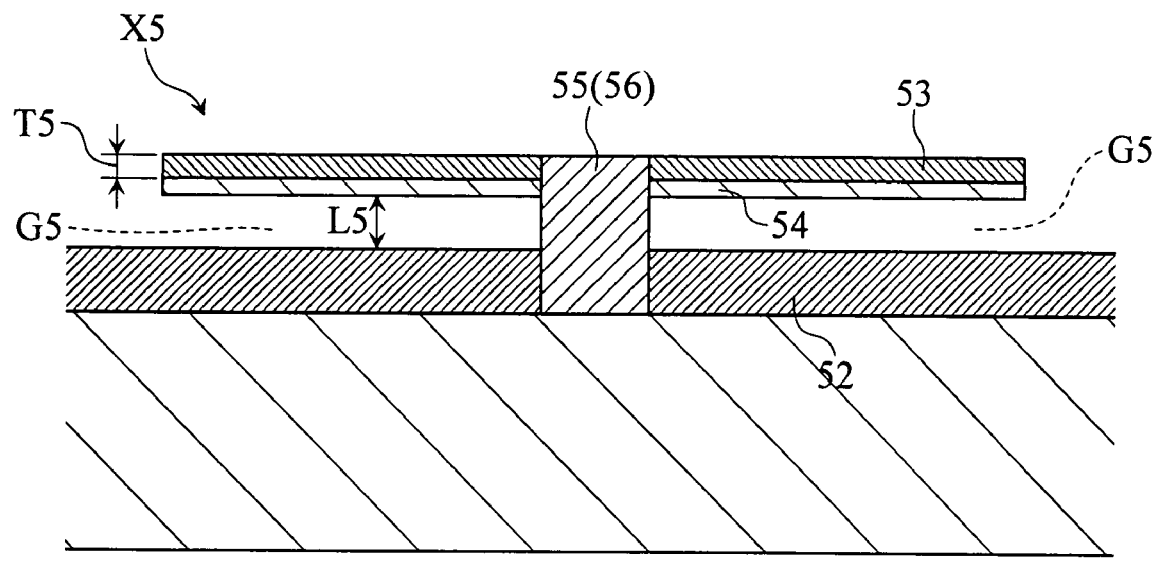
FIG. 60 is an enlarged partial sectional view of the variable capacitor according to the fifth embodiment of the present invention.

FIG. 59 and FIG. 60 show a variable capacitor X5 according to a fifth embodiment of the present invention. FIG. 59 is a sectional view of the variable capacitor X5, and corresponds to FIG. 47 which shows a section of the variable capacitor X3 described above. FIG. 60 is an enlarged partial sectional view of the variable capacitor X5, and corresponds to FIG. 48 which shows an enlarged partial sectional view of the variable capacitor X3 described above.

The variable capacitor X5 includes a substrate 51, a fixed electrode 52, a movable electrode 53, a dielectric film 54 and a plug 55. The fixed electrode 52 is formed on the substrate 51. The movable electrode 53 is built on the substrate 51. The fixed electrode 52 and the movable electrode 53 cross each other, opposing partially to each other. A distance L5 shown in FIG. 60 between the fixed electrode 52 and the movable electrode 53 is 0.5 through 2 µm for example. Preferably, one of the fixed electrode 52 and the movable electrode 53 is grounded. The dielectric film 54 is formed on the movable electrode 53, on a side facing the fixed electrode 52. The plug 55 penetrates the fixed electrode 52 and is bonded to the fixed electrode 52; and further, penetrates the dielectric film 54 and the movable electrode 53 and is bonded to the movable electrode 53. A predetermined wiring pattern (not illustrated) electrically connected with the fixed electrode 52 or with the movable electrode 53 is formed on the substrate 51. The substrate 51, the fixed electrode 52, the movable electrode 53, and the dielectric film 54 are formed of the same materials as are their respective counterparts in the first embodiment, i.e. the substrate 11, the fixed electrode 12, the movable electrode 13, and the dielectric film 14. The plug 55 is formed of the same material as is the plug 35 in the third embodiment.

In the variable capacitor X5 shown in FIG. 59, an anchor portion 56 according to the present invention is constituted by the plug 55. The anchor portion 56 provides a partial connection between the mutually opposed fixed electrode 52 and the movable electrode 53.

According to the variable capacitor X5 which has the constitution as described above, it is possible, as described earlier for the variable capacitor X3, to control the electrostatic capacitance by controlling the drive voltage (0 through 20 V for example) which is applied between the fixed electrode 52 and the movable electrode 53. Further, according to the variable capacitor X5, the movable electrode 53 is partially connected with or joined on the fixed electrode 52 by the anchor portion 56, and therefore shape deformation or curving of the movable electrode 53 caused by temperature changes is reduced both during operation and during non-operation. The variable capacitor X5 as described is able to operate highly accurately as is the variable capacitor X3. In addition, according to the variable capacitor X5, it is possible to vary the gap volume between the fixed electrode 52 and the movable electrode 53 widely, and to make a setting for a small value for the minimum electrostatic capacitance because of the structure where there is no fixed electrode-to-electrode distance via the anchor portion 56. Therefore, the variable capacitor X5 is capable of offering a large amount or rate, of electrostatic capacitance variation as is the variable capacitor X3.

Figure 61:
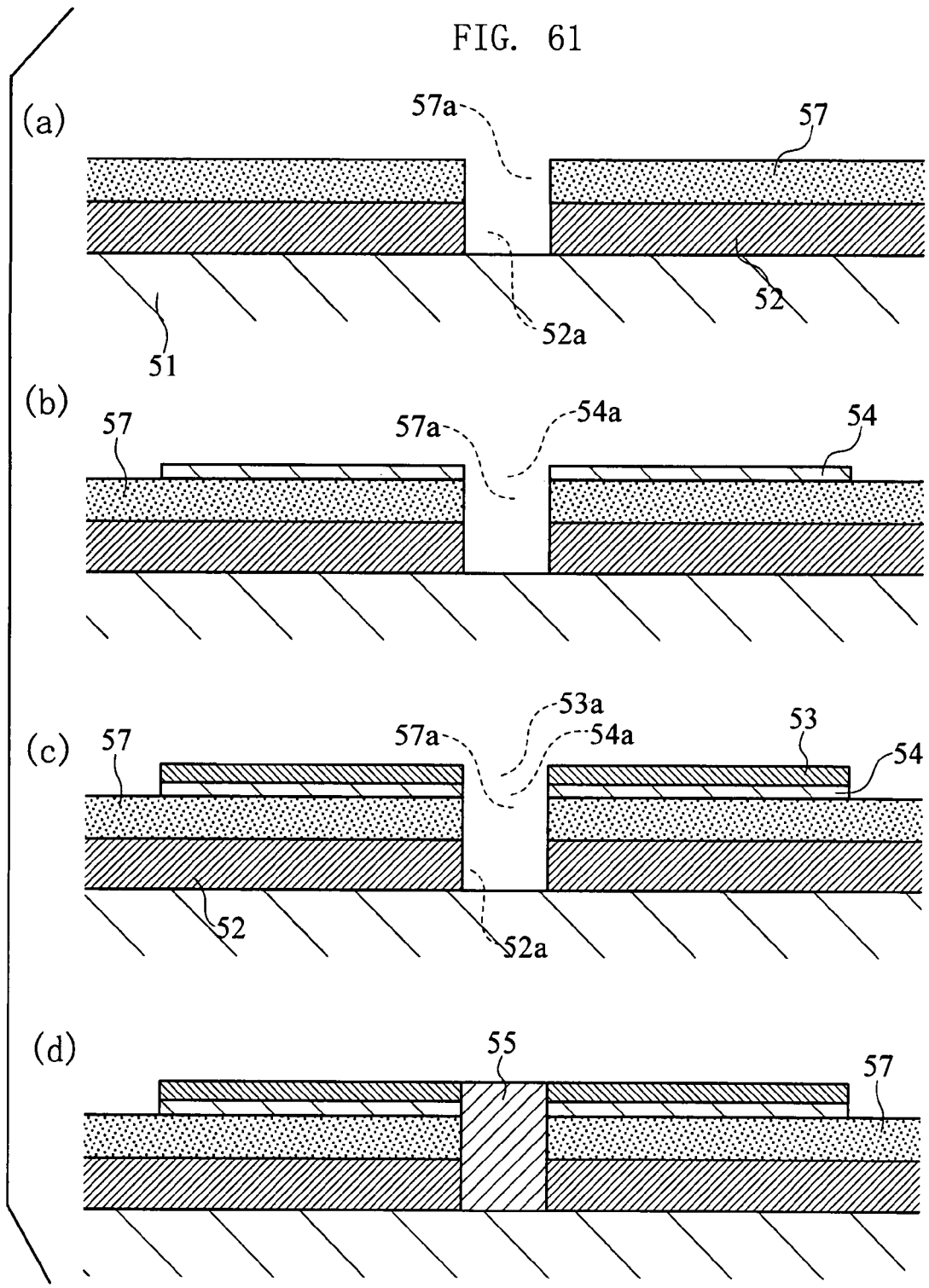
FIG. 61 shows part of a method of making the variable capacitor in FIG. 59.

FIG. 61 shows a method of making the variable capacitor X5, in a series of sectional views each corresponding to the section shown in FIG. 60. The present method uses so called MEMS technology for the manufacture of the variable capacitor X5.

In the manufacture of the variable capacitor X5, first as shown in FIG. 61(a), a fixed electrode 52 and a sacrifice film 57 are formed in lamination on a substrate 51. The fixed electrode 52 has an opening 52a, and the sacrifice film 57 has an opening 57a which communicates with the opening 52a, and an unillustrated opening for partially exposing the substrate 51. The fixed electrode 52 and the sacrifice film 57 can be formed by the same procedures as used for formation of the fixed electrode 42 and the sacrifice film 47 described earlier with reference to FIG. 56(a).

Next, as shown in FIG. 61(b), a dielectric film 54 which has an opening 54a that communicates with the opening 57a is formed. The dielectric film 54 is formed by e.g. forming a film of a predetermined dielectric material at predetermined locations by sputtering method, and then etching the film via a mask of a predetermined resist pattern.

Next, as shown in FIG. 61(c), a movable electrode 53 which has an opening 53a that communicates with the opening 54a is formed. The movable electrode 53 is formed by e.g. forming a film of aluminum on the dielectric film 54, the sacrifice film 57, and in the above-mentioned unillustrated opening in the sacrifice film 57 by sputtering method, and then etching the film of aluminum via a mask of a predetermined resist pattern.

Next, a plug 55 is formed as shown in FIG. 61(d). The plug 55 can be formed by e.g. sputtering method thereby filling the through hole provided by the openings 52a, 53a, 54a and 57a with a dielectric material.

Thereafter, the sacrifice film 57 is removed by wet etching which is performed with a predetermined resist remover. By following the above-described steps, the variable capacitor X5 can be manufactured successfully.

Figure 62:
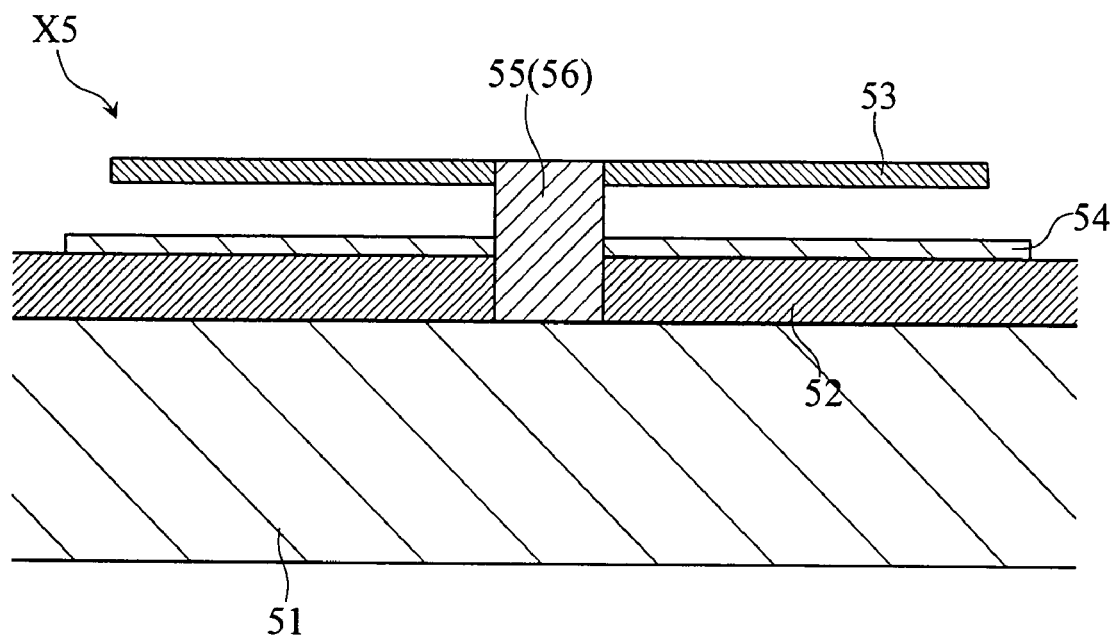
FIG. 62 is a sectional view of a variation of the variable capacitor in FIG. 59.

FIG. 62 is a sectional view of a variation of the variable capacitor X5. The view corresponds to FIG. 60 which shows a section of the variable capacitor X5 in FIG. 59. In the variable capacitor X5, a dielectric film 54 is formed on the movable electrode 53, on the side facing the fixed electrode 52; instead of this arrangement, a dielectric film 54 may be formed on the fixed electrode 52, on the side facing the movable electrode 53. The present variation can be manufactured by the same method as described above for the manufacture of the variable capacitor X5, with the following change for example: Specifically, the steps of forming a fixed electrode 52 and then forming a sacrifice film 57 and a dielectric film 54 in this sequence are replaced by a step of forming a fixed electrode 52 and a step thereafter of forming a dielectric film 54 and the sacrifice film 57 in this sequence.

Figure 63:
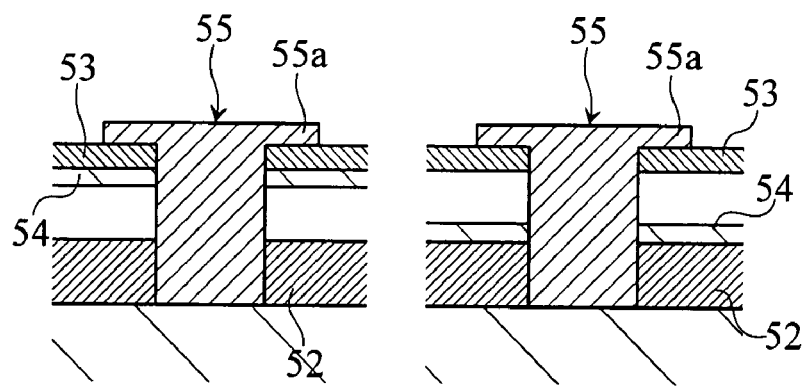
FIG. 63 shows sectional views of plugs having a cap.

According to the variable capacitor X3 including such a variation as described above, the plug 55 may have a cap 55a as shown in FIG. 63. The caps 35a as shown help ensure the bonding relationship between the movable electrode 53 and the plug 55.

The movable electrode 53 according to the variable capacitor X5 including the above-described variation may be like the movable electrode 13 according to one of the variations of the variable capacitor X1 shown in FIG. 11 and FIG. 14, i.e. may have an initial shape which includes curved portions. Otherwise, the movable electrode 53 according to the variable capacitor X5 including the above-described variation may be like the movable electrode 13 according to one of the variations of the variable capacitor X1 shown in FIG. 13 and FIG. 15, i.e. may have an initial shape which includes curved portions as well as having portions contacting with the fixed electrode via the dielectric film.

Figure 64:
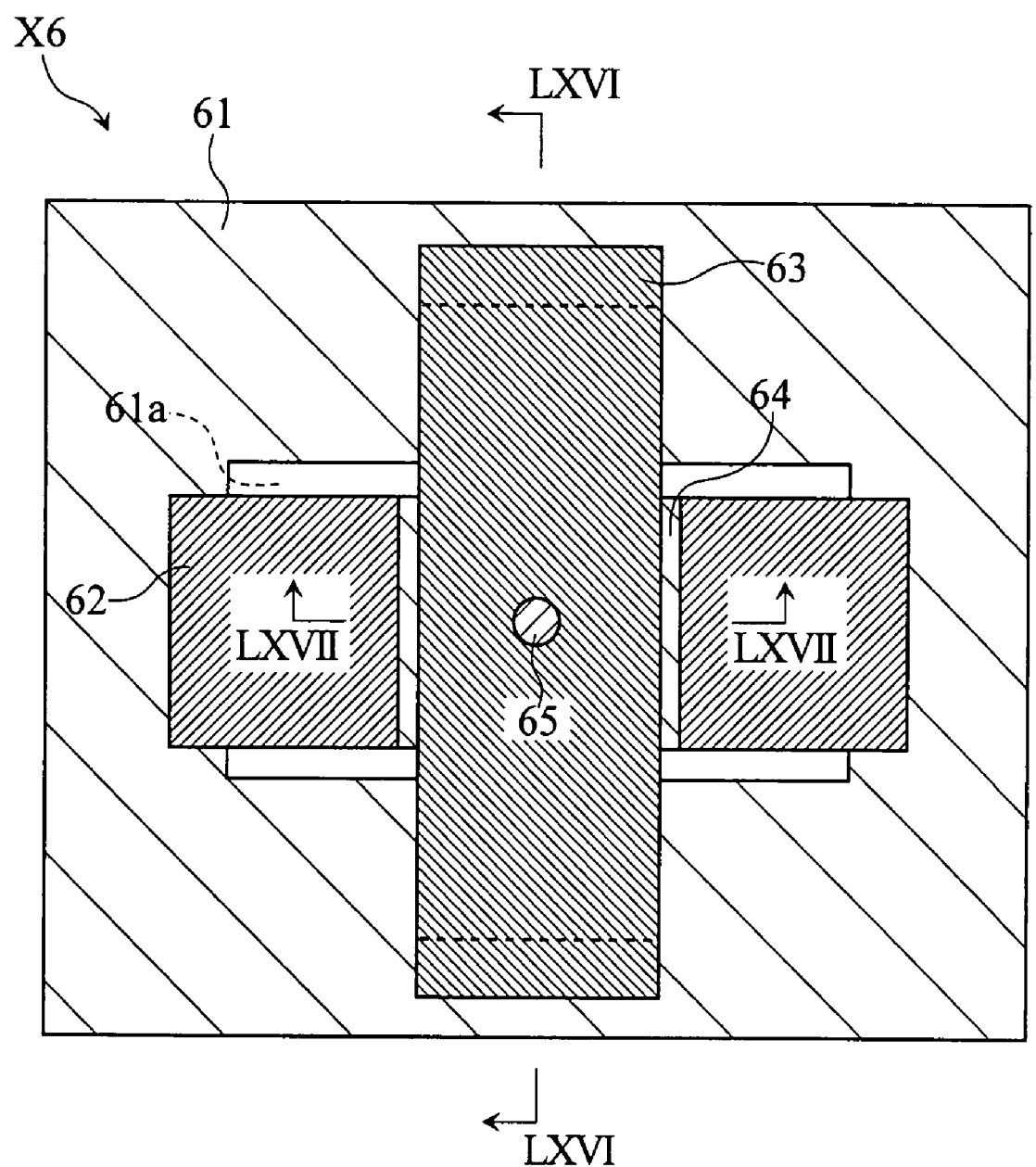
FIG. 64 is a plan view of a variable capacitor according to a sixth embodiment of the present invention.
Figure 65:
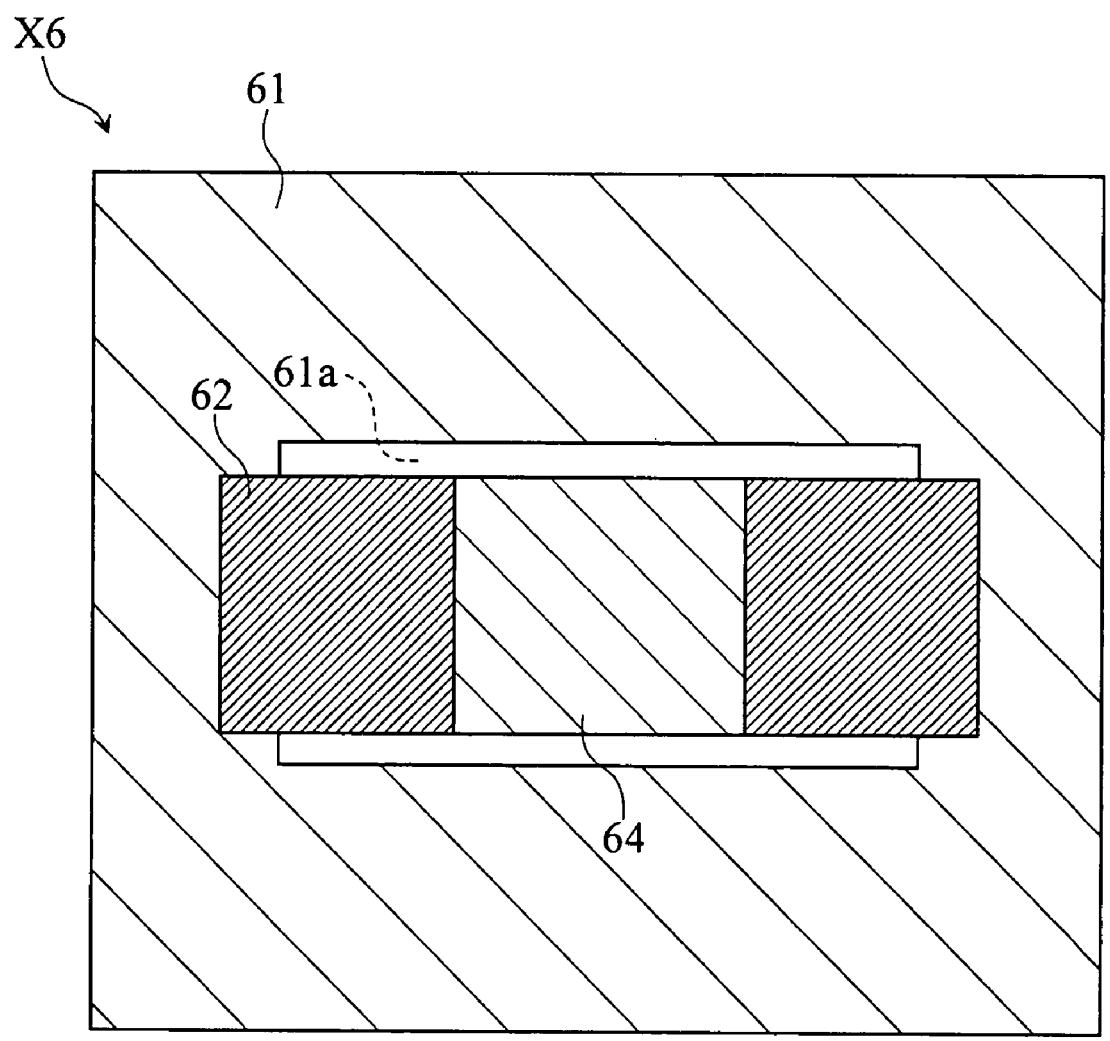
FIG. 65 is a partially unillustrated plan view of the variable capacitor according to the sixth embodiment of the present invention.
Figure 66:
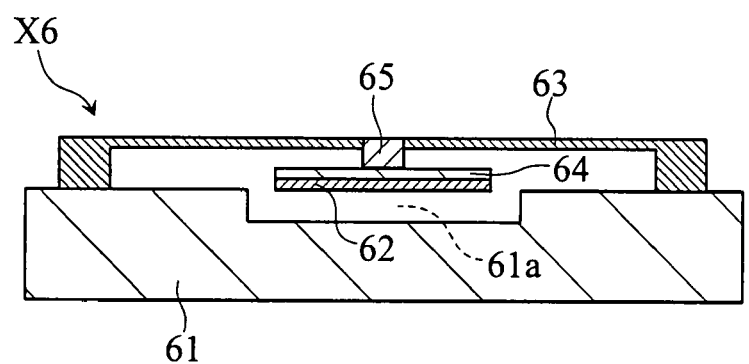
FIG. 66 is a sectional view taken in lines LXVI-LXVI in FIG. 64.
Figure 67:
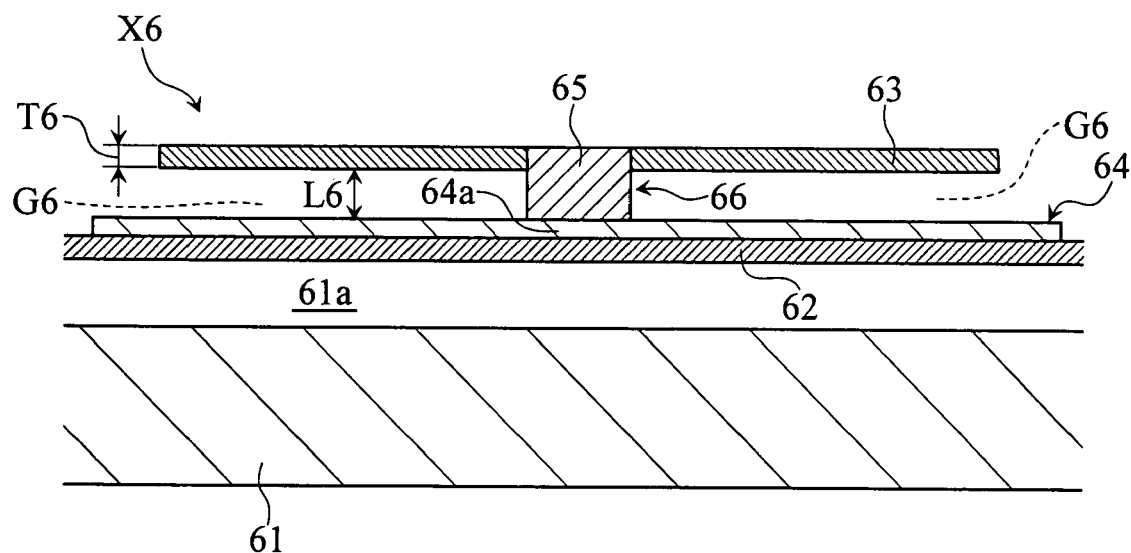
FIG. 67 is an enlarged partial sectional view taken in lines LXVII-LXVII in FIG. 64.

FIG. 64 and FIG. 67 show a variable capacitor X6 according to a sixth embodiment of the present invention. FIG. 64 is a plan view of the variable capacitor X6. FIG. 65 is a partially unillustrated plan view of the capacitor X6. FIG. 66 is a sectional view taken in lines LXVI-LXVI in FIG. 64. FIG. 67 is an enlarged partial sectional view taken in lines LXVII-LXVII in FIG. 64.

The variable capacitor X6 includes a substrate 61, a movable electrode 62, a movable electrode 63 (not illustrated in FIG. 65), a dielectric film 64 and a plug 65. The substrate 61 has a recess 61a. The movable electrode 62 has two ends bonded to the substrate 61, and extends over the recess 61a. The movable electrode 63 is built on the substrate 61. The movable electrode 63 has a thickness T6 as shown in FIG. 67, of 1 through 2 μm for example. As shown clearly in FIG. 64, the movable electrodes 62, 63 cross each other, opposing partially to each other. The opposed region has an area of 10000 through 40000 μm$^2$ for example. A distance L6 shown in FIG. 67 between the movable electrodes 62, 63 is 0.5 through 2 μm for example. Preferably, one of the movable electrodes 62, 63 is grounded. The dielectric film 64 is formed on the movable electrode 62, on a side facing the movable electrode 63. The dielectric film 64 has a thickness of 0.1 through 0.5 μm for example. The substrate 61, the movable electrodes 62, 63, and the dielectric film 64 are formed of the same materials as are their respective counterparts in the second embodiment, i.e. the substrate 21, the movable electrodes 22, 23, and the dielectric film 24. The plug 65 penetrates the movable electrode 63, is bonded to the movable electrode 63, and is bonded to the dielectric film 64. The plug 65 as described is formed of a dielectric material such as alumina ($Al_2O_3$), silicon oxide ($SiO_2$), and silicon nitride ($SiN_x$). A predetermined wiring pattern (not illustrated) electrically connected with the movable electrode 62 or with the movable electrodes 63 is formed on the substrate 61.

In the variable capacitor X6 shown in FIG. 64, an anchor portion 65 according to the present invention is constituted by the plug 65 and, as clearly shown in FIG. 67, a portion 64a of the dielectric film 64 which the plug is bonded to. The anchor portion 66 provides a partial connection between the mutually opposed movable electrodes 62, 63.

Figure 68:
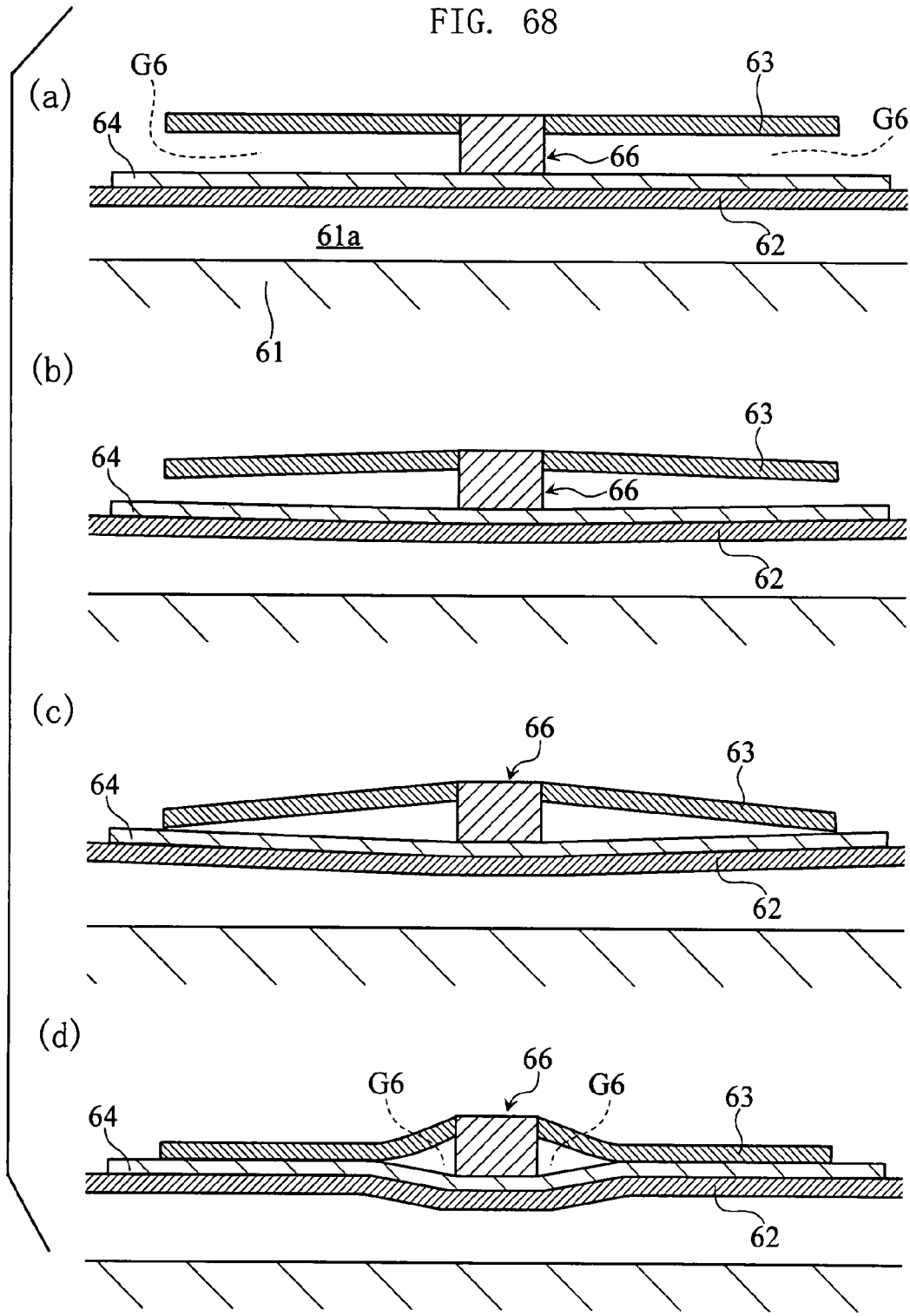
FIG. 68 shows different states of operation of the variable capacitor in FIG. 64.

According to the variable capacitor X6 which has the constitution as described above, it is possible to generate an electrostatic attraction between the movable electrodes 62, 63 by applying a voltage between the movable electrodes 62, 63, and by using the electrostatic attraction, it is possible to draw the movable electrodes 62, 63 each other, excluding the regions of the movable electrodes 62, 63 bonded to the anchor portion 66, and thereby varying the volume of a gap G6 between the movable electrodes 62, 63 as shown in FIG. 68. The electrostatic capacitance of the variable capacitor X6 varies in accordance with the gap volume. Therefore, according to the variable capacitor X6, it is possible to control the electrostatic capacitance by controlling the drive voltage (0 through 20 V for example) which is applied between the movable electrodes 62, 63.

Further, according to the variable capacitor X6, the movable electrodes 62, 63 are partially connected with or joined on each other by the anchor portion 66; this reduces shape deformation or curving of the movable electrodes 62, 63 caused by temperature changes both in operation and in non-operation. Since curving of both movable electrodes 62, 63 is reduced in its initial shape (the shape in non-operation), inconsistency in initial electrostatic capacitance (0.5 through 1 pF for example) during non-operation is reduced in the variable capacitor X6. Further, because of the reduced shape deformation caused by temperature changes in both of the movable electrodes 62, 63 during operation as well as during non-operation, inconsistency in the relationship between electrostatic capacitance and drive voltage is reduced also. As described, the variable capacitor X6 is well suited to reduce electrostatic capacitance inconsistency caused by temperature changes. The variable capacitor X6 as described above is able to operate highly accurately.

In addition, according to the variable capacitor X6, it is possible to vary the electrostatic capacitance widely. As has been described earlier, in the conventional variable capacitor Y, the movable electrode 93 must be moved within a limited range in order to avoid so called pull-in phenomenon, so it is not possible to vary the electrostatic capacitance over a wide range. On the contrary, according to the variable capacitor X6 provided by the present invention, it is possible as shown in FIG. 68(c) and FIG. 68(d), to make the movable electrodes 62, 63 partially contact with each other via the dielectric film 64 and further, to control the area of partial contact. Hence, according to the variable capacitor X6, it is possible to vary the gap volume between the movable electrodes 62, 63 widely from the initial state shown in FIG. 68(a) to the state where the area of contact between the movable electrodes 62, 63 via the dielectric film 64 reaches a maximum value (e.g. the state as shown in FIG. 68(d)). In addition to this, according to the variable capacitor X6, the movable electrodes 62, 63 have no region which faces to each other via the anchor portion 66. In other words, there is no partial capacitor structure which has an invariable electrode-to-electrode distance via the anchor portion 36 (and therefore has a fixed electrostatic capacitance). If a variable capacitor includes a partial capacitor structure which has a fixed electrostatic capacitance, a minimum electrostatic capacitance for the entire variable capacitor cannot be smaller than the fixed electrostatic capacitance. On the contrary, the variable capacitor X6 which does not include any partial capacitor structure that has a fixed electrostatic capacitance does not have such a limitation to the minimum electrostatic capacitance for the entire variable capacitor. Hence, it is easy in the variable capacitor X6, to make a setting for a small minimum electrostatic capacitance. As described, according to the variable capacitor X6, it is possible to vary the gap volume between the movable electrodes 62, 63 widely, and to make a setting for a small value for the minimum electrostatic capacitance because of the structure where there is no fixed electrode-to-electrode distance via the anchor portion 66. Therefore, the variable capacitor X6 is capable of offering a large amount or rate, of electrostatic capacitance variation.

Figure 69:
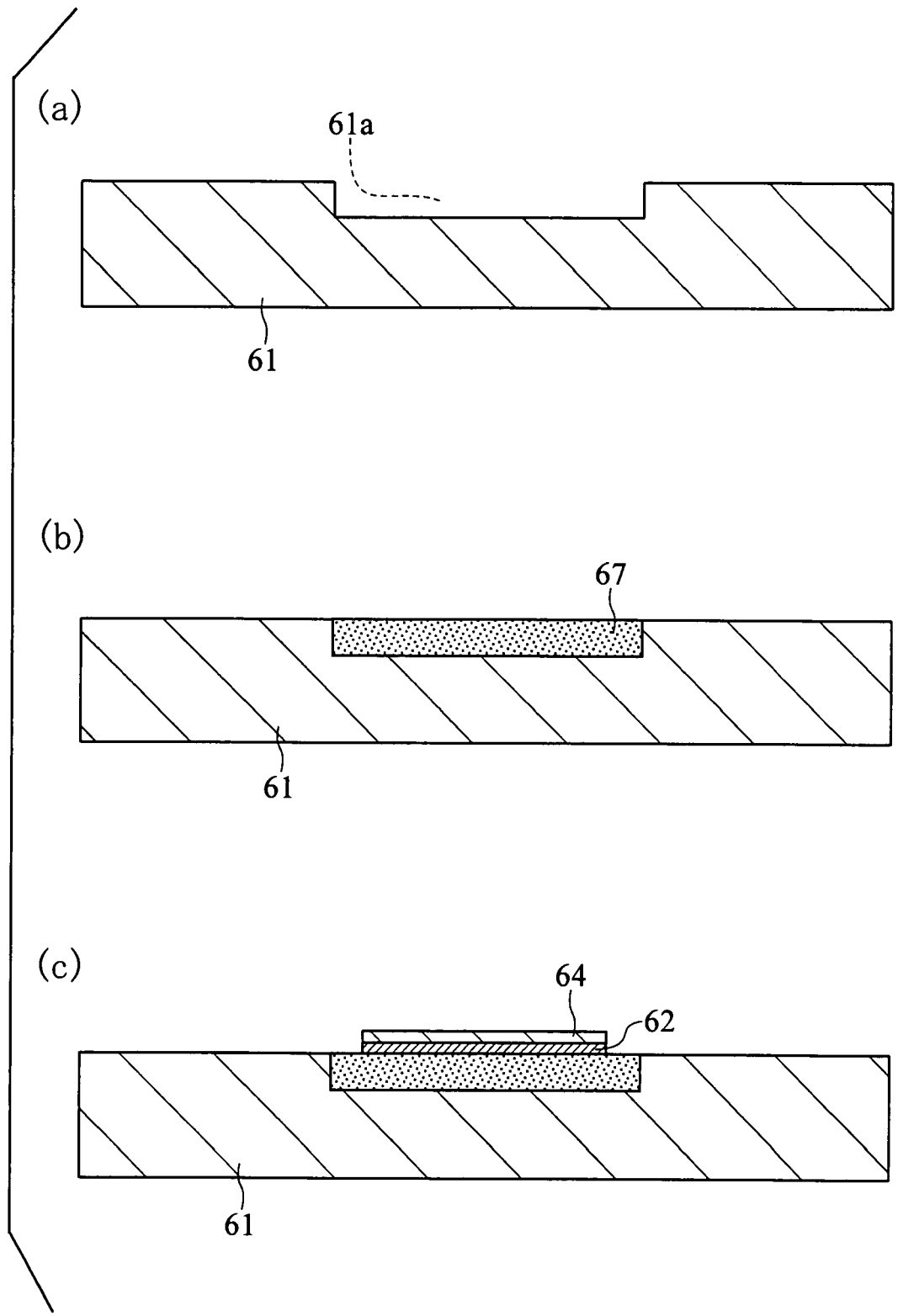
FIG. 69 shows part of a method of making the variable capacitor in FIG. 64.
Figure 70:
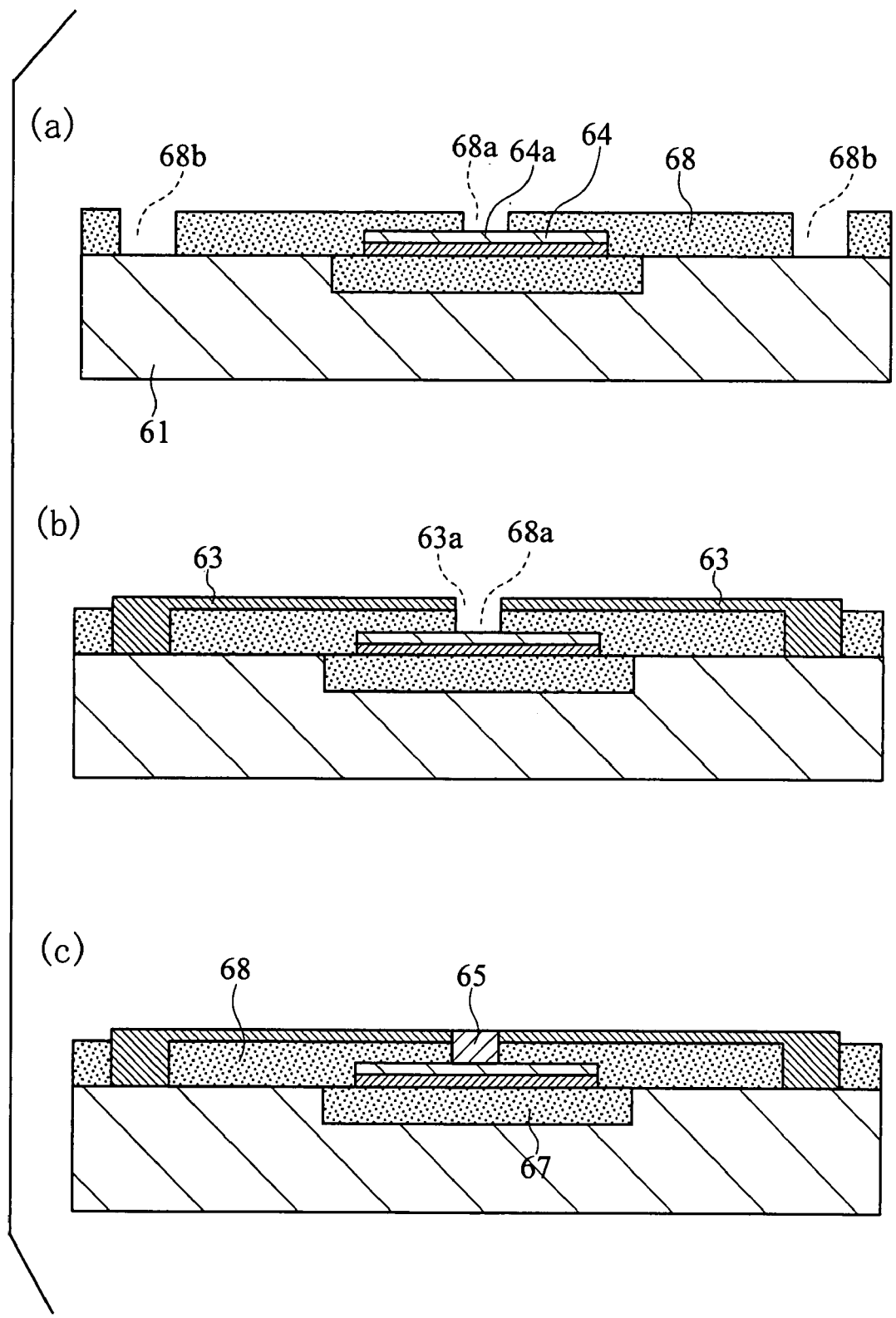
FIG. 70 shows steps continued from FIG. 69.

FIG. 69 and FIG. 70 show a method of making the variable capacitor X6, in a series of sectional views each corresponding to the section shown in FIG. 66. The present method uses so called MEMS technology for the manufacture of the variable capacitor X6.

In the manufacture of the variable capacitor X6, first, a substrate 61 which has a recess 61a as shown in FIG. 69(a) is prepared. Specifically, the same step is performed as for the substrate 21 described with reference to FIG. 21(a).

Next, as shown in FIG. 69(b), the recess 61a in the substrate 61 is filled with a sacrifice material 67. Specifically, the same step is performed as described with reference to FIG. 21(b) for filling with the sacrifice material 25.

Next, as shown in FIG. 69(c), a movable electrode 62 and a dielectric film 64 are formed in lamination on the substrate 61. The movable electrode 62 and the dielectric film 64 can be formed by the same procedures as used for formation of the fixed electrode 12 and the dielectric film 14 described with reference to FIG. 6(a).

Next, as shown in FIG. 70(a), a sacrifice film 68 is formed. The sacrifice film 68 has an opening 68a for partially exposing the dielectric film 64, and openings 68b for partially exposing the substrate 61. The region 64a of the dielectric film 64 exposed by the opening 68a will become part of the anchor portion 66a described earlier. The sacrifice film 68 can be formed of the same material and by the same procedures as used for formation of the sacrifice film 15 described earlier with reference to FIG. 6(b). By controlling the thickness of the sacrifice film 68 formed in this step, it is possible to control the initial-state distance L6 between the movable electrodes 62, 63 in the variable capacitor X6 obtained.

Next, as shown in FIG. 70(b), a movable electrode 63 is formed. The movable electrode 63 has an opening 63a which communicates with the opening 68a of the sacrifice film 68. The movable electrode 63 can be formed by the same procedures as used for formation of the movable electrode 33 described earlier with reference to FIG. 50(c). Note that for the sake of simplicity in the drawing, the two ends of movable electrode 63 are shown as formed by filling the openings 68b in the sacrifice film 68 with an electrically conductive material.

Next, a plug 65 is formed as shown in FIG. 70(c). The plug 65 can be formed by e.g. sputtering method thereby filling the through hole provided by the openings 63a, 68a, with a dielectric material.

Thereafter, wet etching is performed with a predetermined resist remover, to remove the sacrifice film 68 and the sacrifice material 67. By following the above-described steps, the variable capacitor X6 can be manufactured successfully.

Figure 71:
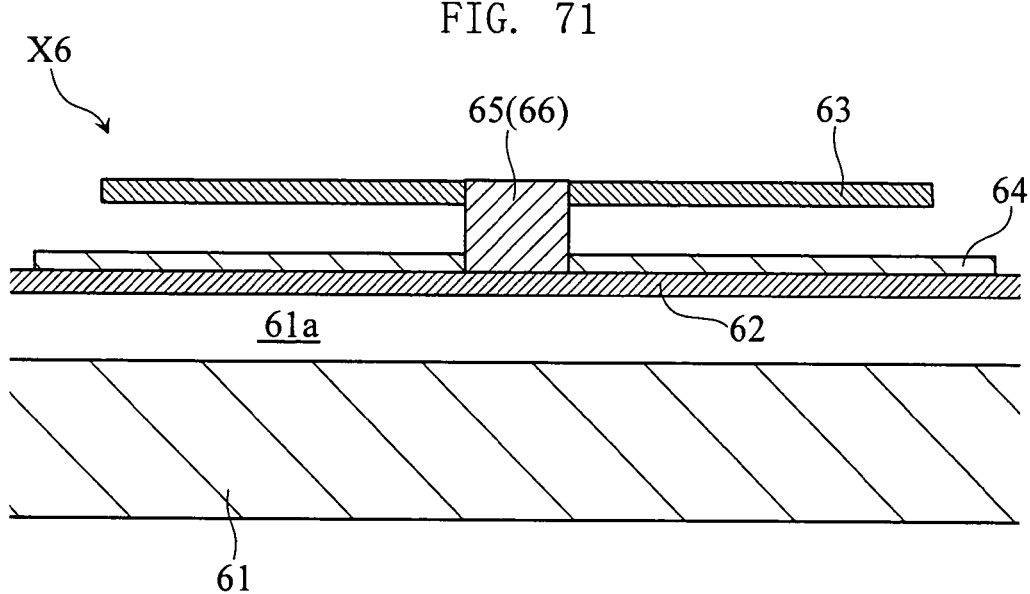
FIG. 71 is a sectional view of a first variation of the variable capacitor in FIG. 64.

FIG. 71 is a sectional view of a first variation of the variable capacitor X6. The view corresponds to FIG. 67 which shows a section of the variable capacitor X6 in FIG. 64. As shown in FIG. 71, in the variable capacitor X6, the plug 65 may penetrate the dielectric film 64, to be bonded to the movable electrode 62. In such a variation, the plug 65 constitutes an anchor portion 66 which provides partial connection between the mutually opposed movable electrodes 62, 63. The present variation can be manufactured by the method as described above for the manufacture of the variable capacitor X6, with an additional step after the one shown in FIG. 69(c), of making an opening in the dielectric film 64 which is to be fitted by the plug 65 according to the present variation.

Figure 72:
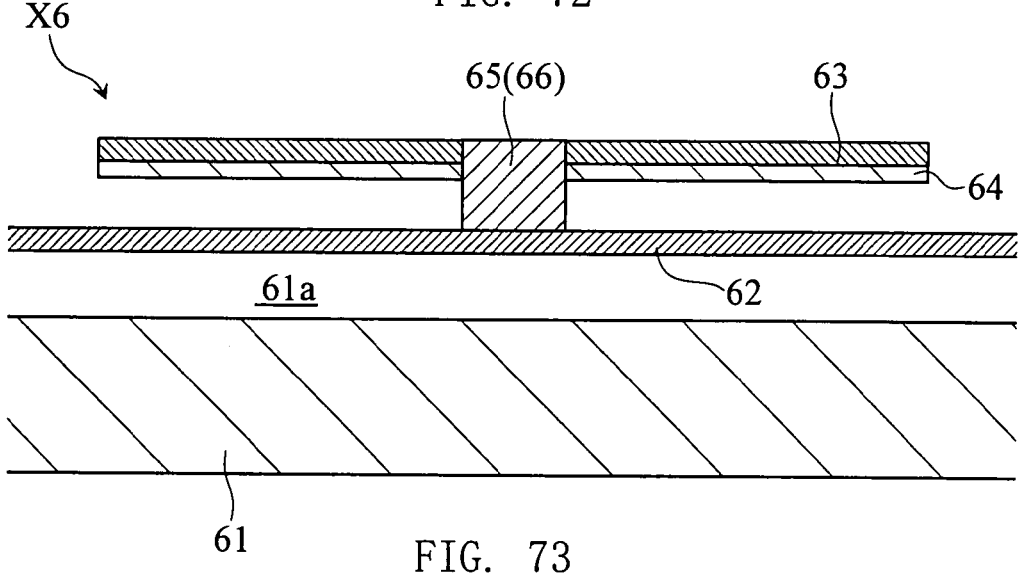
FIG. 72 is a sectional view of a second variation of the variable capacitor in FIG. 64.

FIG. 72 is a sectional view of a second variation of the variable capacitor X6. The view corresponds to FIG. 67 which shows a section of the variable capacitor X6 in FIG. 64. In the variable capacitor X6, a dielectric film 64 is formed on the movable electrode 62, on the side facing the movable electrode 63; instead of this arrangement, a dielectric film 64 may be formed on the movable electrode 63, on the side facing the movable electrode 62 as shown in FIG. 52. In such a variation, the plug 65 constitutes an anchor portion 66 which provides partial connection between the mutually opposed movable electrodes 62, 63. The present variation can be manufactured by the same method as described above for the manufacture of the variable capacitor X6, with the following change for example: Specifically, the step of forming the sacrifice film 68 after the formation of the dielectric film 64 is replaced by a step of forming a sacrifice film 68 which has an opening 68a and covers the movable electrode 62, and a step thereafter of forming a dielectric film 64 which has a predetermined opening that communicates with the opening 68a on the sacrifice film 68.

Figure 73:
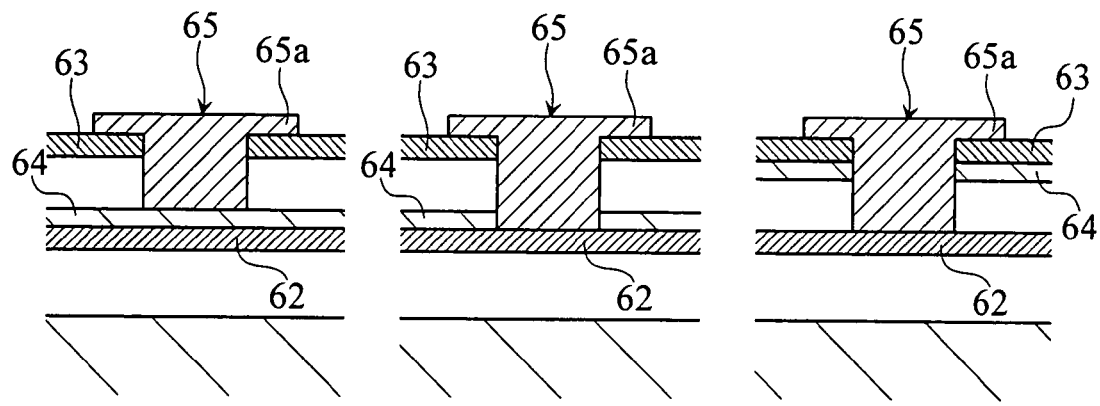
FIG. 73 shows sectional views of plugs having a cap.

As shown in FIG. 73, the plug 65 according to the variable capacitor X6 including the first variation and the second variation may have a cap 65a. The caps 65a as shown help ensure the bonding relationship between the movable electrode 63 and the plug 65.

The movable electrodes 62, 63 according to the variable capacitor X6 including the first variation and the second variation may be like the movable electrodes 22, 23 according to one of the variations of the variable capacitor X2 shown in FIG. 25, FIG. 27, FIG. 29, FIG. 30, FIG. 32, FIG. 34, FIG. 36, and FIG. 38, i.e. may have initial shapes which include curved portions. Otherwise, the movable electrodes 62, 63 according to the variable capacitor X6 including the first variation and the second variation may be like the movable electrodes 22, 23 according to one of the variations of the variable capacitor X2 shown in FIG. 26, FIG. 28, FIG. 31, FIG. 33, FIG. 35, FIG. 37, and FIG. 39, i.e. may have initial shapes which include curved portions as well as having portions contacting with the fixed electrode via the dielectric film. Still further, the movable electrodes 62, 63 according to the variable capacitor X6 including the first variation and the second variation may be like the movable electrodes 22, 23 according to one of the variations of the variable capacitor X2 shown in FIG. 40 through FIG. 44, i.e. may be connected with each other at two locations each by an anchor portion 66, and having initial shapes like those of the movable electrodes 22, 23 in the variations shown in FIG. 40 through FIG. 44.

Figure 74:
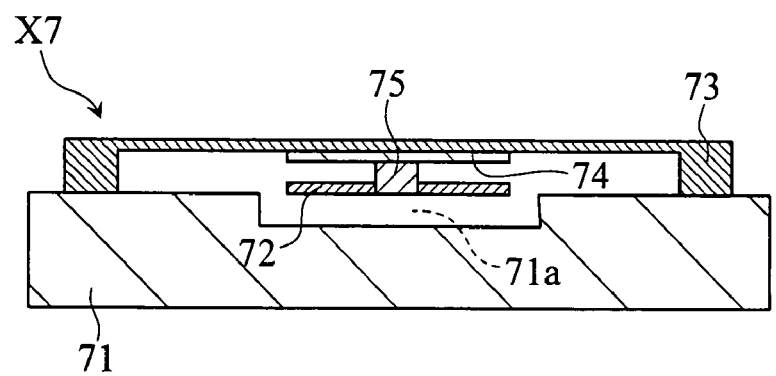
FIG. 74 is a sectional view of a variable capacitor according to a seventh embodiment of the present invention.
Figure 75:
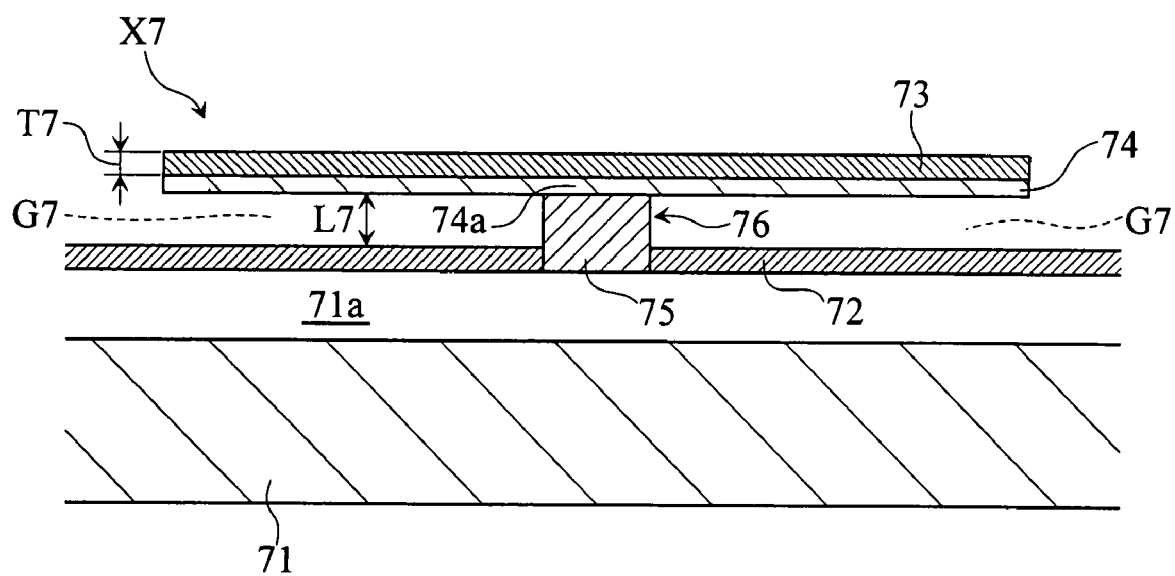
FIG. 75 is an enlarged partial sectional view of the variable capacitor according to the seventh embodiment of the present invention.

FIG. 74 and FIG. 75 show a variable capacitor X7 according to a seventh embodiment of the present invention. FIG. 74 is a sectional view of the variable capacitor X7, and corresponds to FIG. 66 which shows a section of the variable capacitor X6 described earlier. FIG. 75 is an enlarged partial sectional view of the variable capacitor X7, and corresponds to FIG. 67 which shows an enlarged partial sectional view of the variable capacitor X6.

The variable capacitor X7 includes a substrate 71, a movable electrodes 72, 73, a dielectric film 74 and a plug 75. The substrate 71 has a recess 71a. The movable electrode 72 has two ends bonded to the substrate 71, and extends over the recess 71a. The movable electrode 73 is built on the substrate 71. The movable electrodes 72, 73 cross each other, opposing partially to each other. A distance L7 shown in FIG. 75 between the movable electrodes 72, 73 is 0.5 through 2 µm for example. Preferably, one of the movable electrodes 72, 73 is grounded. The dielectric film 74 is formed on the movable electrode 73, on a side facing the movable electrode 72. The plug 75 penetrates the movable electrode 72, is bonded to the movable electrode 72, and is bonded to the dielectric film 74. A predetermined wiring pattern (not illustrated) electrically connected with the movable electrode 72 or with the movable electrodes 73 is formed on the substrate 71. The substrate 71, the fixed electrode 72, the movable electrode 73, and the dielectric film 74 are formed of the same materials as are their respective counterparts in the second embodiment, i.e. the substrate 21, the movable electrodes 22, 23, and the dielectric film 24. The plug 75 is formed of the same material as is the plug 65 in the sixth embodiment.

In the variable capacitor X7 shown in FIG. 74, an anchor portion 76 according to the present invention is constituted by the plug 75 and, as clearly shown in FIG. 75, a portion 74a of the dielectric film 74 which the plug is bonded to. The anchor portion 76 provides a partial connection between the mutually opposed movable electrodes 72, 73.

According to the variable capacitor X7 which has the constitution as described above, it is possible, as in the variable capacitor X6 described earlier, to control the electrostatic capacitance by controlling the drive voltage (0 through 20 V for example) which is applied between the movable electrodes 72, 73. Further, according to the variable capacitor X7, the two movable electrodes 72, 73 are partially connected with or joined on each other by the anchor portion 76, and therefore shape deformation or curving of the movable electrodes 72, 73 caused by temperature changes is reduced both during operation and during non-operation. The variable capacitor X7 as described is able to operate highly accurately as is the variable capacitor X6. In addition, according to the variable capacitor X7, it is possible to vary the gap volume between the fixed electrodes 72, 73 widely, and it is easy to make a setting for a small value for the minimum electrostatic capacitance since the capacitor does not include a structure where there is a fixed electrode-to-electrode distance via the anchor portion 76. Therefore, the variable capacitor X7 is capable of offering a large amount or rate, of electrostatic capacitance variation as is the variable capacitor X6.

Figure 76:
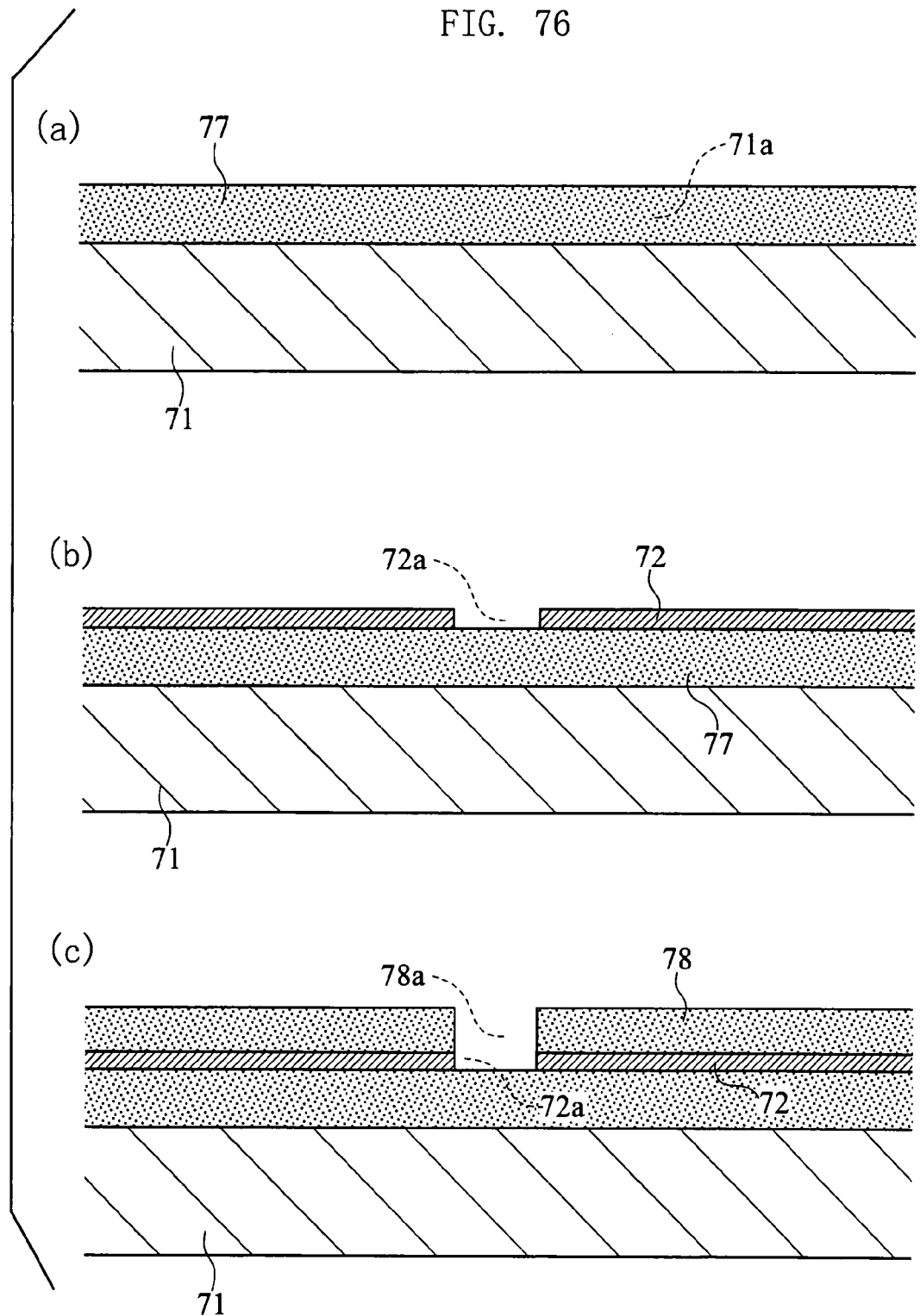
FIG. 76 shows part of a method of making the variable capacitor in FIG. 74.

FIG. 76 and FIG. 77 show a method of making the variable capacitor X7, in a series of sectional views each corresponding to the section shown in FIG. 75. The present method uses so called MEMS technology for the manufacture of the variable capacitor X7.

In the manufacture of the variable capacitor X7, first as shown in FIG. 76(a), the recess 71a in the substrate 71 is filled with a sacrifice material 77. Specifically, the same step is performed as described with reference to FIG. 21(b) for filling with the sacrifice material 25.

Next, as shown in FIG. 76(b), a movable electrode 72 is formed on the substrate 71, i.e. on the sacrifice material 77. The movable electrode 72 has an opening 72a. The movable electrode 72 can be formed by the same procedures as used for formation of the fixed electrode 42a described with reference to FIG. 56(a).

Next, as shown in FIG. 76(c), a sacrifice film is formed. The sacrifice film 78 has an opening 78a which communicates with the opening 72a. The sacrifice film 78 can be formed by the same procedures as used for formation of the sacrifice film 47 described with reference to FIG. 56(a). By controlling the thickness of the sacrifice film 78 formed in this step, it is possible to control the initial-state distance L7 between the movable electrodes 72, 73 in the variable capacitor X7 obtained.

Next, as shown in FIG. 77(a), a plug 75 is formed. The plug 75 can be formed by e.g. sputtering method thereby filling the through hole provided by the openings 72a, 78a, with a dielectric material.

Next, as shown in FIG. 77(b), a dielectric film 74 is formed. The dielectric film 74 can be formed by the same procedures as used for formation of the dielectric film 44 described with reference to FIG. 56(c). The dielectric film 74 obtained in this way bonds to the plug 75.

Next, as shown in FIG. 77(c), a movable electrode 73 is formed. The movable electrode 73 can be formed by the same procedures as used for formation of the movable electrode 43 described with reference to FIG. 56(d).

Thereafter, the sacrifice film 78 and the sacrifice material 77 are removed by wet etching which is performed with a predetermined resist remover. By following the above-described steps, the variable capacitor X7 can be manufactured successfully.

Figure 78:
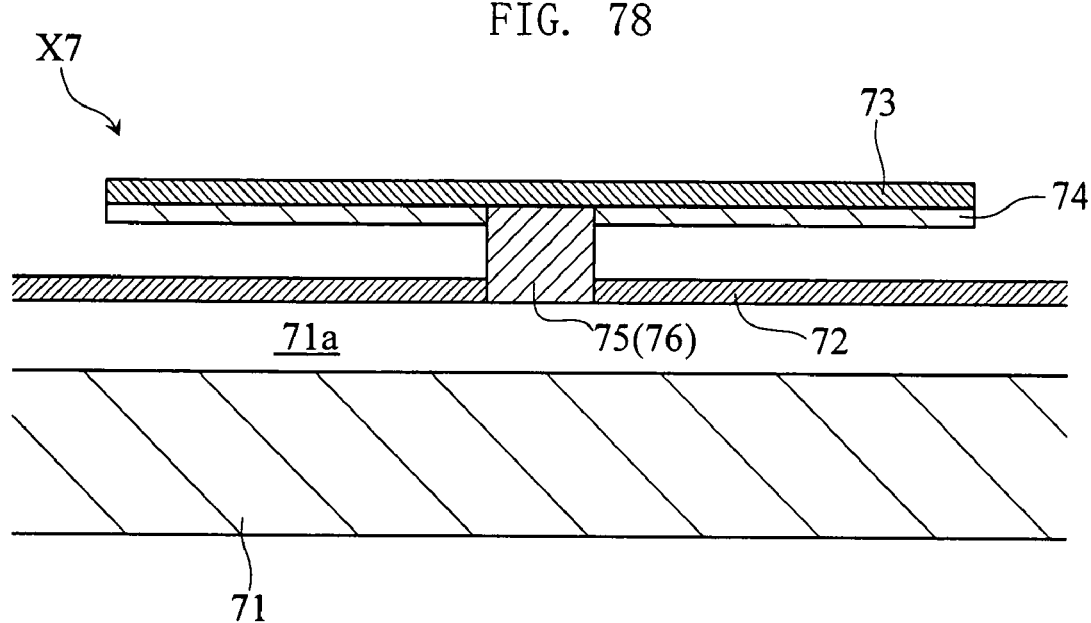
FIG. 78 is a sectional view of a first variation of the variable capacitor in FIG. 74.

FIG. 78 is a sectional view of a first variation of the variable capacitor X7. The view corresponds to FIG. 75 which shows a section of the variable capacitor X7 in FIG. 74. As shown in FIG. 71, in the variable capacitor X7, the plug 75 may penetrate the dielectric film 74, to be bonded to the movable electrode 73. In such a variation, the plug 75 constitutes an anchor portion 76 which provides partial connection between the mutually opposed movable electrodes 72, 73. The present variation can be manufactured by the same method as described above for the manufacture of the variable capacitor X7, with the following change for example: Specifically, the step of forming the dielectric film 74 after the formation of the plug 75 is replaced by a step of forming a dielectric film 74 which has a predetermined opening that communicates with the opening 78a of the sacrifice film 78, on the sacrifice film 78, and a step thereafter of forming a plug 75 according to the present variation which penetrates the movable electrode 72, the sacrifice film 78, and the dielectric film 74.

Figure 79:
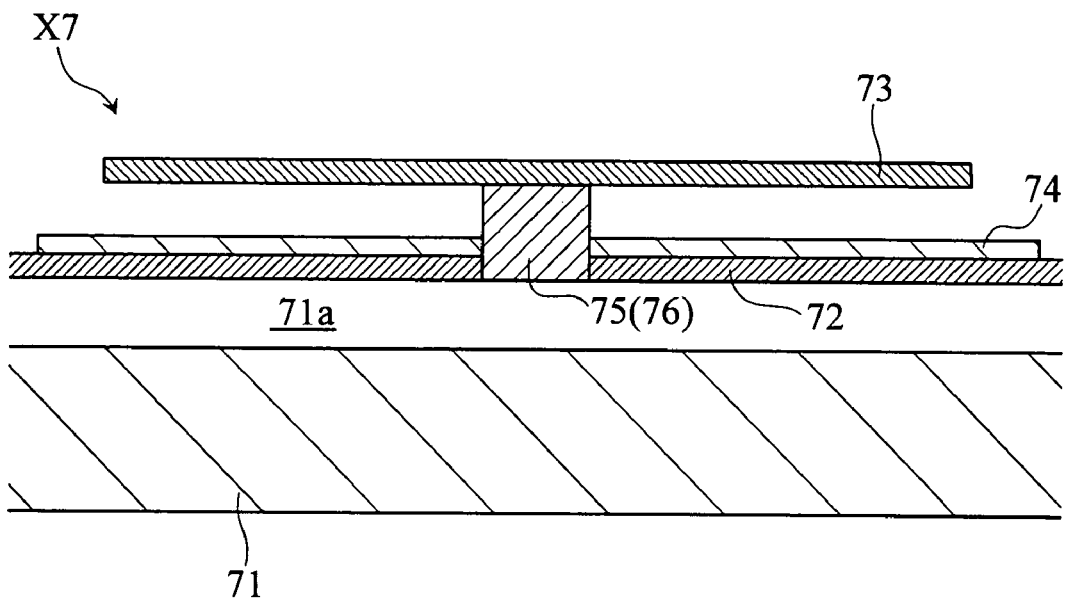
FIG. 79 is a sectional view of a second variation of the variable capacitor in FIG. 74.

FIG. 79 is a sectional view of a second variation of the variable capacitor X7. The view corresponds to FIG. 75 which shows a section of the variable capacitor X7 in FIG. 74. In the variable capacitor X7, a dielectric film 74 is formed on the movable electrode 73, on the side facing the movable electrode 72; instead of this arrangement, a dielectric film 74 may be formed on the movable electrode 72, on the side facing the movable electrode 73 as shown in FIG. 79. In such a variation, the plug 75 constitutes an anchor portion 76 which provides partial connection between the mutually opposed movable electrodes 72, 73. The present variation can be manufactured by the same method as described above for the manufacture of the variable capacitor X7, with the following change for example: Specifically, the step of forming the plug 75 and the step thereafter of forming the dielectric film 74 are replaced by a step of forming a movable electrode 72 which has an opening 72a, and a step thereafter of forming a dielectric film 74 which has a predetermined opening that communicates with the opening 72a.

The movable electrodes 72, 73 according to the variable capacitor X7 including the first variation and the second variation may be like the movable electrodes 22, 23 according to one of the variations of the variable capacitor X2 shown in FIG. 25, FIG. 27, FIG. 29, FIG. 30, FIG. 32, FIG. 34, FIG. 36, and FIG. 38, i.e. may have initial shapes which include curved portions. Otherwise, the movable electrodes 72, 73 according to the variable capacitor X7 including the first variation and the second variation may be like the movable electrodes 22, 23 according to one of the variations of the variable capacitor X2 shown in FIG. 26, FIG. 28, FIG. 31, FIG. 33, FIG. 35, FIG. 37, and FIG. 39, i.e. may have initial shapes which include curved portions as well as having portions contacting with each other via the dielectric film. Still further, the movable electrodes 72, 73 according to the variable capacitor X7 including the first variation and the second variation may be like the movable electrodes 22, 23 according to one of the variations of the variable capacitor X2 shown in FIG. 40 through FIG. 44, i.e. may be connected with each other at two locations each by an anchor portion 76, and having initial shapes like those of the movable electrodes 22, 23 in the variations shown in FIG. 40 through FIG. 44.

Figure 80:
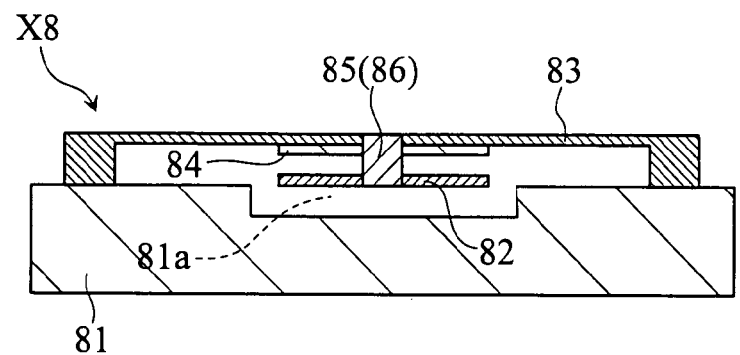
FIG. 80 is a sectional view of a variable capacitor according to an eighth embodiment of the present invention.
Figure 81:
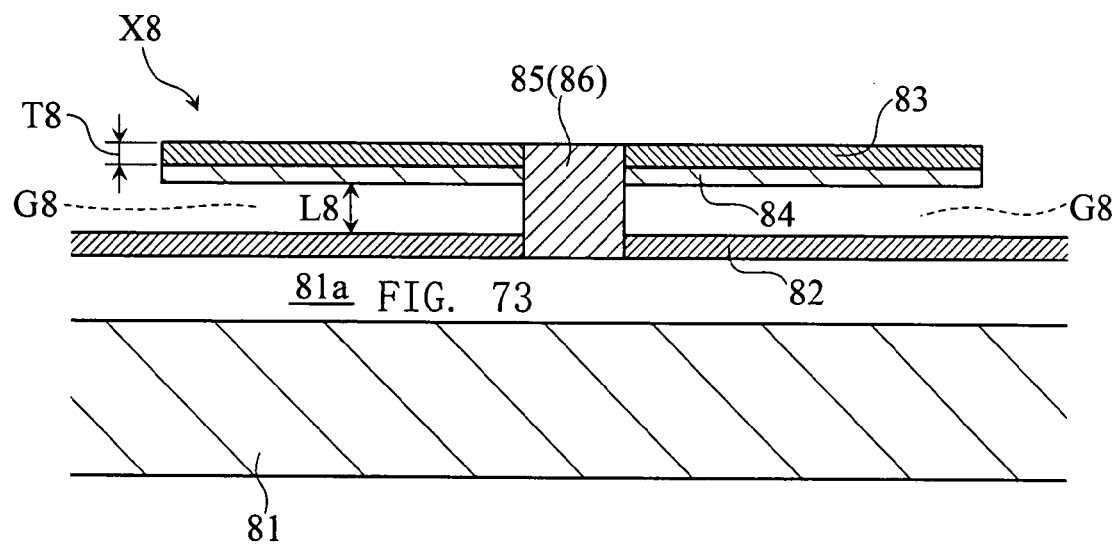
FIG. 81 is an enlarged partial sectional view of the variable capacitor according to the eighth embodiment of the present invention.

FIG. 80 and FIG. 81 show a variable capacitor X8 according to an eighth embodiment of the present invention. FIG. 80 is a sectional view of the variable capacitor X8, and corresponds to FIG. 66 which shows a section of the variable capacitor X6 described earlier. FIG. 81 is an enlarged partial sectional view of the variable capacitor X8, and corresponds to FIG. 67 which shows an enlarged partial sectional view of the variable capacitor X6.

The variable capacitor X8 includes a substrate 81, movable electrodes 82, 83, a dielectric film 84 and a plug 85. The substrate 81 has a recess 81a. The movable electrode 82 has two ends bonded to the substrate 81, and extends over the recess 81a. The movable electrode 83 is built on the substrate 81. The movable electrodes 82, 83 cross each other, opposing partially to each other. A distance L8 shown in FIG. 81 between the movable electrodes 82, 83 is 0.5 through 2 μm for example. Preferably, one of the movable electrodes 82, 83 is grounded. The plug 85 penetrates the movable electrode 82 and is bonded to the movable electrode 83; and further, penetrates the dielectric film 84 and the movable electrode 83 and is bonded to the movable electrode 83. A predetermined wiring pattern (not illustrated) electrically connected with the movable electrode 82 or with the movable electrodes 83 is formed on the substrate 81. The substrate 81, the movable electrodes 82, 83, and the dielectric film 84 are formed of the same materials as are their respective counterparts in the second embodiment, i.e. the substrate 21, the movable electrodes 22, 23, and the dielectric film 24. The plug 85 is formed of the same material as is the plug 65 in the sixth embodiment.

In the variable capacitor X8 shown in FIG. 80, an anchor portion 86 according to the present invention is constituted by the plug 85. The anchor portion 86 provides a partial connection between the mutually opposed movable electrodes 82, 83.

According to the variable capacitor X8 which has the constitution as described above, it is possible, as in the variable capacitor X6 described earlier, to control the electrostatic capacitance by controlling the drive voltage (0 through 20 V for example) which is applied between the movable electrodes 82, 83. Further, according to the variable capacitor X8, the movable electrodes 82, 83 are partially connected with or joined on each other by the anchor portion 86, and therefore shape deformation or curving of the movable electrodes 82, 83 caused by temperature changes is reduced both during operation and during non-operation. The variable capacitor X8 as described is able to operate highly accurately as is the variable capacitor X6. In addition, according to the variable capacitor X8, it is possible to vary the gap volume between the movable electrodes 82, 83 widely, and it is easy to make a setting for a small value for the minimum electrostatic capacitance since the capacitor does not include a structure where there is a fixed electrode-to-electrode distance via the anchor portion 86. Therefore, the variable capacitor X8 is capable of offering a large amount or rate, of electrostatic capacitance variation as is the variable capacitor X6.

FIG. 82 and FIG. 83 show a method of making the variable capacitor X8, in a series of sectional views each corresponding to the section shown in FIG. 81. The present method uses so called MEMS technology for the manufacture of the variable capacitor X8.

In the manufacture of the variable capacitor X8, first as shown in FIG. 82(a), a recess 81a in a substrate 81 is filled with a sacrifice material 87. Specifically, the same step is performed as described with reference to FIG. 21(b) for filling with the sacrifice material 25.

Next, as shown in FIG. 82(b), a movable electrode 82 is formed on the substrate 81, i.e. on the sacrifice material 87. The movable electrode 82 has an opening 82a. The movable electrode 82 can be formed by the same procedures as used for formation of the fixed electrode 42 described with reference to FIG. 56(a).

Next, as shown in FIG. 82(c), a sacrifice film 88 is formed. The sacrifice film 88 has an opening 88a which communicates with the opening 82a. The sacrifice film 88 can be formed by the same procedures as used for formation of the sacrifice film 47 described with reference to FIG. 56(a). By controlling the thickness of the sacrifice film 88 formed in this step, it is possible to control the initial-state distance L8 between the movable electrodes 82, 83 in the variable capacitor X8 obtained.

Next, as shown in FIG. 83(b), a dielectric film 84 which has an opening 84a that communicates with the opening 88a is formed. The dielectric film 84 can be formed by e.g. first forming a film of a predetermined dielectric material on predetermined locations by sputtering method, and then etching the film via a mask of a predetermined resist pattern.

Next, as shown in FIG. 83(b), a movable electrode 83 which has an opening 83a that communicates with the opening 84a is formed. The movable electrode 83 can be formed by e.g. first forming a film of aluminum on the dielectric film 84, the sacrifice film 88, etc. by sputtering, and then etching the Al film via a mask of a predetermined resist pattern.

Next, as shown in FIG. 83(c), a plug 85 is formed. The plug 85 can be formed by e.g. sputtering method thereby filling the through hole provided by the openings 82a, 83a, 84a and 88a, with a dielectric material.

Thereafter, the sacrifice film 88 and the sacrifice material 87 are removed by wet etching performed with a predetermined resist remover. By following the above-described steps, the variable capacitor X8 can be manufactured successfully.

Figure 84:
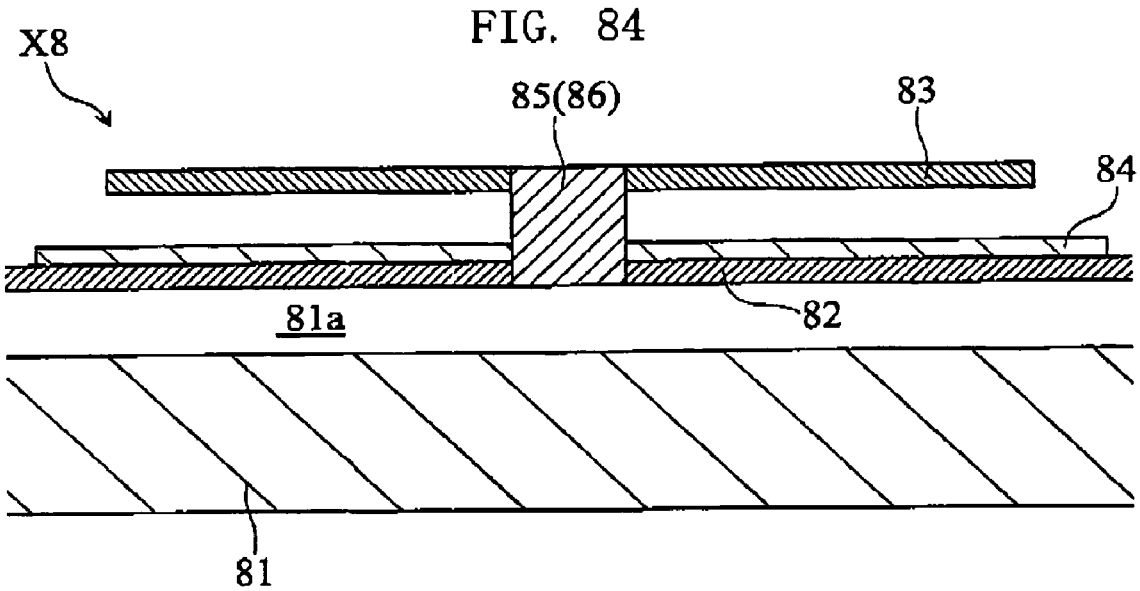
FIG. 84 is a sectional view of a variation of the variable capacitor in FIG. 80.

FIG. 84 is a sectional view of a variation of the variable capacitor X8. The view corresponds to FIG. 81 which shows a section of the variable capacitor X9 in FIG. 80. In the variable capacitor X8, a dielectric film 84 is formed on the movable electrode 83, on the side facing the movable electrode 82; instead of this arrangement, a dielectric film 84 may be formed on the movable electrode 82, on the side facing the movable electrode 83 as shown in FIG. 84. The present variation can be manufactured by the same method as described above for the manufacture of the variable capacitor X8, with the following change for example: Specifically, the step of forming the movable electrode 82 and the step thereafter of forming the sacrifice film 88 and the dielectric film 84 in this sequence are replaced by a step of forming a movable electrode 82, and a step thereafter of forming a dielectric film 84 and a sacrifice film 88 in this sequence.

Figure 85:
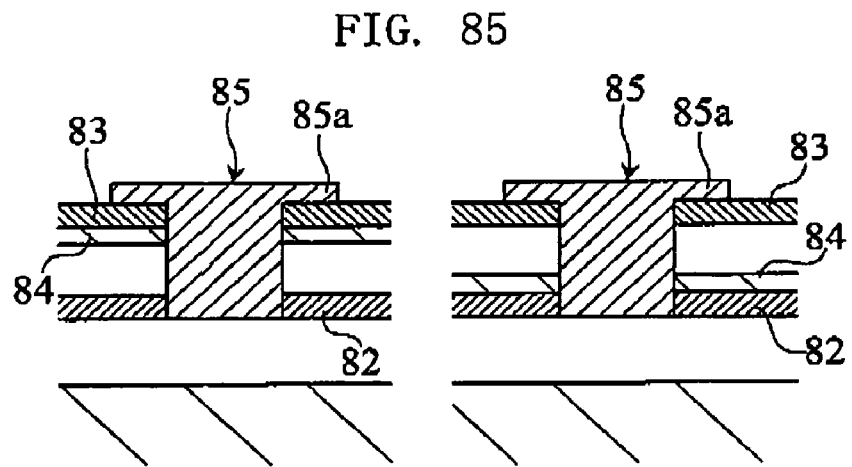
FIG. 85 shows sectional views of plugs having a cap.
Figure 86:
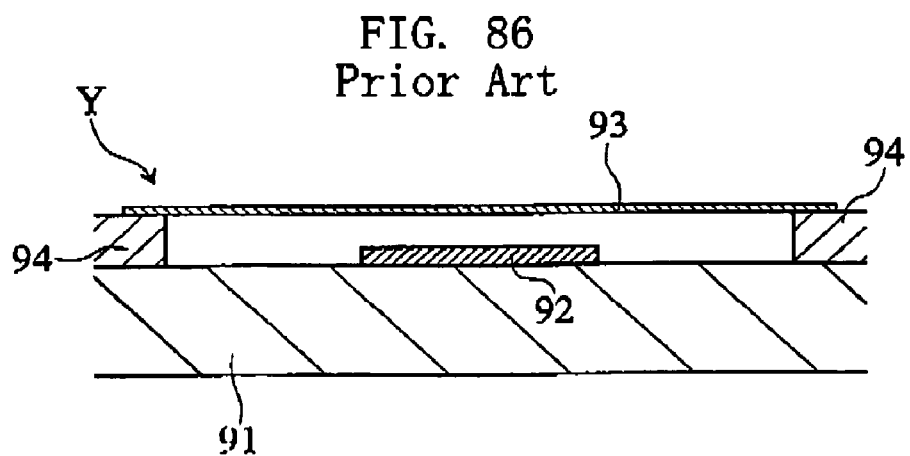
FIG. 86 is a partial sectional view of a conventional variable capacitor.
Figure 87:
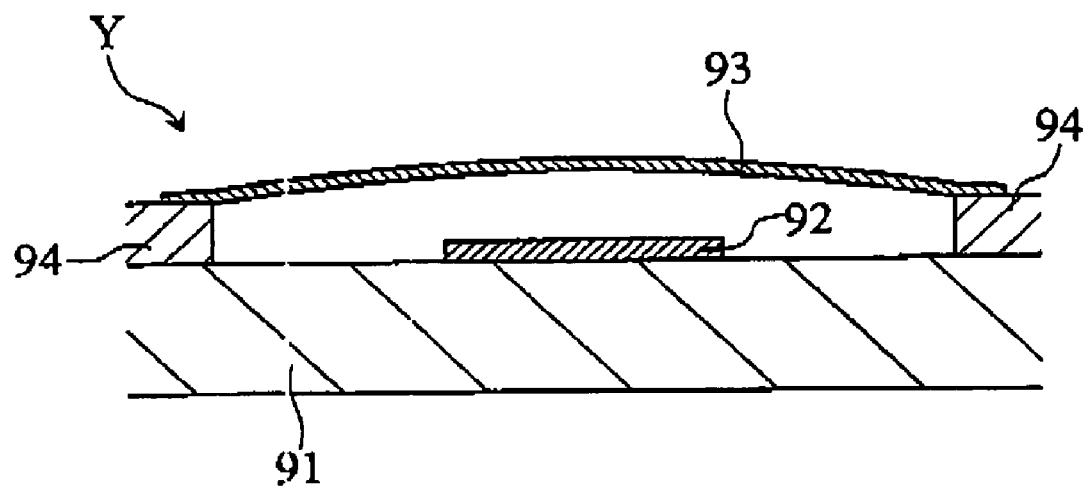
FIG. 87 shows a state of the conventional variable capacitor in FIG. 86, where a movable electrode film is thermally expanded.
Figure 88:
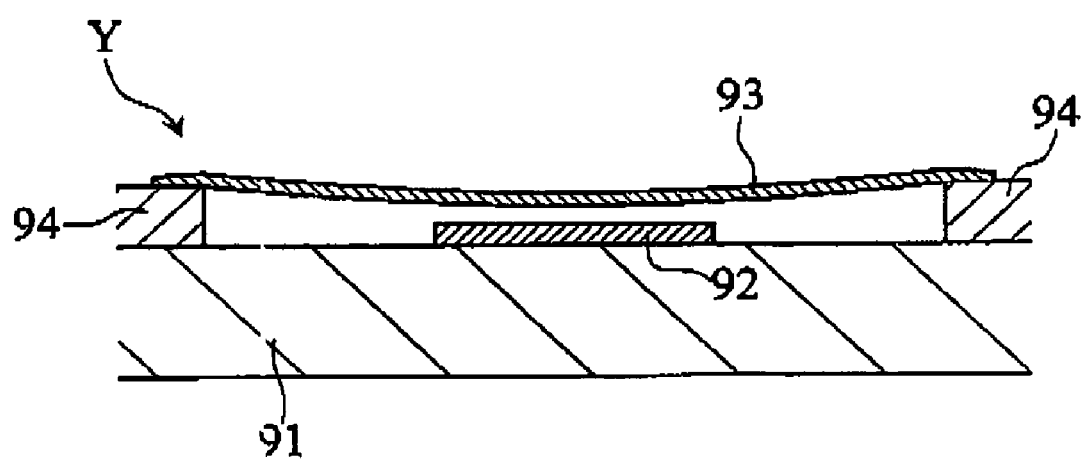
FIG. 88 shows another state of the conventional variable capacitor in FIG. 86, where a movable electrode film is thermally expanded.

As shown in FIG. 85, the plug 85 according to the variable capacitor X8 including such a variation as the above may have a cap 65a. The caps 85a as shown help ensure the bonding relationship between the movable electrode 83 and the plug 85.

The movable electrodes 82, 83 according to the variable capacitor X8 including the variation described above may be like the movable electrodes 22, 23 according to one of the variations of the variable capacitor X2 shown in FIG. 25, FIG. 27, FIG. 29, FIG. 30, FIG. 32, FIG. 34, FIG. 36, and FIG. 38, i.e. may have initial shapes which include curved portions. Otherwise, the movable electrodes 82, 83 according to the variable capacitor X8 including the variation described above may be like the movable electrodes 22, 23 according to one of the variations of the variable capacitor X2 shown in FIG. 26, FIG. 28, FIG. 31, FIG. 33, FIG. 35, FIG. 37, and FIG. 39, i.e. may have initial shapes which include curved portions as well as having portions contacting with the fixed electrode via the dielectric film. Still further, the movable electrodes 82, 83 according to the variable capacitor X8 including the variation described above may be like the movable electrodes 22, 23 according to one of the variations of the variable capacitor X2 shown in FIG. 40 through FIG. 44, i.e. may be connected with each other at two locations each by an anchor portion 86, and having initial shapes like those of the movable electrodes 22, 23 in the variations shown in FIG. 40 through FIG. 44.

The invention claimed is:

1. A variable capacitor comprising:
   a substrate;
   a first electrode formed over the substrate;
   a second electrode film formed over the first electrode in facing relation thereto, the second electrode film being elongate in a direction crossing the first electrode and including a first lengthwise edge and a second lengthwise edge opposite to the first lengthwise edge, a third widthwise edge different from the first and second lengthwise edges, and a fourth widthwise edge opposite to the third widthwise edge, the first and second lengthwise edges being movable relative to the first electrode, the third and fourth widthwise edges being fixed to the substrate, the first and second lengthwise edges as well as the third and fourth widthwise edges defining an outer peripheral contour of the second electrode film; and
   an intermediate anchor portion located between the first and second lengthwise edges of the second electrode film for fixing the first electrode to the second electrode film and for preventing the second electrode film from moving relative to the first electrode at the intermediate anchor portion.

2. The variable capacitor according to claim 1, wherein the anchor portion penetrates at least one of the first electrode and the second electrode film.

3. The variable capacitor according to claim 1, further comprising a dielectric film provided between the first electrode and the second electrode film, wherein the dielectric film is held in contact with one of the first electrode and the second electrode film.

4. The variable capacitor according to claim 3, wherein the dielectric film has a portion constituting at least part of the anchor portion.

5. The variable capacitor according to claim 3, wherein the second electrode film has a portion that is pressable against the first electrode via the dielectric film.

6. The variable capacitor according to claim 3, wherein the second electrode film has a portion pressed against the first electrode via the dielectric film.

7. The variable capacitor according to claim 3, wherein the first and second lengthwise edges of the second electrode film are movable into pressing contact with the first electrode via the dielectric film.

8. The variable capacitor according to claim 1, wherein the second electrode film has a portion curved toward the first electrode.

9. The variable capacitor according to claim 1, wherein the second electrode film has a portion curved away from the first electrode.

10. The variable capacitor according to claim 1, wherein the substrate has a recess under the first electrode for allowing the first electrode to move relative to the second electrode film.

* * * * *